(12) United States Patent
Kominac et al.

(10) Patent No.: US 10,165,042 B2
(45) Date of Patent: Dec. 25, 2018

(54) METHODS AND SYSTEMS FOR CONDUCTING A REMOTE DESKTOP SESSION VIA HTML THAT SUPPORTS A 2D CANVAS AND DYNAMIC DRAWING

(71) Applicant: Wyse Technology L.L.C., San Jose, CA (US)

(72) Inventors: Stevan Kominac, Palo Alto, CA (US); Jeremy Michael Stanley, San Mateo, CA (US); Curtis Schwebke, Menlo Park, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 381 days.

(21) Appl. No.: 14/599,226

(22) Filed: Jan. 16, 2015

(65) Prior Publication Data
US 2015/0180939 A1 Jun. 25, 2015

Related U.S. Application Data

(63) Continuation of application No. 12/965,820, filed on Dec. 10, 2010, now Pat. No. 8,949,726.

(51) Int. Cl.
*H04L 29/08* (2006.01)
*G06F 17/30* (2006.01)
(Continued)

(52) U.S. Cl.
CPC ........ *H04L 67/08* (2013.01); *G06F 17/30905* (2013.01); *G06T 11/20* (2013.01);
(Continued)

(58) Field of Classification Search
CPC .................................................. G06F 17/30905
(Continued)

(56) References Cited

U.S. PATENT DOCUMENTS 5,835,922 A * 11/1998 Shima ................... G06F 17/21
715/209
5,949,412 A 9/1999 Huntsman
(Continued)

OTHER PUBLICATIONS

International Preliminary Report on Patentability; PCT/US2011/064282; pp. 8, dated Sep. 19, 2013.
(Continued)

*Primary Examiner* — William D Titcomb
(74) *Attorney, Agent, or Firm* — Baker Botts L.L.P.

(57) ABSTRACT

Examples of methods, systems, apparatus, and machine-readable storage media are provided to facilitate access and control of a remote desktop of a remote machine by a web browser at a client device through a transcoding server without installing proprietary plug-ins or protocols on the client device. A transcoding server may translate user input requests from a web browser into input calls compatible with a remote desktop display protocol. The transcoding server may receive remote desktop drawing commands from the remote machine and translate the remote desktop drawing commands into web browser drawing updates compatible with the web browser. A transcoding server may communicate with is web browser via HTTP and communicate with a remote machine via a remote desktop display protocol. A web browser may be an HTML5 browser. A transcoding server may send drawing coordinates to the web browser via an HTTP header and may use long polling.

20 Claims, 33 Drawing Sheets

(51) Int. Cl.
  *G06T 11/20* (2006.01)
  *H04L 29/06* (2006.01)
  *G06F 9/451* (2018.01)
  *G06F 9/44* (2018.01)

(52) U.S. Cl.
  CPC .............. *H04L 67/02* (2013.01); *H04L 67/42* (2013.01); *G06F 9/4445* (2013.01); *G06F 9/452* (2018.02); *H04L 67/2823* (2013.01)

(58) Field of Classification Search
  USPC ........................................................ 715/740
  See application file for complete search history.

(56) References Cited

U.S. PATENT DOCUMENTS

| | | | |
|---|---|---|---|
| 6,700,589 B1 | 3/2004 | Canelones et al. | |
| 6,831,665 B2 | 12/2004 | Tsuda et al. | |
| 6,854,122 B1 | 2/2005 | Sheriff et al. | |
| 7,167,181 B2 | 1/2007 | Duluk et al. | 345/506 |
| 7,191,211 B2 | 3/2007 | Tuli | 709/203 |
| 7,441,196 B2 | 10/2008 | Gottfurcht et al. | 715/740 |
| 7,864,186 B2 | 1/2011 | Robotham et al. | |
| 8,176,428 B2 | 5/2012 | Tuli | 715/738 |
| 8,239,749 B2 | 8/2012 | Williamson et al. | 715/211 |
| 8,314,804 B2 | 11/2012 | Feth et al. | 345/522 |
| 8,402,013 B2 | 3/2013 | Dutta et al. | 707/709 |
| 8,458,331 B2 | 6/2013 | Chauhan et al. | 709/225 |
| 8,504,654 B1 | 8/2013 | Kominac et al. | 709/219 |
| 8,527,563 B2 | 9/2013 | Brugiolo | 707/899 |
| 8,589,800 B2 | 11/2013 | Kominac et al. | 715/750 |
| 8,694,603 B2 | 4/2014 | Brobst et al. | 709/217 |
| 8,789,040 B1 | 7/2014 | Callary | 717/178 |
| 8,803,898 B2 | 8/2014 | Shreiner et al. | 345/537 |
| 8,949,463 B2 | 2/2015 | Kominac et al. | |
| 8,949,726 B2* | 2/2015 | Kominac | G06F 17/30905 715/760 |
| 8,966,376 B2 | 2/2015 | Kominac et al. | 715/740 |
| 2001/0047406 A1 | 11/2001 | Araujo et al. | |
| 2002/0032751 A1 | 3/2002 | Bharadwaj | 709/218 |
| 2002/0120683 A1 | 8/2002 | Gomes et al. | 709/203 |
| 2003/0191799 A1 | 10/2003 | Araujo et al. | |
| 2004/0190711 A1 | 9/2004 | Eid et al. | |
| 2004/0260821 A1 | 12/2004 | Yamamoto et al. | 709/229 |
| 2005/0256923 A1 | 11/2005 | Adachi | |
| 2006/0005114 A1 | 1/2006 | Williamson et al. | 715/502 |
| 2006/0256130 A1 | 11/2006 | Gonzalez | |
| 2007/0005861 A1* | 1/2007 | Smith | G06F 11/203 710/264 |
| 2007/0079244 A1 | 4/2007 | Brugiolo | 715/740 |
| 2007/0165035 A1 | 7/2007 | Duluk et al. | 345/506 |
| 2007/0169144 A1 | 7/2007 | Chen | |
| 2007/0171921 A1 | 7/2007 | Wookey | |
| 2007/0198698 A1 | 8/2007 | Boyd et al. | 709/224 |
| 2007/0260702 A1 | 11/2007 | Richardson et al. | |
| 2007/0263007 A1 | 11/2007 | Robotham et al. | |
| 2007/0282951 A1 | 12/2007 | Selimis et al. | |
| 2007/0288855 A1 | 12/2007 | Rohrabaugh et al. | |
| 2008/0016170 A1* | 1/2008 | MacKelprang | G06Q 10/107 709/206 |
| 2008/0098101 A1 | 4/2008 | Black et al. | 709/223 |
| 2008/0098462 A1* | 4/2008 | Carter | G06F 21/33 726/4 |
| 2008/0198409 A1 | 8/2008 | Bodin et al. | |
| 2008/0263010 A1 | 10/2008 | Roychoudhuri et al. | 707/3 |
| 2008/0313545 A1 | 12/2008 | Patel et al. | 715/738 |
| 2009/0089432 A1* | 4/2009 | Kurozumi | G06F 15/16 709/226 |
| 2009/0195537 A1 | 8/2009 | Qui et al. | |
| 2009/0296657 A1 | 12/2009 | Omar et al. | |
| 2009/0307428 A1 | 12/2009 | Schmieder et al. | 711/118 |
| 2010/0005475 A1* | 1/2010 | Shirakawa | G06F 9/461 718/104 |
| 2010/0070887 A1 | 3/2010 | Murrett et al. | 715/760 |
| 2010/0115145 A1 | 5/2010 | Banerjee et al. | 710/10 |
| 2010/0194753 A1 | 8/2010 | Robotham et al. | 345/428 |
| 2010/0235476 A1 | 9/2010 | Lin et al. | 709/219 |
| 2010/0262650 A1 | 10/2010 | Chauhan et al. | 709/203 |
| 2010/0268762 A1 | 10/2010 | Pahlavan et al. | |
| 2010/0268828 A1 | 10/2010 | Pahlavan et al. | 709/227 |
| 2010/0268939 A1 | 10/2010 | Pahlavan et al. | 713/155 |
| 2010/0268940 A1 | 10/2010 | Pahlavan et al. | 713/155 |
| 2010/0268941 A1 | 10/2010 | Pahlavan et al. | 713/155 |
| 2010/0269046 A1 | 10/2010 | Pahlavan et al. | |
| 2010/0269047 A1 | 10/2010 | Pahlavan et al. | 715/740 |
| 2010/0269048 A1 | 10/2010 | Pahlavan et al. | 715/740 |
| 2010/0269152 A1 | 10/2010 | Pahlavan et al. | 726/3 |
| 2010/0274922 A1 | 10/2010 | Reavely | |
| 2010/0281107 A1 | 11/2010 | Fallows et al. | |
| 2010/0293598 A1 | 11/2010 | Collart et al. | |
| 2011/0098056 A1* | 4/2011 | Rhoads | G01C 21/20 455/456.1 |
| 2011/0119602 A1 | 5/2011 | Isozu | 715/760 |
| 2011/0154212 A1 | 6/2011 | Gharpure et al. | 715/738 |
| 2011/0185286 A1 | 7/2011 | Moyers et al. | 715/752 |
| 2012/0017142 A1 | 1/2012 | Nagao | 715/211 |
| 2012/0066601 A1 | 3/2012 | Zazula et al. | 715/733 |
| 2012/0078691 A1 | 3/2012 | Tsai et al. | 705/14.4 |
| 2012/0079374 A1 | 3/2012 | Gaddis | 715/269 |
| 2012/0079380 A1 | 3/2012 | Tsai et al. | 715/716 |
| 2012/0131083 A1 | 5/2012 | Goddard et al. | |
| 2012/0151369 A1 | 6/2012 | Kominac et al. | 715/740 |
| 2012/0151370 A1 | 6/2012 | Kominac et al. | 715/740 |
| 2012/0151371 A1 | 6/2012 | Kominac et al. | |
| 2012/0151372 A1 | 6/2012 | Kominac et al. | 715/740 |
| 2012/0151373 A1 | 6/2012 | Kominac et al. | 715/740 |
| 2012/0266061 A1 | 10/2012 | Williamson et al. | 715/234 |
| 2012/0331038 A1 | 12/2012 | Yang | 709/203 |
| 2014/0258390 A1 | 9/2014 | Annamalaisami et al. | 709/203 |
| 2015/0077802 A1* | 3/2015 | Tamura | G06F 17/30115 358/1.16 |
| 2016/0117265 A1* | 4/2016 | McKeen | G06F 12/1416 711/102 |
| 2016/0142569 A1* | 5/2016 | Akuzawa | H04N 1/00511 715/734 |
| 2016/0261480 A1* | 9/2016 | Agarwal | H04L 43/10 |
| 2016/0307054 A1* | 10/2016 | Takemura | G06K 9/00791 |
| 2016/0328634 A1* | 11/2016 | Hirose | H04N 1/2104 |
| 2017/0054658 A1* | 2/2017 | Min | H04L 49/70 |

OTHER PUBLICATIONS

"Windows Forms", Wikipedia, the free encyclopedia, retrieved from <http://en.wikipedia.org/wiki/Windows_Forms>.

"Comparison of the Java and NET platforms", Wikipedia, the free encyclopedia, retrieved from <http://en.wikipedia.org/wiki/Comparison_of_the_Java_and_NET_platforms>.

International Preliminary Report on Patentability; PCT/US2011/064279; pp. 12.

International Preliminary Report on Patentability; PCT/US2011/064277; pp. 10.

International Preliminary Report on Patentability; PCT/US2011/064284; pp. 9, dated Aug. 15, 2013.

European Office Action received for European Patent Application No. 11847757.9, dated Jul. 4, 2017; 6 pages, dated Jul. 4, 2017.

Java Tm: "Programmer's Guide to the Java 2D (TM) API Enhanced Graphics and Imaging for Java", Nov. 19, 1999, Retrieved from the Internet: URL: http://www.hep.phy.cam.ac.uk/system/jdk1.2.2/docs/j2d-book.pdf; 126 pages, Nov. 19, 1999.

Extended European Search Report for European Patent Application No. 11847757.9, dated Apr. 26, 2016; 10 pages, dated Apr. 26, 2016.

Extended European Search Report received for European Patent Application No. 11847024.4, dated Feb. 19, 2016; 10 pages, dated Feb. 19, 2016.

\* cited by examiner

1100-A

```
receiving, at the transcoding server, a user input request from the web
browser at the client device for access and control of the remote machine,
wherein the web browser supports a 2D canvas and dynamic drawing
(1102-A)
```

```
translating, at the transcoding server, the user input request into an input
command compatible with a remote desktop display protocol to be
utilized by the transcoding server for facilitating communication with the
remote machine
(1104-A)
```

```
receiving, at the transcoding server, a remote desktop drawing command
from the remote machine in response to the input command
(1106-A)
```

```
translating, at the transcoding server, the remote desktop drawing
command into a drawing update compatible with the hypertext markup
language
(1108-A)
```

```
facilitating providing the drawing update from the transcoding server to
the web browser
(1110-A)
```

FIG. 11A

1500-C receiving, at the transcoding server, a remote desktop drawing command from the remote desktop server via the remote desktop client in response to the remote desktop input command, wherein the remote desktop drawing command is compatible with the remote desktop display protocol, and wherein the remote desktop drawing command represents a portion of an entire image of the remote desktop
(1502-C)

translating, at the transcoding server, the remote desktop drawing command into a graphics drawing command compatible with the transcoding server
(1504-C)

updating, at the transcoding server, a portion of an image and coordinates based on the graphics drawing command
(1506C)

generating, at the transcoding server, an image file based on the updated portion of the image
(1508-C)

obtaining drawing coordinates based on the coordinates
(1510-C)

facilitating providing a web browser drawing update to the web browser in response to a drawing request from the web browser, wherein the web browser drawing update comprises the image file and the drawing coordinates, and wherein the web browser drawing update is compatible with the web browser
(1512-C)

FIG. 15C

METHODS AND SYSTEMS FOR CONDUCTING A REMOTE DESKTOP SESSION VIA HTML THAT SUPPORTS A 2D CANVAS AND DYNAMIC DRAWING

CROSS-REFERENCES TO RELATED APPLICATIONS

The present application is a continuation of U.S. patent application Ser. No. 12/965,820 filed Dec. 10, 2010, which is hereby incorporated by reference in its entirety for all purposes.

FIELD

The subject technology relates in general to communications and processing, and more particularly to, methods and systems for conducting a remote desktop session via HTML that supports a 2D canvas and dynamic drawing.

BACKGROUND

Traditional implementations of remote desktop protocols enable a remote user to access his or her desktop or applications from a client device over a LAN or WAN network topology to a server.

The traditional approach is for a software infrastructure vendor to support a specific public or proprietary remote desktop display protocol, which is native or installed on a server. To access the server using a remote desktop protocol, a client typically needs to have a protocol-specific software application that executes on the user's specific operating system and platform or plug-in for a specific browser.

Conventional approaches are thus cumbersome to users. Accordingly, there is a need for systems and methods that facilitate user interaction with an application running on a server from a client device and provide an improved experience for users at the client device.

SUMMARY

Aspects of the present disclosure may provide utilizing a transcoding server that provides one or more web browsers' access to one or more remote machines through a remote desktop client. Transcoding servers according to the present disclosure may include a module or functionality, e.g., machine-readable instructions, to receive requests from a web browser. The transcoding servers may further include a module or functionality, e.g., machine-readable instructions, to translate user input requests received (as HTTP requests) from a web browser into corresponding input calls in a protocol/language compatible with one or more remote desktop clients for accessing one or more remote machines. The transcoding servers can receive information/data from, e.g., drawing commands, from one or more remote machines via the one or more remote desktop clients and translate the information/data into a protocol/language compatible with the associated web browser(s). The transcoding servers can include storage/memory functionality for holding an image, e.g., a Java bitmap, which can be modified in response to drawing commands received from the remote desktop server. Transcoding servers may also receive from the remote desktop server and store coordinates corresponding to the respective drawing commands.

In some applications, a transcoding server may facilitate/accelerate rendering an image of the related remote desktop(s) at the related web browser by creating and modifying an image of the portion of the remote desktop that is affected by the user's input at the user device.

Aspects of the present disclosure may provide a transcoding server with long polling functionality to handle requests from a web browser.

Aspects of the present disclosure may include or provide a web browser having a canvas or 2D rendering functionality.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 11A is a block diagram representing an example of a method of facilitating accessing and controlling a remote desktop of a remote machine in real time by a web browser at a client device via a hypertext transfer protocol (HTTP) utilizing a transcoding server.

FIGS. 15B-15C are block diagrams representing an example of a method of facilitating accessing and controlling a remote desktop of a remote machine in real time from a web browser at a client device via a hypertext transfer protocol (HTTP) handler and a remote desktop client adapter for a transcoding server; FIG. 15C is a continuation of FIG. 15B.

FIG. 15E is a continuation of FIG. 15D.

Figure 1:
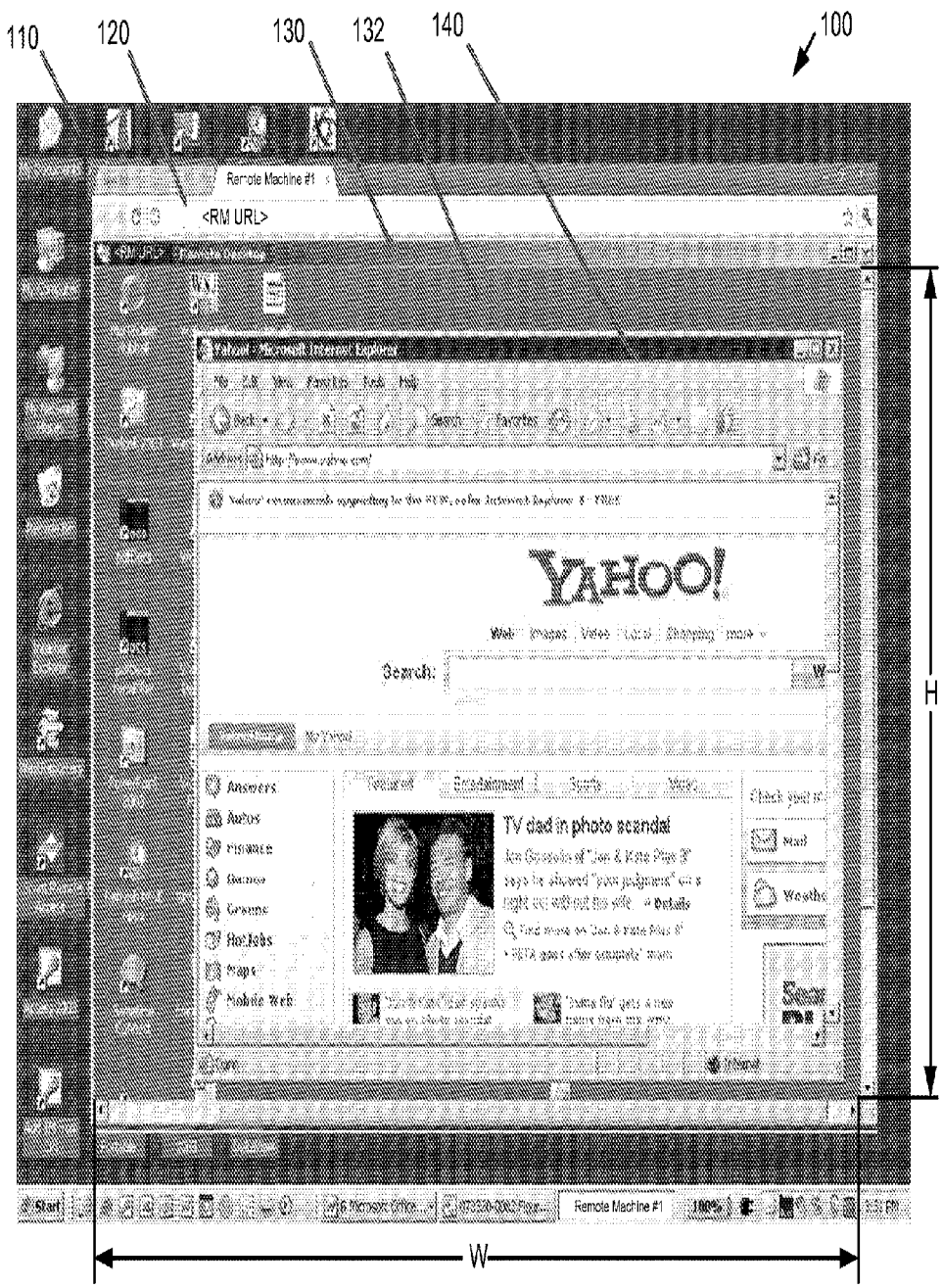
FIG. 1 illustrates an example of a display on a client device during a remote access session with a remote machine via a server.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Prior approaches using hypertext markup language (HTML) have required the use of browser specific plug-ins as a method to create a better user experience by accelerating video and audio for example. Browser plug-ins do not achieve HTML browser independence across the competing infrastructure vendors.

Infrastructure vendors are competing heavily in the "proprietary" remote desktop protocols and are focused on modest improvements over time to improve the user experience. The user experience while using a remote desktop protocol is a primary differentiator between the infrastructure vendors. There are, however, no known efforts to enable the user and customer to have a single unified method to have remote access to their home, work or mobile Windows, Mac or Linux environments.

In some aspects, embodiments of the subject technology can eliminate or reduce the need for the installation of "proprietary" protocols on a user's device (or a client device) for accessing a remote machine during a remote desktop session. A remote machine, or remotely accessed machine, may include a remote desktop server. By enabling the user to use a single method to access their remote desktops with an "open standard" technology like HTML5, the requirements placed on a user's device, e.g., a smart phone, can be greatly reduced.

In some aspects, embodiments of the subject technology can reduce or eliminate the need for installation of client software and/or a browser plug-in on the user's client device.

In some aspects, embodiments of the subject technology can achieve a robust user experience that one would expect from a local executing application on a personal computing desktop.

In some aspects, embodiments of the subject technology can advantageously utilize 2D rendering capability of suitable web browsers and replace proprietary rendering protocols with the 2D drawing capabilities of a browser running on the user's client device.

In some aspects, embodiments of the subject technology can allow a user to easily access one or multiple open remote desktops across multiple servers and maintain their exact state from information stored in real-time on an associated web server having protocol translation functionality that can function as a common interface between push-type protocol employed by most remote desktop protocols and the pull-type protocol employed by HTTP, also referred to herein as a "transcoding server," which the user may access via a web browser having 2D rendering capability. Doing so can allow the user to render a remote display of a currently open session in a few seconds. Thus, as the user switches from client device to client device, the exact state of a particular remote desktop is preserved and is re-rendered based on the capabilities of each display device. Effectively the user's multiple desktops can be configured to be always on and ready to be displayed on demand. The user's remote desktops can be configured to be accessed at any time and from any location.

Prior to the subject technology as described herein, because HTTP (a pull-type protocol) and most remote desktop display protocols (push-type protocols) are incompatible, it has generally been recognized by those skilled in the art that proprietary software and/or downloadable plug-ins were necessary for a web browser in order to have a remote desktop session using an HTTP on one end and a remote desktop display protocol on the other end.

In some aspects, embodiments of the subject technology can enable a user of any endpoint device with a web browser having 2D rendering capabilities, e.g., an HTML5 browser, to display one or more remote desktop sessions in a single or multiple browser windows. Embodiments of the present disclosure can accordingly eliminate the need for installation on a client device of proprietary or open source client applications for remote desktop access. Embodiments of the present disclosure can establish and maintain simultaneous remote desktop connections to a single or multiple Windows, Mac OS, or Linux servers and enable all remote sessions to be displayed and interacted independent! y within the user's browser application. Embodiments of the present disclosure can be rendered in real-time and be displayed as a web page on the remote client, e.g., a user device such as a smart phone. All user mouse, touch and keyboard input may be captured within the browser window and converted into the input format needed by the remote desktop machine, which may utilize common desktop protocols, e.g., independent computing architecture (ICA) by Citrix Systems, remote desktop protocol (RDP) by Microsoft, and PC-over-IP (PCoiP) by Taradici, etc. Embodiments of the present disclosure can maintain open connections to the host servers at all times allowing single or multiple endpoint devices to be interactively connected and disconnected to the remote sessions instantly. Remote sessions never need to be disconnected from the servers as embodiments of the present disclosure can maintain active connections to the desktop. Active sessions can be resized and adjusted for best display and user experience to utilize the full capability of the user's access device.

In some aspects, embodiments of the subject technology can reduce or eliminate the requirement for a local client application, e.g., a web browser, to support a vendor specific remote desktop protocol. Embodiments of the present disclosure can allow a browser with 2D rendering capability to run on any hardware, any operating system and any form-factor for the user to access her or his remote desktop or applications. A user can simply point the browser, e.g., an HTML5 compatible browser such as Google Chrome, to a respective predetermined uniform resource locator (URL) for one or more remote machines configured as a remote desktop application servers. The browser can access a transcoding server that can translate or transcode between the protocol used for the browser and the protocol used for the remote machine(s). The transcoding server can be public/private cloud-based, and the access to the transcoding server can utilize HTTPS protocol. The transcoding server can authenticate the connection between the remote machine and a remote desktop client, render the desktop of the remote machine(s) in real-time, and transmit that rendering to the browser via HTTP so that the browser can display the rendering in HTML5 canvas. Accordingly, embodiments of the present disclosure can function as, or provide, a virtual desktop and application server that connects to one or multiple remote desktop servers, e.g., Citrix XenDesktop with ICA, Microsoft Windows Client and Server with RDP, and VMware View with PCoiP, etc.

Prior to HTML5 supporting canvas 2D real-time drawing primitives, HTML alone was not seen as a practical rendering technology due to the static nature of the rendered objects. As used according to the present disclosure, HTML5, and similar browser languages, can enable a new user robust experience due to the ability of rendering in 2D, 3D and multimedia video/audio objects on the client platform; HTML5 can also, in some cases, utilize hardware acceleration for such rendering. Aspects of the subject technology can facilitate enhanced user experience for remote desktop sessions by providing platform-independent techniques that allow real time access to remote machines and do not require the client device to have proprietary software or plug-ins. Moreover, the remote machines are not required to have HTTP or HTML compatibility for the remote desktop sessions.

As described herein, aspects of the subject technology can reduce or minimize traffic between a browser and a transcoding server according the present disclosure. The reduction in traffic can be facilitated by various aspects of the subject technology including, but not limited to, implementation of long polling for drawing requests received from a web browser, providing to a web browser only image portions from a remote desktop that have changed and need to be updated (rather than the image of the entire remote desktop), and placing coordinates for updated image portion(s) into a header of a single HTTP transmission response. The reduction of traffic to and from a browser can facilitate a remote desktop session that provides a real time user experience, e.g., a user experience with few if any perceivable delays in the round trip time (delay) for user inputs to travel from a client device, to the remote machine, and a corresponding update of the remote desktop showing up on the client device. In exemplary embodiments, such delay may be below, e.g., 100 milliseconds, so that most users will not perceive any delay at all.

FIG. 1 shows an example of a display at a client device with a large screen during a remote desktop session with a remote machine via a server. The display 100 includes the local desktop 110 of the client device, a web browser window 120 that in turn includes a remote view window 130 showing an image 132 of a remote desktop of the remote machine, which image includes, in this example, folder and shortcut icons in addition to a remote web browser application 140 running on the remote machine. The remote view window 130 may have a height H and a width W, and remote view window 130 may be resized (e.g., to be made larger to cover the entire local desktop 110 or be made smaller). The image 132 of the remote desktop 130 and remote application 140 are based on display output data of the remote desktop 130 and remote application 140 from the remote machine transmitted to the client device via the server.

Figure 5:
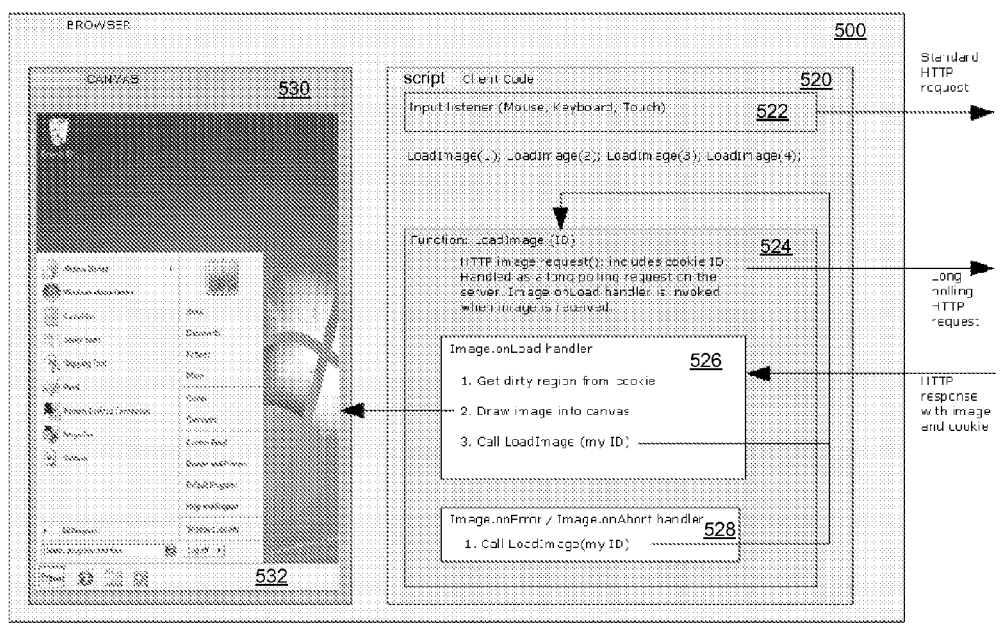
FIG. 5 is a conceptual block diagram of an example of a web browser as used in conjunction with a transcoding server and a remote machine.

As was noted previously, aspects of the present disclosure can include or utilize a HTML5 compatible web browser having a 2D canvas, e.g., 530 in FIG. 5. The HTML5 specification provides for a 2D canvas, which allows for dynamic, real-time, scriptable rendering of 2D shapes and bitmap images. In one aspect, being scriptable can mean or include reference to utilizing JavaScript for rendering a 2D image. The canvas consists of a drawable region defined in HTML code with height and width attributes. JavaScript code may access the area through a full set of drawing functions similar to other common 2D APIs, thus allowing for dynamically generated graphics.

Figure 2A:
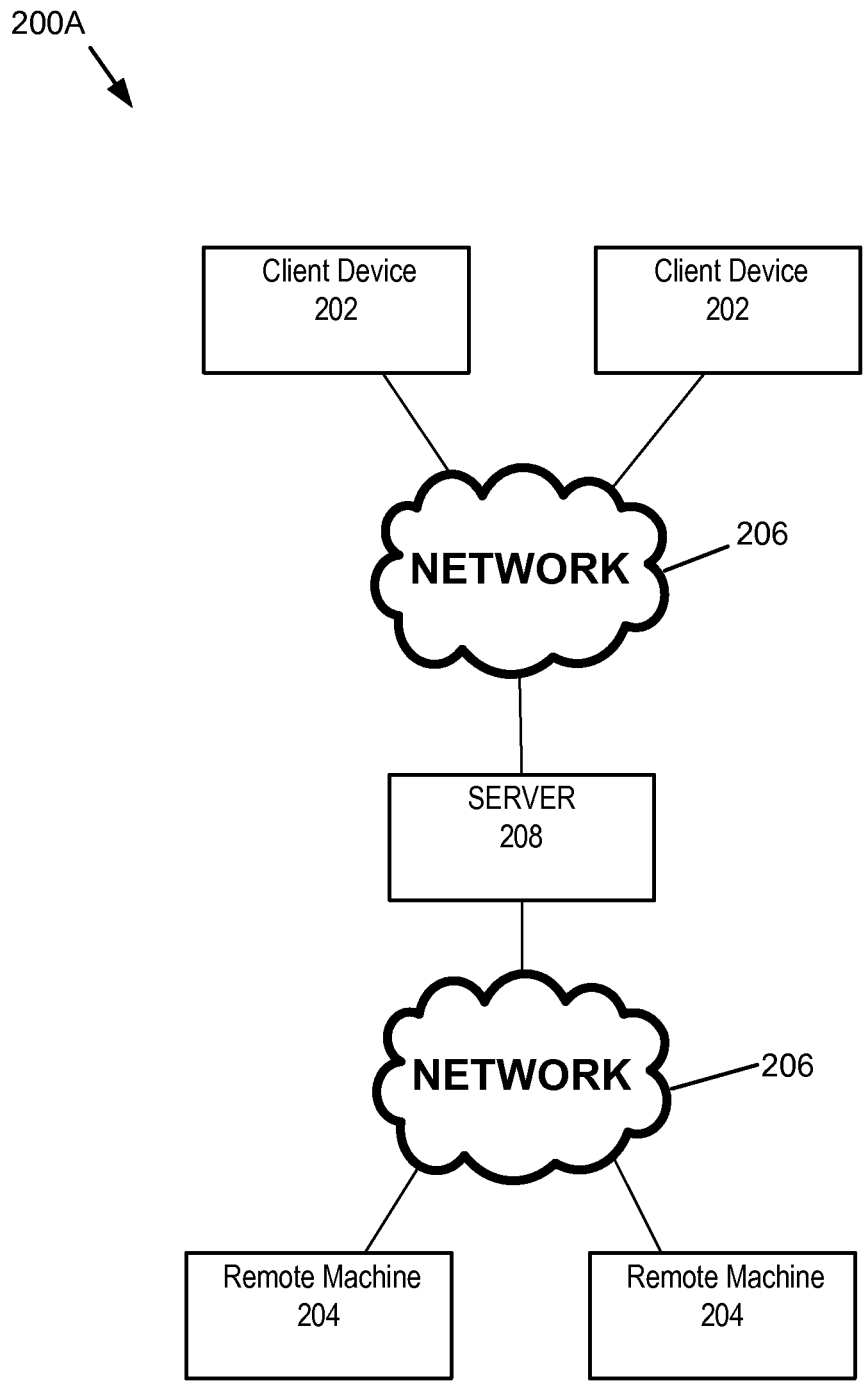
FIG. 2A is a diagram of an example of one or more client devices each with a web browser connected to one or more remote machines via multiple networks and a server.
Figure 2B:
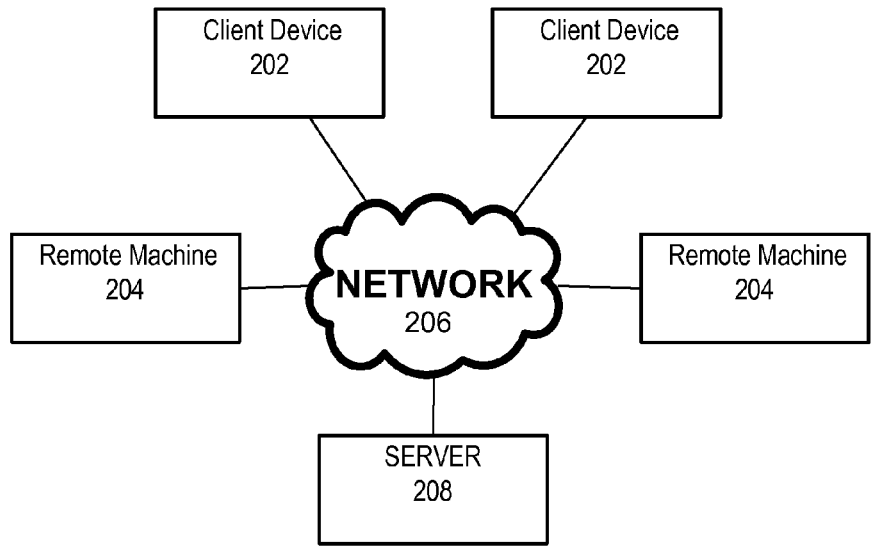
FIG. 2B is a diagram of an example of one or more client devices each with a web browser connected to one or more remote machines through a network and a server.

As shown in FIGS. 2A-2B, an overall architecture of exemplary embodiments of the present disclosure may contain three parts: a client device (or a user's device) containing a browser, e.g., an HTML5 compatible browser; a server, e.g., a Java web sever, that is configured to function as a transcoding server, translating between different protocols; and a remote machine to which the client device is connecting. As shown and described for FIGS. 3A-3B, a transcoding server may include three main sections: a remote desktop client wrapper or adapter, a drawing commands queue, and a web application container. The web application container can include various elements or components, e.g., a hypertext transfer protocol (HTTP) handler, a long polling handler, and a drawing requests queue, as shown and described with reference to FIGS. 2A-11. In an alternate embodiment, a drawing commands queue may be a part of a web application container.

FIG. 2A is a diagram of an example of client devices such as those having a web browser connected to multiple remote machines through multiple networks and a server. The system 200 may include one or more remote client devices 202 in communication with one or more remote machines 204 via a server computing device 208 (server) via one or more networks 206. In one aspect, the server 208 is configured to allow remote sessions (e.g., remote desktop sessions) wherein users at client devices 202 can access applications and files on one or more remote machines 204 by logging onto the server 208 from a client device 202 over one or more networks 206.

FIG. 2B is a diagram of an alternate example of one or more client devices connected to one or more remote machines through a network and a server. As shown in the drawing, the server 208 associated with the remote machines 204 can be connected to network 206, for example, in a hub and spoke configuration.

By way of illustration and not limitation, in one aspect of the disclosure, stated from a perspective of a remote machine side (treating a remote machine 204 as a local device and treating a client device 202 as a remote device), an application is executed (or runs) at a local device 204. While a client device 202 may receive and display a view of the application on a display local to the client device 202, the client device 202 does not execute (or run) the application at the client device 202. Stated in another way from a perspective of the client side (treating a remote machine 204 as a remote device and treating a client device 202 as a local device), a remote application is executed (or runs) at a remote machine 204, and while a client device 202 may receive and display a view of the remote application, the client device 202 does not execute (or run) the remote application locally at the client device.

By way of illustration and not limitation, a client device 202 can represent a computer, a mobile phone, a laptop computer, a thin client device, a personal digital assistant (PDA), a portable computing device, or a suitable device with a processor. In one example, a client device 202 may be a smartphone (e.g., iPhone, Android phone, Blackberry, etc.). In certain configurations, a client device 202 can represent an audio player, a game console, a camera, a camcorder, an audio device, a video device, a multimedia device, or a device capable of supporting a connection to a remote server. In a preferred example, a client device 202 is mobile. In another example, a client device 202 can be stationary. According to one aspect of the disclosure, a client device 202 may be a device having at least a processor and memory, where the total amount of memory of the client device 202 could be less than the total amount of memory in a remote machine 204 or a server 208. In one example, a client device 202 does not have a hard disk. In one aspect, a client device 202 has a display smaller than a display supported by a remote machine 204 or a server 208. In one aspect, a client device may include one or more client devices.

In one preferred aspect, a server 208 or a remote machine 204 may represent a computer. In another aspect, a server 208 or a remote machine 204 may represent a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one preferred example, a server 208 or a remote machine 204 is stationary. In another aspect, a server 208 or a remote machine 204 can be mobile. In certain configurations, a server 208 or a remote machine 204 may be any device that can represent a client device. In one aspect, a server 208 may include one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client device 202, a server 208 and a remote machine 204 are remote with respect to one another, a client device 202 may connect to a server 208 over a network 206, and a remote machine may connect to a server 208 over a network 206 via a network connection, for example, a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 206 can be a LAN network, a WAN network, a wireless network, the Internet, an intranet or other network. A network 206 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server and/or a remote machine, and the word "remote" may indicate that a client device is in communication with a server(s) and/or a remote machine(s), for example, over a network connection(s).

In one aspect of the disclosure, a "client device" may be sometimes referred to as a client, a user device, a user's device or vice versa. Similarly, a "server" may be sometimes referred to as a server device or vice versa. A server is sometimes referred to as a web server. Exemplary embodiments of the present disclosure include use of web servers with transcoding functionality, e.g., transcoding servers.

In one aspect, the terms "local" and "remote" are relative terms, and a client device may be referred to as a local client device or a remote client device, depending on whether a client device is described from a client side or from a server side or a remote machine's side, respectively. A remote machine may be referred to as a local machine or a remote machine, depending on whether a remote machine is described from the remote machine's side or from a client or server side. Similarly, a server may be referred to as a local server or a remote server, depending on whether a server is described from a server side or from a client side or a remote machine's side, respectively. Furthermore, an application running on a remote machine may be referred to as a local application, if described from a remote machine's side, and may be referred to as a remote application, if described from a client side or a server side.

In one aspect, devices placed on a client side (e.g., devices connected directly to a client device(s) or to one another using wires or a short range wireless connection (e.g., Bluetooth)) may be referred to as local devices with respect to a client device and remote devices with respect to a server. Similarly, devices placed on a server side (e.g., devices connected directly to a server(s) or to one another using wires or a short range wireless connection (e.g., Bluetooth)) may be referred to as local devices with respect to a server and remote devices with respect to a client device.

Figure 3A:
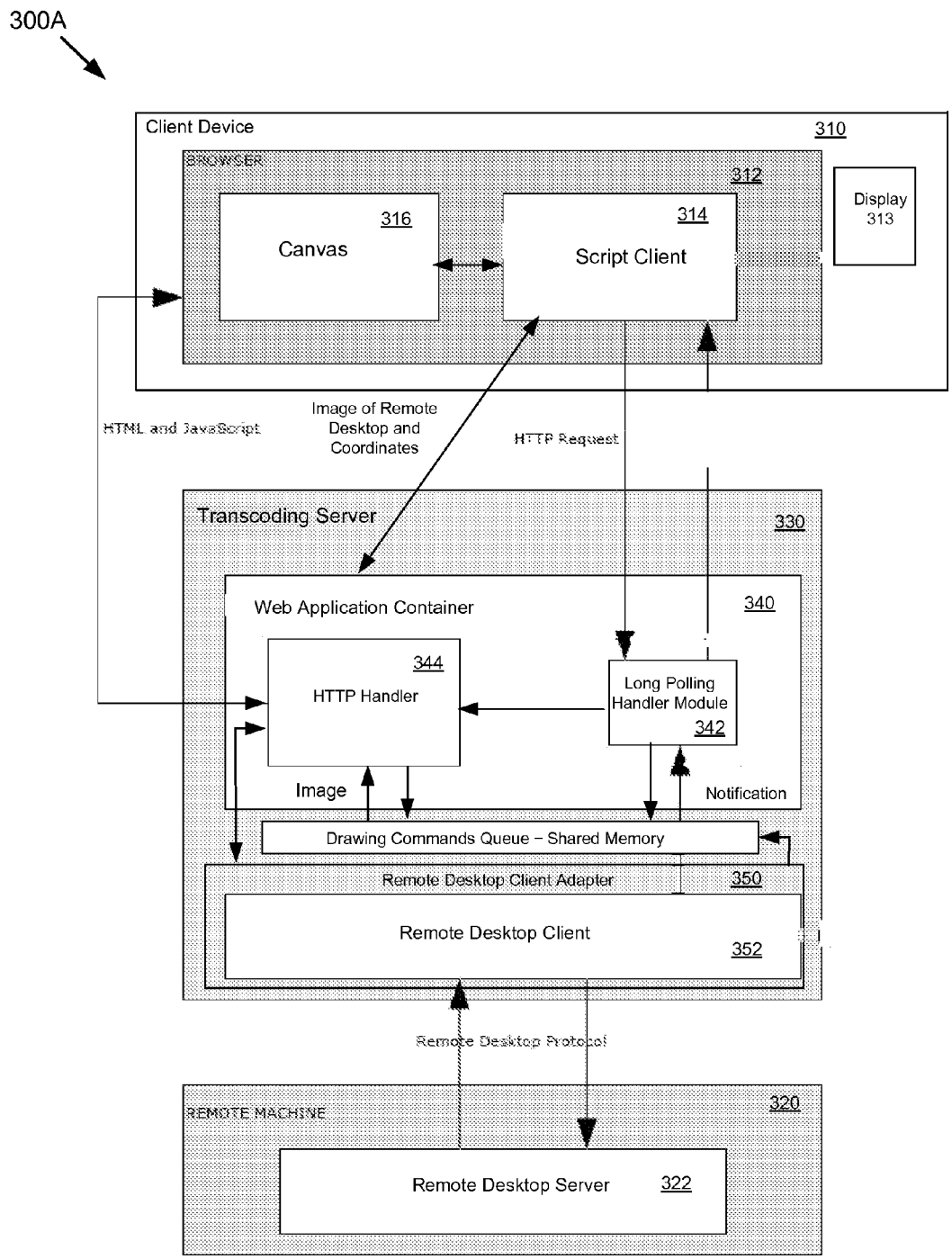
FIG. 3A is a conceptual block diagram of an example of a transcoding server according to certain aspects of the present disclosure as used in conjunction with a web browser and a remote machine.

FIG. 3A is an example of a conceptual block diagram of a system 300A including a transcoding server 330 according to certain aspects of the present disclosure as used in conjunction with a web browser 312 and a remote machine 320. A client device 310, such as a smart phone or laptop computer, is depicted along with a web browser having (i) a canvas 316, e.g., the web browser 312 supports a 2D rendering canvas, and (ii) a script client 314, e.g., a JavaScript client in a preferred embodiment.

Transcoding server 330 can include three main functional blocks or modules: a web application container 340, a remote desktop client adapter 350, and a drawing commands queue 360 that includes a shared memory. The web application container can include an HTTP handler 344 for handling HTTP requests from the web browser and HTTP responses to the web browser. In some embodiments, the web application container 340 may also include a long polling handler module 342, as shown. The remote desktop client adapter 350 can be configured to interface with a remote desktop client 352, e.g., from a third-party vendor, for communication with remote machine 320, which may include a remote desktop server 322, as shown. Embodiments of a transcoding server 330 can be configured to provide an application framework for hosting one or more web applications and/or function as a Java web application container that can run Servlets. In some aspects, a remote desktop client adapter 350 may be referred to as a remote desktop client common interface.

The remote desktop client 352 may function to communicate with the remote desktop server 322 of the remote machine 320 using a remote desktop display protocol. The remote desktop client sends a user's input to the remote machine, and receives drawing data from the remote machine via its specific remote desktop display protocol.

In one aspect, a remote desktop server 322 may refer to a software installed on a remote machine 320, and a remote desktop server 322 may allow applications, particularly those including graphical applications, which run on the remote machine 320, to be displayed at a machine that is separate and distinct from the remote machine 320 (e.g., client devices 310). Remote desktop server 322 may allow drawing commands representing an image of a desktop of the remote machine to be transmitted to the separate machine (e.g., transcoding server 330). In one aspect, remote desktop client 352 may refer to a software installed on the machine that is separate and distinct from the remote machine 320 (e.g., transcoding server 330). Remote desktop client 352 may send requests to remote desktop server 322 via a remote desktop display protocol and in response receive the drawing commands representing the image of the desktop of the remote machine via the remote desktop display protocol.

In operation, the web application container 340 can function to receive and respond to the JavaScript client's HTTP requests. In one implementation, a Servlet container can be used but the same result can be achieved using any similar web application framework, such as Restlet, for example. The remote desktop client adapter 350 may provide a common interface between any remote desktop client and the drawing commands queue/the web application container.

The remote desktop client adapter 350 may receive a user's input information, data, or commands (e.g., mouse, keyboard, and touch events) from HTTP handler 344 and translate the input information/commands into respective remote desktop input calls, which are sometimes referred to as remote desktop input commands. The remote desktop client adapter 350 may also translate the drawing commands of the remote desktop, e.g., GDI drawing commands, received from remote desktop server 322 (via a remote desktop display protocol and remote desktop client 352) into Java graphics application programming interface (API) commands. Java graphics API commands in themselves are not suitable for the web browser; but they are an intermediary step towards achieving browser compatibility. The remote desktop client adapter may then execute those Java graphics API commands, i.e., drawing into an off-screen Java bitmap, which can be stored in the drawing commands queue 360. In an alternative embodiment, the drawing commands queue (e.g., 360 of FIG. 3A or 440 of FIG. 4A or 4B) may receive the Java graphics API commands from the remote desktop client adapter and execute the Java graphics API commands to draw into an off-screen Java bitmap. The HTTP handler (e.g., 344 of FIG. 3A or 422 of FIG. 4A) or image conversion module (e.g., 346 of FIG. 3B or 428 of FIG. 4B) can create an image, such as a joint photographic experts group (JPEG) image, or a portable network graphics (PNG) image, or a bit image file (BMP) image or any other image file in an image format suitable for web browsers, from the Java off-screen bitmap; and the resulting image is suitable for the browser 312. In one aspect, a JPEG image may be referred to as a JPEG image file, and a PNG image may be referred to as a PNG image file, and BMP image may be referred to as a BMP image file. In one aspect, as the image (e.g., a JPEG or PNG image) is created in real time, when it is created, it is simply sent to the web browser without being stored at the transcoding server.

In one aspect, the drawing commands queue 360 can serve two purposes: holding or storing the off-screen Java bitmap onto which drawing commands are executed; and, holding or serving as a drawing coordinates pool, e.g., a queue of coordinates for drawing commands. The drawing commands queue 360 can, for example, store GDI drawing command coordinates received from the remote desktop client adapter. In the event there are new drawing coordinates in the queue, the drawing commands queue 360 may send a notification to long polling handler module 342 (e.g., can be sent so that any pending request in the drawing requests queue can be served). The drawing requests queue (e.g., 426 in FIG. 4A or 4B) can function to store incoming long polling drawing requests from the client and respond to them when there are pending drawing commands from the drawing commands queue.

Figure 3B:
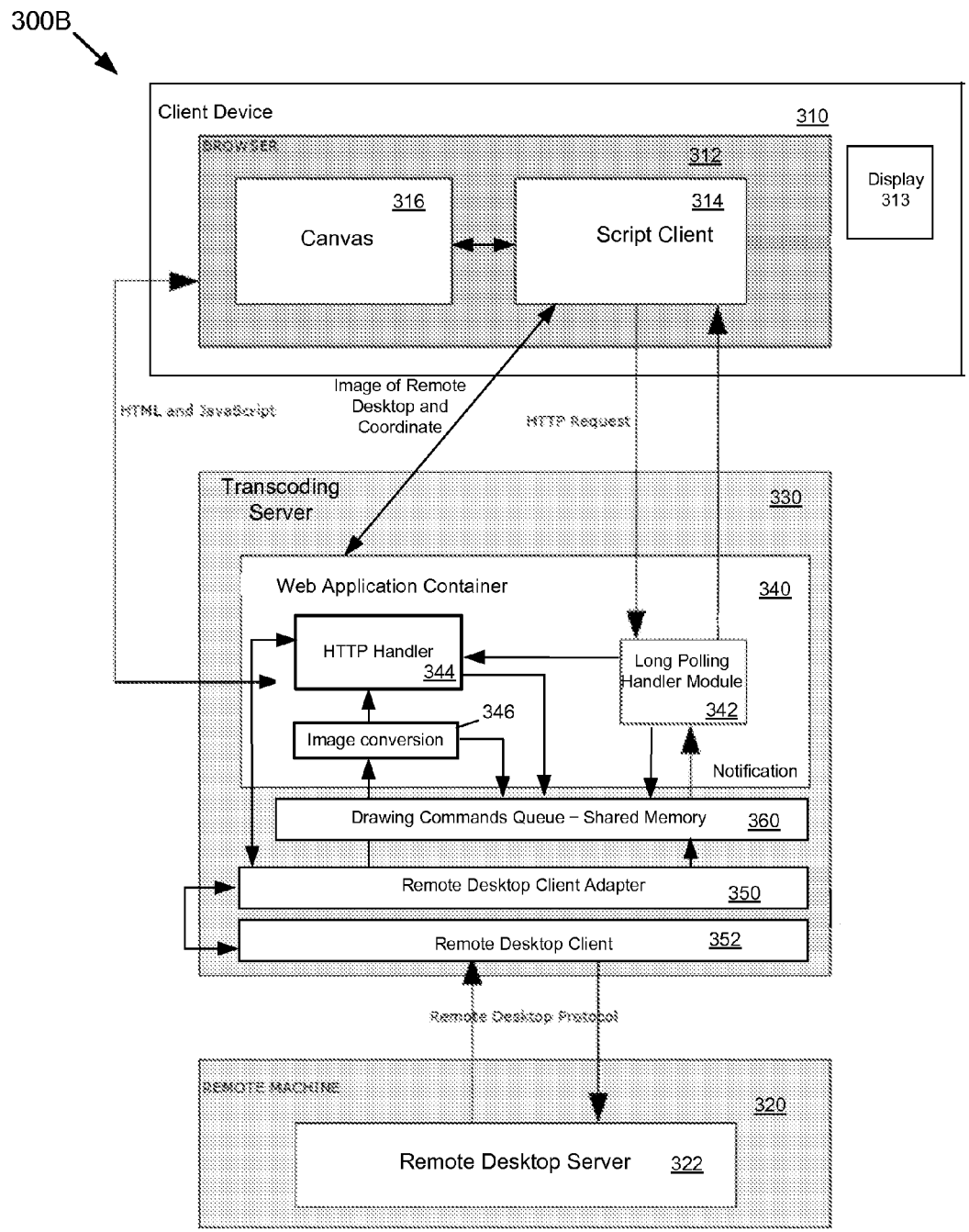
FIG. 3B is a conceptual block diagram of an example of a transcoding server according to certain alternate aspects of the present disclosure as used in conjunction with a web browser and a remote machine.

FIG. 3B is a conceptual block diagram of a system 300B including a transcoding server 330 according to certain alternate aspects of the present disclosure as used in conjunction with a web browser and a remote machine. System 300B is similar to system 300A of FIG. 3A with similar reference numbers, except that the remote desktop client 352 is shown as a separate module/functional block relative to the remote desktop client 350 adapter, and an image conversion module 346 is shown as a separate module/functional block relative to HTTP handler 344.

Figure 4C:
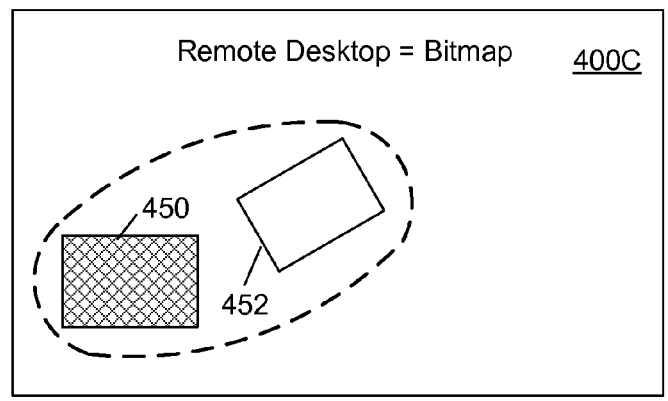
FIG. 4C is a conceptual block diagram of a remote desktop of a remote machine.
Figure 4A:
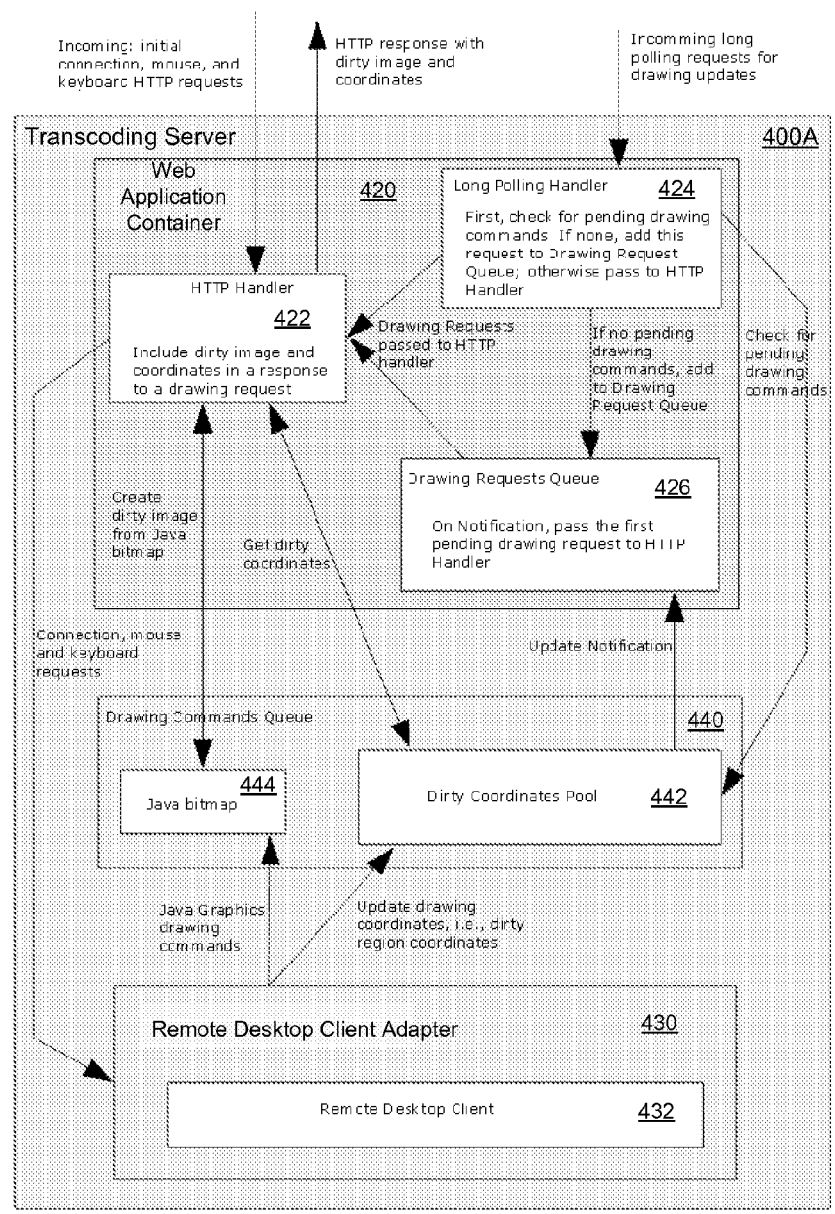
FIG. 4A is a conceptual block diagram of an example of a transcoding server.
Figure 4B:
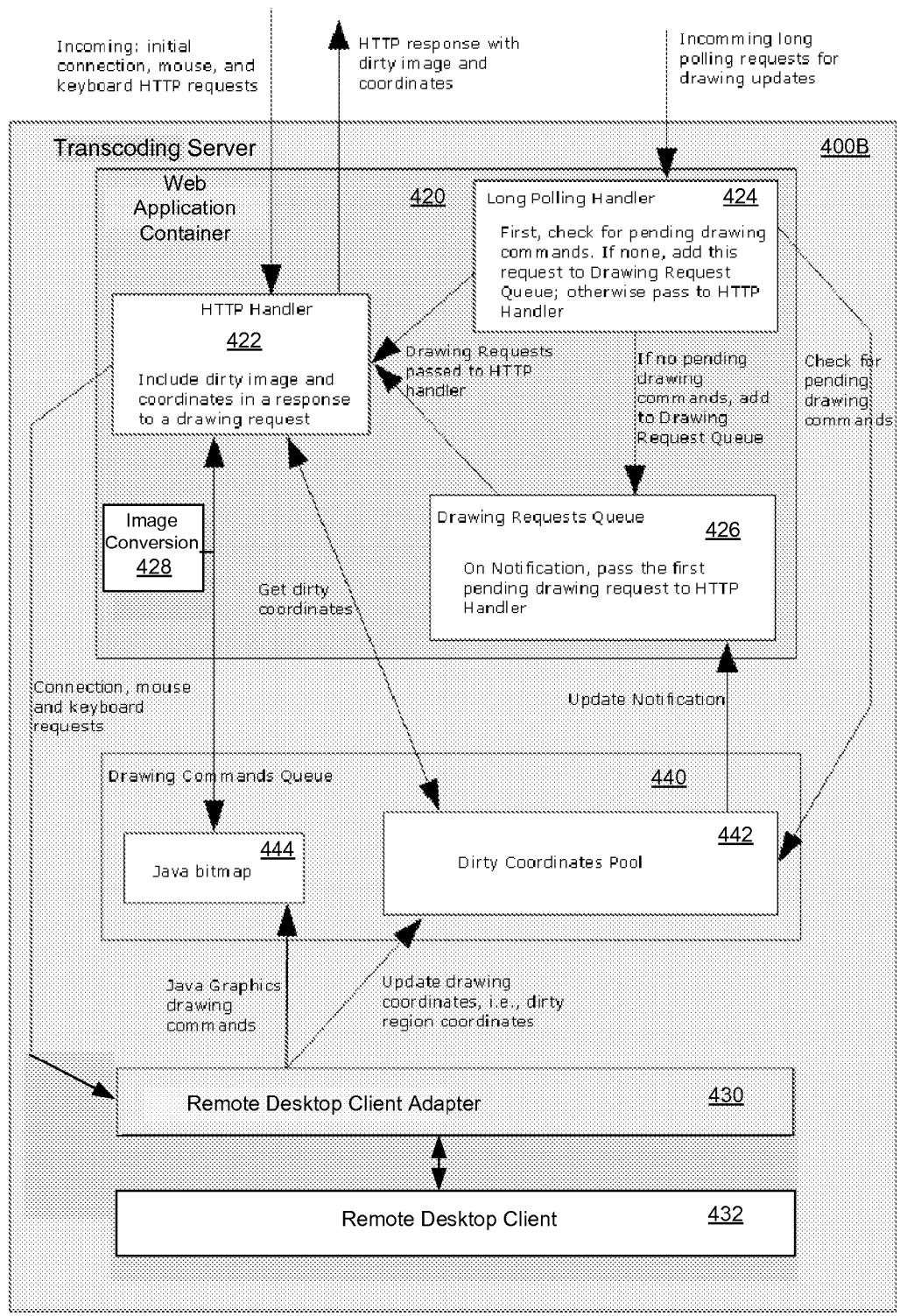
FIG. 4B is a conceptual block diagram of an example of an alternate transcoding server.

FIG. 4A is a detailed conceptual block diagram of a transcoding server 400A according to certain aspects of the present disclosure. In one aspect, transcoding server 400A may preferably be a Java transcoding server. Transcoding server 400A may include an web application container 420 (e.g., a web application container such as a Servlet container), a remote desktop client adapter 430, and a drawing commands queue 440. The remote desktop client adapter 430 can be configured to interface with any suitable remote desktop client 432 for communication with a remote machine (e.g., 320 in FIG. 3A or 3B), which may be configured to include a remote desktop server (e.g., 322 in FIG. 3A or 3B). 432. The drawings commands queue 440 can function as memory or storage that is accessible by both the web application container 420 and the remote desktop client adapter 430. The web application container 420 may include an HTTP handler 422 for handling HTTP requests from a web browser and sending HTTP responses back to the client/web browser (e.g., 312 in FIG. 3A or 3B). In one aspect, the HTTP handler 422 is a standard HTTP handler. The drawing commands queue 440 can serve two purposes: holding or storing an off-screen image, e.g., Java bitmap 444, onto which drawing commands are executed; and, serving as a drawing coordinates pool 442, e.g., a queue of coordinates for drawing commands. The coordinates can be those of regions or areas of an image of the remote desktop that need to be redrawn at the client device to reflect changes on the remote desktop. The areas or regions are sometimes referred to as "dirty" regions, as indicated in FIGS. 4A-4B.

In some embodiments, the web application container may include a long polling handler module, which includes a long polling handler 424 and a drawing requests queue 426. The long polling handler 424 can operate with drawing requests queue 426. The drawing requests queue 426 can function to store incoming long polling drawing requests received from the client (e.g., HTML5 compatible web browser such as web browser 312 in FIG. 3A or 3B) via the long polling handler 424 and respond to them when there are pending drawing commands from the drawing commands queue 440. In one aspect, pending drawing commands may include coordinates for the image in dirty coordinates pool 442 and/or an image (e.g., Java bitmap 444) in the drawing commands queue 440.

In operation, the web application container 420 may receive and respond to HTTP requests from a web browser on a user device (e.g., 202 in FIG. 2A or 310 in FIG. 3A or 3B). The web application container 420 may provide user input requests to the remote desktop client adapter 430, which provides a common interface between the web application container 420 and the remote desktop client 432. The remote desktop client adapter 430 may translate user input information (e.g., mouse, keyboard, and touch events) into respective remote desktop input calls for the remote desktop client 432. The remote desktop client adapter 430 may translate the drawing commands (e.g., GDI drawing commands) of an image of a remote desktop received from a remote machine (e.g., 204 in FIG. 2A or 2B or 320 in FIG. 3A or 3B) via a remote desktop display protocol and the remote desktop client 432, into Java graphics drawing commands.

After receiving and translating the drawing commands from the remote desktop client 432, the remote desktop client adapter 430 may draw into an off-screen Java bitmap stored in the drawings commands queue 440 as shown. More specifically, the remote desktop client adapter 430 may provide as an image the portion, also referred to as the "dirty region(s)" of the remote desktop affected by the user's input from the user device. Along with the drawing commands, the remote desktop client adapter 430 may extract, from the drawing command(s), coordinates of the dirty region(s) from the remote desktop client and provide the drawing coordinates to the drawing commands queue 440 (e.g., dirty coordinates pool 442), as indicated. As explained later, the coordinates can be placed into an HTTP header section (e.g., by HTTP handler 422) to send dirty region coordinates (e.g., as cookie), along with an image, to a browser (e.g., 312 in FIG. 3A or 3B) for display.

In the event there are new drawing coordinates in the drawing commands queue 440 (e.g., in the dirty coordinates pool 442), drawing commands queue 440 may send a notification to the drawing requests queue 426 so that any pending request in the drawing requests queue 426 can be forwarded to the HTTP handler 422 for serving. The HTTP handler 422 may then reach to the drawing commands queue 440 (e.g., dirty coordinates pool 442), and obtain the dirty coordinates from the dirty coordinates pool 442. The HTTP handler 422 may then place the dirty coordinates into an HTTP header section (known as a cookie). In addition, according to those coordinates, the HTTP handler 422 may obtain an image portion from the Java off-screen bitmap 444. The HTTP handler 422 may then send the image (e.g., as a JPEG image or a PNG image) as well as the coordinates, which are stored in an HTTP response header section, to the web browser (e.g., 312 in FIG. 3A or 3B) for display at the user device's display (e.g., 313 in FIG. 3A or 3B). As a result, the transcoding server 400A can facilitate a remote desktop session between a user device (e.g., 202 in FIG. 2A or 2B or 310 in FIG. 3A or 3B) and a remote machine (e.g., 204 in FIG. 2A or 3B or 320 in FIG. 3A or 3B) without the need for the user device to utilize proprietary plug-ins or protocols.

In one aspect, an image (or an image file) and drawing coordinates sent by a transcoding server to a web browser may be considered as an example of web browser drawing updates. In a preferred aspect, web browser drawing updates are compatible with the web browser so that the web browser can recognize the web browser drawing updates and process them to display an image at the appropriate location on a display. Web browser drawing updates may be implemented with other types of drawing data and commands.

In one aspect, an HTTP protocol (the requests of which may be handled with an HTTP handler and a long polling handler) between a client device and a transcoding server is a pull protocol, and a remote desktop display protocol utilized between a transcoding server and a remote machine is a push protocol.

Long polling is a modification of the traditional polling technique and can allow emulation of an information push from a server to a client. With long polling, the client requests information from the server in a similar way to a normal poll. In the event the server does not have any information available for the client, instead of sending an empty response, the server holds the request and waits for some information to be available. Once the information becomes available (or after a suitable timeout), a complete response is sent to the client. The client can then immediately re-request information from the server, allowing the server to almost always have an available waiting request that it can use to deliver data in response to an event.

FIG. 4B is a conceptual block diagram of an alternate transcoding server 400B according to certain aspects of the present disclosure. Transcoding server 400B is similar to transcoding server 400A of FIG. 4A with similar drawing numbers, except a separate image conversion or generation block 428 is shown. Block 428 may function to take the Java bitmap 444 from the drawing commands queue 440 and convert it to an image file, e.g., JPEG, BMP, PNG, or the like, and provide the image file to the HTTP handler 422 so that the HTTP handler 422 can send the image file along with the associated coordinates to the web browser (e.g., 312 in FIG. 3A or 3B). An additional difference is that the remote desktop client 432 is shown as a separate module/functional block relative to the remote desktop client adapter 430.

FIG. 4C is a conceptual block diagram of an image 400C of a remote desktop of a remote machine. The image 400C can include the entire desktop of the remote machine. The image may be provided by a remote desktop client, e.g., 432 in FIG. 4A or 4B, as part of a remote desktop drawing command for a remote desktop session with a remote machine. A suitable remote desktop display protocol may be used for the remote desktop session. Examples can include, but are not limited to, the Microsoft® Remote Desktop Protocol (RDP), personal computer over internet protocol (PCoIP), remote FX (RFX) protocol, remote framebuffer (RFB) protocol, Citrix independent computing architecture (ICA), NX protocol, and/or other suitable remote desktop display protocols. In one example, it may be advantageous to use the RDP (which is a push-type protocol) as it is widely used. As shown, image 400C can include regions that have changed, e.g., image portion 450 and image portion 452, relative to a prior instance of the image of the desktop. Both image portions 450 and 452 can be provided, along with their coordinates, in a drawing command from an associated remote desktop server to an associated remote desktop client (to be processed and translated and then to be sent to a web browser by a transcoding server) for a remote desktop session. Alternatively, image portion 450 may be provided in a drawing command with its coordinates, and then image portion 452 may be provided in another drawing command with its coordinates separately (e.g., sequentially). Thus, when only a portion of the remote desktop has changed, then only the changed portion can be provided from a remote desktop server to its remote desktop client, instead of providing the entire image of the remote desktop to reduce traffic and improve efficiency.

FIG. 5 is a conceptual block diagram and image of a web browser 500 according to certain aspects of the present disclosure as used in conjunction with a transcoding server (e.g., 208 in FIG. 2A or 2B, 330 in FIG. 3A or 3B, 400A in FIG. 4A, or 400B in FIG. 4B) and a remote machine (e.g., 204 in FIG. 2A or 2B, or 320 in FIG. 3A or 3B). In a preferred aspect, web browser 500 may be an HTML5 compatible web browser. In one aspect, web browser 500 may be web browser 312. Web browser 500 can include a script client code 520, for example, a JavaScript client code, and a canvas 530 (e.g., an object or element in memory supporting 2D drawing or rendering). The script client code 520 may refer to a script client 314 in FIG. 3A or 3B. The canvas 530 can include or represent the entire viewable window (e.g., 130 of FIG. 1) of the browser (e.g., 312, 500). In a preferred aspect, the canvas 530 is an HTML5 compatible canvas, e.g., a canvas element according to the HTML5 specification. Examples of suitable web browsers can include, but are not limited to, Mozilla Firefox, Google Chrome, Safari, and Opera. Web browser 500 may be resident on a suitable user device such as a PC or smartphone or the like.

The script client code 520 can include an input listener 522 responsive to user inputs such as mouse, keyboard, and touch events. The input listener 522 can send HTTP requests with the user inputs to a transcoding server, e.g., server 208 in FIG. 2A or 2B or 330 of FIG. 3A or 3B. The script client code 520 may also include a load image function or module 524 that includes an image onload handler 526, which may extract drawing coordinates from the HTTP header (e.g., from the portion known as a cookie), draw the received image onto canvas 530, and call the load image function 524 again, passing it its unique identification (ID). An image on error handler and/or image on abort handler 528 may also be included in the load image function 524 to handle loading errors. The handler 528 may call the load image function 524. For remote desktop sessions, the canvas 530 can hold an image of the remote desktop of the remote machine, e.g., 132 of FIG. 1, and the user device may display the image onto a display (e.g., 313 in FIG. 3A or 3B) in the viewable window 130 of the browser (e.g., 312, 500).

As mentioned previously, an HTML5 compatible browser can be used for exemplary embodiments of the present disclosure. HTML5 includes (or supports) a canvas, which allows for dynamic, real-time, scriptable rendering of 2D shapes and bitmap images. In one aspect, being scriptable can mean or include reference to utilizing JavaScript for rendering a 2D image. The canvas 530 consists of a drawable region defined in HTML code with height and width attributes. JavaScript code may access the canvas region or area through a full set of drawing functions similar to other common 2D APIs, thus allowing for dynamically generated graphics.

In operation, such as accessing a remote machine (e.g., 204 in FIG. 2A or 2B or 320 in FIG. 3A or 3B)) during a remote desktop session, the input listener 522 may relay user inputs to the related transcoding server (e.g., 208 in FIG. 2A or 2B or 330 in FIG. 3A or 3B), which interfaces with the remote machine by way of a remote desktop client and remote desktop client adapter (e.g., 350 in FIG. 3A or 3B or 430 in FIG. 4A or 4B). The script client code 520 can also send a number of drawing requests, as indicated by LoadImage(1)-LoadImage(4). As described previously, the drawing requests can be handled by the related transcoding server as long polling requests.

When drawing commands are received from the remote desktop server via the remote desktop client, the transcoding server may create/modify an off-screen image of the remote desktop and provide the actual image and related coordinates to the browser 500, where the JavaScript client's image onload handler (e.g., 528) can then draw the image 532 to the canvas 530 in accordance with the coordinates extracted from the HTTP header (e.g., cookie). In one aspect, the image 532 represents a portion of the entire image of the remote desktop that has been changed, and thus the onload handler can receive and update a portion of the canvas based on the coordinates received (instead of updating the entire canvas).

In one aspect, a bitmap in a transcoding server (e.g., Java off-screen bitmap 444) may include or represent a bitmap of an entire image of a remote desktop (e.g., 132 of FIG. 1). When a portion(s) of the image of the remote desktop is changed (e.g., image portion 450, 452) in response to, for example, a user's input command or other changes by the remote machine, the changed image portion(s) and its remote desktop coordinates may be provided as a remote desktop drawing command(s) to a remote desktop client adapter (e.g., 430) from a remote desktop server (e.g., 322) via a remote desktop client (e.g., 432).

In one aspect, the remote desktop client adapter may translate the remote desktop drawing command(s) into a graphics drawing command(s), generate coordinates (corresponding to the remote desktop coordinates) based on the graphics drawing commands, and provide the coordinates into a pool (e.g., 442). The remote desktop client adapter may execute the graphics drawing command(s) to draw into the bitmap, or stated in another way to generate a bitmap portion(s) to update a portion(s) of the bitmap (e.g., a portion(s) of 444) according to the coordinates generated by the remote desktop client adapter. The updated portion(s) of the bitmap represents the changed image portion(s) of the remote desktop. In a preferred aspect, the updated portion(s) of the bitmap is a portion of a Java off-screen bitmap 444.

In one aspect, an HTTP handler (e.g., 422) may form an image file corresponding to the updated portion(s) of the bitmap, obtain the coordinates (e.g., from 442) for the image file, and place the coordinates into a section of an HTTP header. The HTTP handler may then provide the image file and the coordinates to a web browser (e.g., 312, 500) or more specifically to a script client code (e.g., 520) in a single HTTP response.

A canvas (e.g., 530) may store the entire image of a remote desktop (e.g., 132 of FIG. 1) to be displayed on a display (e.g., 100, 313) and then a portion(s) of the canvas 530 may be updated when a portion(s) of the image of the remote desktop is changed during a remote desktop session. In this example, when the script client code receives an image file and the coordinates corresponding to the changed portion(s) of the image of the remote desktop, the script client code can update a portion of the canvas at canvas coordinates corresponding to the coordinates received from the HTTP handler so that the updated portion of the canvas represents the image contained in the image file.

Because drawing commands provided by a remote desktop client may include only those image portion(s) or region(s) of the remote desktop (with corresponding coordinates) that have been changed or updated relative to previous drawing commands, the image provided to the canvas (e.g., 530) can accordingly be limited or minimized to include just the updated portion(s) of the remote desktop, in exemplary embodiments. The updates on the remote desktop can be due to a user's input (e.g., via a remote desktop session) or caused by the remote machine itself, e.g., a new indicated time from the system clock. Because the size of the image(s) provided to the canvas (e.g., 530) in response to drawing requests can be minimized, the traffic for the remote session can be reduced or minimized, facilitating a real time user experience for a remote desktop session.

In one example, a remote desktop drawing command may comprise a drawing call such as gdi_bitmap (*data, top, left, width, height, 16, 32) in which "*data" may be a pointer to a memory location where the bitmap data is located. The parameters "top, left, width, height" may represent the coordinates for the bitmap data. The parameter "16" may be the number of bits in red-green-blue (RGB), and the parameter "32" may be the number of bits in alpha-red-green-blue (ARGB). Thus, this exemplary call indicates where the bitmap data for a portion of the image of the remote desktop (e.g., the portion that has been changed) is located, the coordinates for the bitmap data, and the number of bits used to convert from an RGB format to an ARGB format.

In another example, a graphics drawing command may comprise a drawing call such as draw-rect (color, top, left, width, height). This drawing call can draw a rectangle at the coordinates specified by "top, left, width, height" using the specified "color."

In one aspect, when long polling is utilized between a client device and a transcoding server that uses HTTP (a pull protocol), traffic to the client device can be reduced to a level experienced by a push-type protocol.

Figure 6:
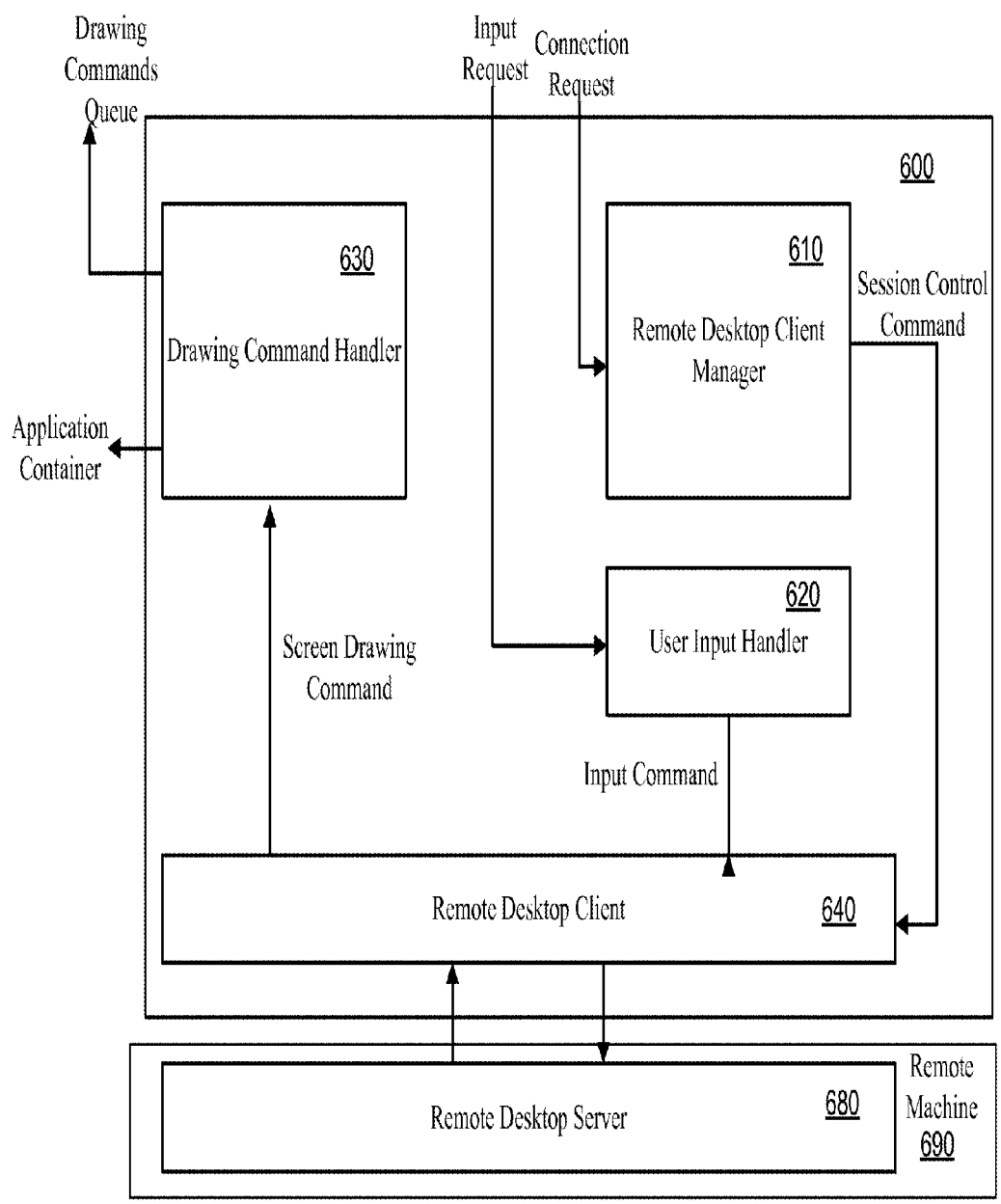
FIG. 6 is a conceptual block diagram of an example of a transcoding server according to certain aspects of the present disclosure.

FIG. 6 illustrates an example of remote desktop client adapter 600, in accordance with various aspects of the subject technology. The remote desktop client adapter 600 facilitates communication between the remote machine 690, which may include a remote desktop server 680, and the rest of the transcoding server components, e.g., the web application container (e.g., 420 in FIG. 4A or 4B) and drawing commands queue (e.g., 440 in FIG. 4A or 4B). In some aspects, a remote desktop client adapter 600 may provide a common interface between remote desktop client (e.g., 352 in FIG. 3A or 3B, 432 in FIG. 4A or 4B, or 640 in FIG. 6) and web application container (e.g., 420 in FIG. 4A or 4B). In some aspects, a remote desktop client adapter 600 may include a drawing command handler 630, a remote desktop client manager 610, a user input handler 620, and remote desktop client 640. In some aspects, a remote desktop client adapter does not necessarily include a remote desktop client 640. Rather, a remote desktop client may be a module separate from remote desktop client adapter (e.g., as shown in FIG. 3B).

According to various aspects of the subject technology, an adapter 600 may include a remote desktop client manager 610, which may be configured to receive a connection request (e.g., an HTTP request specifying a particular remote machine) indirectly from a web browser (e.g., 312 in FIG. 3A or 3B) via a web application container (e.g., 340 in FIG. 3A or 3B or 420 in FIG. 4A or 4B). In some aspects, a connection request may be received from a web browser via a web application container that communicates with the web browser. For example, the connection request can be received from a web browser via an HTTP handler (e.g., 344 or 422) of a web application container. In some aspects, a remote desktop client manager 620 may manage (or facilitate) establishing a remote desktop session between a remote desktop client 640 and a remote desktop server 680 in response to the connection request. For example, a remote desktop client manager 610 may manage (or facilitate) starting the remote desktop session, passing credentials, settings, preferences, etc., to a remote desktop server (e.g., via a remote desktop client), and stopping the remote desktop session.

In one aspect, a remote desktop client manager 610 may receive a connection request, e.g., a request originated from a web browser to establish a connection with remote desktop server (e.g., 322 or 680). In response to the connection request, the remote desktop client manager 610 may generate session control commands that are compatible with the remote desktop client, remote desktop server and the remote desktop display protocol, e.g., session control commands that can be understood and processed by remote desktop client and remote desktop server and that can be transmitted and received by remote desktop client and remote desktop server utilizing the remote desktop display protocol. These session control commands may include a command for starting a remote desktop session, a command for stopping the remote desktop session. The session control commands may further include one or more of credentials, settings, preferences, etc. and command(s) for passing credentials, settings, preferences, etc. to remote desktop server (e.g., 322 or 680). In response to the connection HTTP request, the remote desktop client manager 610 may further provide the appropriate session control command(s), generated by the remote desktop client manager, to the remote desktop client (e.g., 352 or 640). The remote desktop client may then use the session control commands received from the remote desktop client manager 610 to start a remote desktop session with the remote desktop server, pass credentials, settings, preferences, etc., to remote desktop server, and stop the remote desktop session.

In one aspect, a remote desktop client manager 610 can translate a connection request that is not compatible with a remote desktop client, a remote desktop server, or a remote desktop display protocol (e.g., that cannot be understood or processed by a remote desktop client, a remote desktop server or a remote desktop display protocol) into session control commands that are compatible with the remote desktop client, the remote desktop server and the remote desktop display protocol (i.e., that can be understood and processed by remote desktop client and remote desktop server and that can be communicated between remote desktop client and remote desktop server utilizing the remote desktop display protocol).

In some aspects, facilitating an establishment of a remote desktop session, between a remote desktop client and a remote desktop server, comprises generating a session control command based on the initial HTTP request. In some aspects, facilitating an establishment of the remote desktop session comprises transmitting the session control command from a remote desktop client manager 610 to a remote desktop client 640 and then from the remote desktop client to a remote desktop server 680. For example, the session control command may be transmitted to the remote desktop server 680 via the remote desktop client 640 that communicates with remote desktop server 680 using a remote desktop display protocol. In some aspects, the remote desktop display protocol comprises at least one of the Microsoft® Remote Desktop Protocol (RDP), personal computer over internet protocol (PCoIP), remote FX (RFX) protocol, remote framebuffer (RFB) protocol, independent computing architecture (ICA), NX protocol, and other suitable remote desktop display protocols. In some aspects, the RFB protocol comprises virtual network computing (VNC).

According to certain aspects of the subject technology, a server such as server 208, 330, 400A, 400B (e.g., via a remote desktop client manager 610) can maintain open connections between its remote desktop client and one or more remote desktop servers at all times, allowing single or multiple client devices to be interactively connected and disconnected to remote desktop sessions instantly. In some aspects, remote desktop sessions may never need to be disconnected from the one or more remote desktop servers, as a server can maintain active connections to the one or more remote desktop servers. Of course, a remote machine (e.g., 690) may go down for reasons that are outside of a related transcoding server's control; however, the connection can be maintained as long as the remote machine is available for remote access. For example, a remote desktop client manager 610 may continuously maintain the remote desktop session until the remote desktop server disconnects from the remote desktop session depending on the remote desktop server's idle remote connection settings. In some aspects, remote desktop sessions established utilizing a remote desktop client manager 610 may be resized and adjusted for best display and user experience to utilize the full capability of the client devices.

According to various aspects of the subject technology, a user input handler 620 may receive an input request indirectly from a web browser such as a server 208, 330, 400A, 400B (e.g., via an HTTP handler 344 or 422), and convert the input request into a format recognized by and/or compatible with remote desktop client 640 and remote desktop server 680. For example, user input handler 620 receives an input request that was transmitted utilizing a request-response protocol from web browser. In preferred aspects, the request-response protocol may comprise hypertext transfer protocol (HTTP). In another aspect, the request-response protocol may comprise other suitable request-response protocols. In some aspects, the input request is received from a web browser (e.g., 312 in FIG. 3A or 3B) via a web application container (e.g., 340 420) that communicates with the web browser. For example, the input request is received via an HTTP handler (e.g., 344 or 422) of a web application container. In some aspects, the input request comprises at least one of a mouse event, a keyboard event, and a touch event. User input handler 620 may translate the input request that is in a format suitable for or compatible with the request-response protocol into an input command (e.g., a remote desktop display protocol input command) that is suitable for or compatible the remote desktop display protocol. The user input handler 620 may transmit the input command to a remote desktop client 640, which may transmit the input command to a remote desktop server 680. For example, user input handler 620 may facilitate transmitting the input command to remote desktop server 680 via remote desktop client 640 that communicates with remote desktop server 680 using the remote desktop display protocol. In one aspect, an input request is sometimes referred to as a user input command and vice versa. Please note, however, if an input request is referred to as an input command when it is received via HTTP, it is a HTTP request rather than a command. In one aspect, an input command is sometimes referred to as an input call or a remote desktop input command and vice versa.

A remote machine 690 (e.g., its remote desktop server 680) may execute one or more actions based on the input command and send drawing data, as a result of the executed one or more actions, to a server such as a transcoding server 208, 330, 400A or 400B (e.g., a remote desktop client 620 of the server). According to various aspects, a remote desktop client 640 can receive a screen drawing command transmitted from a remote machine 690 (e.g., its remote desktop server 680) utilizing the remote desktop display protocol, in response to the input command transmitted to remote machine 690 (e.g., its remote desktop server 680). In one aspect, a screen drawing command received from a remote machine may be sometimes referred to as a drawing command, a remote machine drawing command, or a remote desktop drawing command received from a remote machine and vice versa. The drawing command handler 630 may then receive the screen drawing command from the remote desktop client 640 connected to the remote machine 690. For example, a drawing command handler 630 can receive the screen drawing command from a remote machine 690 (e.g., its remote desktop server 680) via a remote desktop client 640 that communicates with the remote machine 690 (e.g., its remote desktop server 680) using the remote desktop display protocol.

According to certain aspects, a drawing command handler 630 may convert a screen drawing command into a format recognized by and/or compatible with a web browser (e.g., 312 in FIG. 3A or 3B). For example, a drawing command handler 630 may translate a screen drawing command that is suitable for or compatible with a remote desktop client, a remote desktop server and a remote desktop display protocol, into a graphics drawing command that is compatible with the server 208, 330, 400A or 400B, such as a Java graphics (abstract window toolkit) API command when the server is a Java transcoding server. In some aspects, translating the screen drawing command can include calculating new, and/or adjusting received drawing command parameters, and/or making adjustments to the received bitmap data, such as, but not limited to, converting the 16-bit red-green-blue (RGB) 5-6-5 color format into a 32-bit alpha-red-green-blue (ARGB) 8-8-8-8 format. In some aspects, drawing command handler 630 may execute the graphics drawing command (e.g., Java graphics API command) to draw into an already created image bitmap, (e.g., the off-screen Java bitmap 444) of the drawing commands queue (e.g., 360 in FIG. 3A or 3B, or 440 in FIG. 4A or 4B) at the transcoding server (e.g., 330 in FIG. 3A or 3B, 400A in FIG. 4A, or 400B in FIG. 4B). In one aspect, Java graphics API command is sometimes referred to as Java graphics command or Java graphics drawing command. In one aspect, the off-screen bitmap may be a storage or memory location that is a part of a drawing commands queue (e.g., 360 or 440) accessible by an application container (e.g., 340 or 420). In one aspect, the size of an off-screen bitmap may represent the size of a remote session. Stated in another way, the size of an off-screen bitmap may represent the size of the remote desktop, or an off-screen bitmap may be a bitmap representation of an entire image of a remote desktop.

Preferred embodiments of the present disclosure may, in essence, translate a request in HTTP to a command in a remote desktop display protocol and vice versa (e.g., translate requests/responses transmitted/received via HTTP to commands transmitted/received via a remote desktop display protocol, and vice versa) for a remote session between a client device and a remote machine. For example, the input request from the web browser such as a server 208, 330, 400A, 400B may be translated into the input command (e.g., a remote desktop input command) that is suitable for or compatible with the remote desktop display protocol and is received by remote desktop server 680 via remote desktop client 640. The screen drawing command transmitted from the remote machine 690 (e.g., in response to the input command) utilizing the remote desktop display protocol may be translated into the graphics drawing command that is compatible with the server 208, 330, 400A or 400B, such as a Java graphics (abstract window toolkit) API command. In some aspects, HTTP is a pull protocol while a remote desktop display protocol may be a push protocol. In some aspects, a drawing command in push protocol may be translated into a drawing update (or a drawing response) in pull protocol during a remote session between a client device and a remote machine.

With continued reference to FIG. 6, a drawing command handler 630, when drawing into the off-screen bitmap, may transmit pixel data to the off-screen bitmap. In some aspects, the pixel data is used to update a portion of the off-screen bitmap (e.g., an off-screen Java bitmap). In some aspects, a drawing command handler 630 may transmit the pixel data to the off-screen bitmap so that the updated portion of the off-screen bitmap may be stored and/or converted to an image file.

According to certain aspects, a drawing command handler 630 can generate one or more coordinates corresponding to the updated portion of the off-screen bitmap (e.g., an image drawn into the off-screen bitmap when the graphics drawing command is executed). For example, the one or more coordinates may identify the locations where the corresponding image bitmap is to be executed on the canvas of a web browser. In one example, the one or more coordinates may be extracted or copied from the graphics drawing command. A drawing command handler 630 may also transmit the one or more coordinates to a dirty coordinates pool 442 in FIG. 4A or 4B that is a part of a drawing commands queue (e.g., 360 or 440). In some aspects, a drawing command handler 630 may transmit the one or more coordinates to the dirty coordinates pool so that the one or more coordinates may be stored in the dirty coordinates pool. Thus, a drawing command handler 630 may update "dirty" region coordinates in the drawing commands queue. In some aspects, a drawing command handler 630 may transmit a notification signal to a drawing requests queue (e.g., 426 in FIG. 4A or 4B) of a web application container (e.g., 420). In some aspects, the notification signal/message may indicate that the that the image bitmap (e.g., the off-screen Java bitmap) has been updated.

Figure 7:
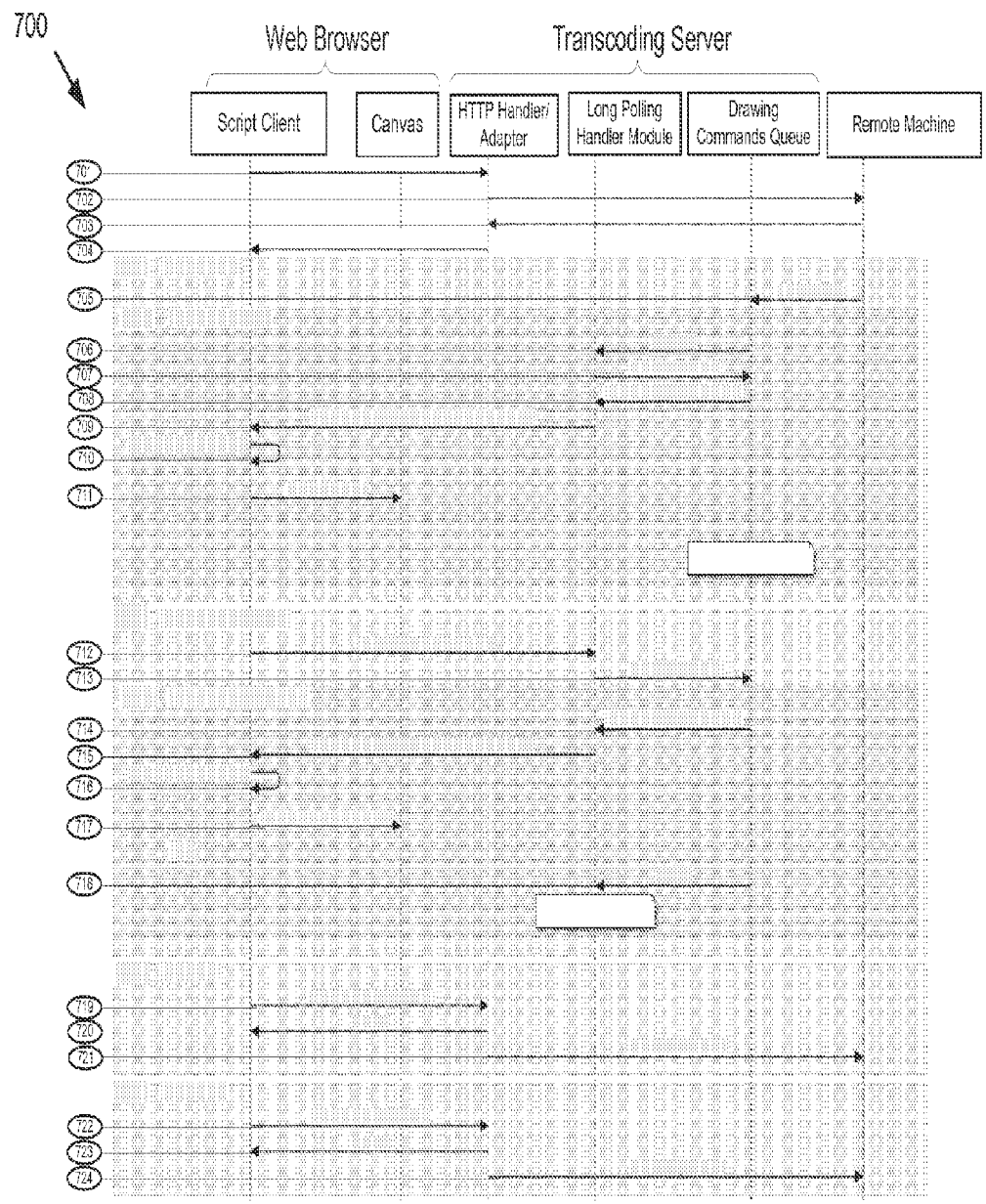
FIG. 7 is an example of a sequence diagram of the interactions between a transcoding server as used in conjunction with a web browser and a remote machine.

FIG. 7 is a sequence diagram 700 of the interactions between a transcoding server (e.g., 208, 330, 400A or 400B) as used in conjunction with a web browser (e.g., 312) and a remote machine (e.g., 204, 320 or 690), according to certain aspects of the present disclosure. The sequences are shown as 701-724. As shown at 701, a web browser can send an initial HTTP request to a transcoding server (e.g., transcoding server 400A of FIG. 4), for example, to its HTTP handler (e.g., 422). The initial HTTP request can include a URL that specifies a desired remote machine. At 702 and 703, the transcoding server can facilitate establishing a remote desktop connection with the remote machine (e.g., its remote desktop server). At 704, the transcoding server also can provide a client code, e.g., JavaScript client code, to the web browser. The JavaScript client code in the web browser can generate a number of drawing requests, which can be handled by the transcoding server as long polling requests. In exemplary embodiments, four drawing requests may be pending at any one time although the number can be selected as desired and optimized for different implementations.

As shown at the bottom of the diagram, e.g., at 719 and 722, the web browser can provide user input requests (as HTTP requests) to the transcoding server, which in turn, e.g., at 721 and 724, can provide the user input commands to the remote machine, e.g., for control of the remote desktop of the remote machine. At 705, the remote machine can provide drawing commands (one command is shown) to the drawing commands queue (e.g., 360 or 440) in the transcoding server by way of the remote desktop client adapter (e.g., 350, 430 or 600), which draws a corresponding image of the remote desktop into the off-screen bitmap in the drawing commands queue. In response to the drawing command, the drawing commands queue can provide, at 706, notification to the drawing requests queue (e.g., 426) in the long polling handler module (e.g., 342) of the transcoding server. In response, the first pending drawing request can be taken from the drawing requests queue and provided to the HTTP handler. In response, at 707 and 708, the HTTP handler may obtain the image from the drawing commands queue. At 709, the HTTP handler may provide the image and corresponding coordinates in a response sent to the script client (e.g., 314 or 520, or more specifically 526) of the web browser. The script client may then, at 711, draw the image (e.g., 532) to the canvas (e.g., 316 or 530) using the appropriate coordinates, extracted from the cookie, for displaying the remote desktop in the web browser.

In one aspect, an HTTP handler (e.g., 422) is a standard HTTP handler in that when it receives a request from a web browser, it responds without waiting or storing the request. For example, when an HTTP handler receives a user input request as a HTTP request at 719 or 722 from a web browser, the HTTP handler responds immediately with a null response at 720 and 723, respectively (while the request is sent to the remote machine via a remote desktop client adapter). In one aspect, a long polling handler (e.g., 424) may be used to receive a request and respond to it based on an event, and a long polling request may be stored. For example, under one condition (e.g., a drawing command is pending), then the request is responded immediately (e.g., the polling handler sends the drawing request to the HTTP handler so that the HTTP handler can send a response to the drawing request immediately. Under another condition (e.g., a drawing command is not pending), then the request may be stored away (e.g., into a drawing requests queue) until a condition is satisfied (e.g., a new drawing command has arrived at a drawing commands queue).

In one aspect, a remote desktop is a desktop of a remote machine. In one aspect, during a remote desktop session with a remote machine, a web browser of a client device may access, control and/or view any or all applications and files resident on the remote machine. In another aspect, during a remote desktop session with a remote machine, depending on the user's credentials and settings, a web browser may be allowed to access, control and/or view some of the applications and files resident on the remote machine.

In one preferred aspect, each of a client device, a transcoding server, and a remote machine is a separate and distinct machine that is remote from one another. In one aspect, a transcoding server may be a machine that can communicate with one or more client devices and one or more remote machines, and a transcoding server may be a machine that can communicate over a web. In one aspect, a web browser may be an application that allows a user to retrieve, present or communicate information over a web.

Figure 8:
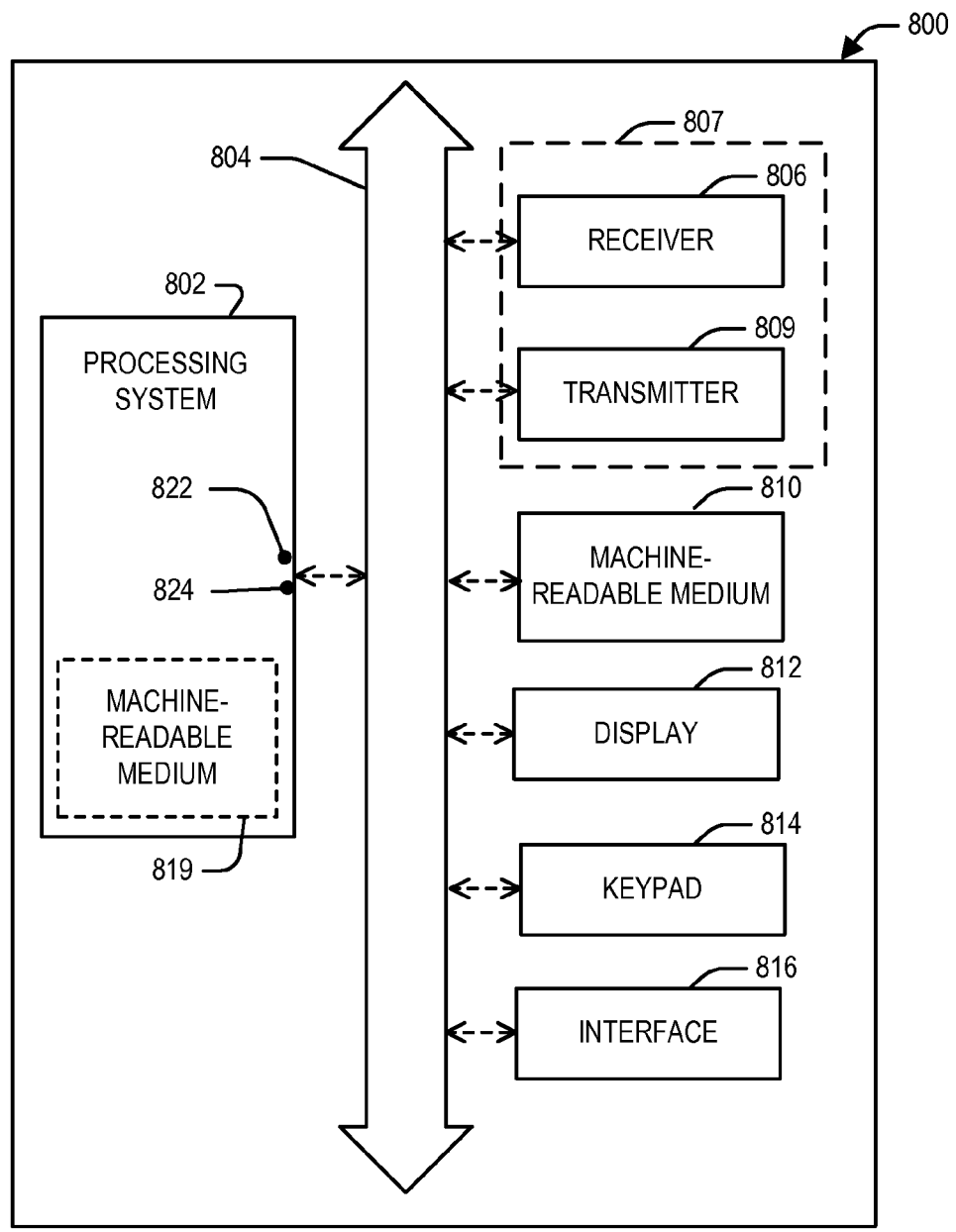
FIG. 8 is a block diagram that illustrates an exemplary computing system.

FIG. 8 is a conceptual block diagram illustrating an example of a computing system 800 useful for embodiments of the present disclosure. System 800 may be, for example, a client device (e.g., 202 or 310), a server (e.g., 208, 330, 400A or 400B) or a remote machine (e.g., 204, 320 or 690). The system 800 may include a processing system 802. The processing system 802 is capable of communication with a receiver 806 and a transmitter 808 through a bus 804 or other structures or devices. It should be understood that communication means other than busses can be utilized with the disclosed configurations. The processing system 802 can generate audio, video, multimedia, and/or other types of data to be provided to the transmitter 809 for communication. In addition, audio, video, multimedia, and/or other types of data can be received at the receiver 806, and processed by the processing system 802.

The processing system 802 may include a general-purpose processor or a specific-purpose processor for executing instructions and may further include a machine-readable medium 819, such as a volatile or non-volatile memory, for storing data and/or instructions for software programs. The instructions, which may be stored in a machine-readable medium 810 and/or 819, may be executed by the processing system 802 to control and manage access to the various networks, as well as provide other communication and processing functions. The instructions may also include instructions executed by the processing system 802 for various user interface devices, such as a display 812 and a keypad 814. The processing system 802 may include an input port 822 and an output port 824. Each of the input port 822 and the output port 824 may include one or more ports. The input port 822 and the output port 824 may be the same port (e.g., a bi-directional port) or may be different ports.

The processing system 802 may be implemented using software, hardware, or a combination of both. By way of example, the processing system 102 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 819) may include storage integrated into a processing system, such as might be the case with an application specific integrated circuit (ASIC). Machine-readable media (e.g., 810) may also include storage external to a processing system, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 802. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. Instructions may be executable, for example, by a client device, a server, a remote machine, or by a processing system of a client device, a server, or a remote machine. Instructions can be, for example, a computer program including code.

An interface 816 may be any type of interface and may reside between any of the components shown in FIG. 8. An interface 816 may also be, for example, an interface to the outside world (e.g., an Internet network interface). A transceiver block 807 may represent one or more transceivers, and each transceiver may include a receiver 806 and a transmitter 809. A functionality implemented in a processing system 802 may be implemented in a portion of a receiver 806, a portion of a transmitter 809, a portion of a machine-readable medium 810, a portion of a display 812, a portion of a keypad 814, or a portion of an interface 816, and vice versa.

Figure 9A:
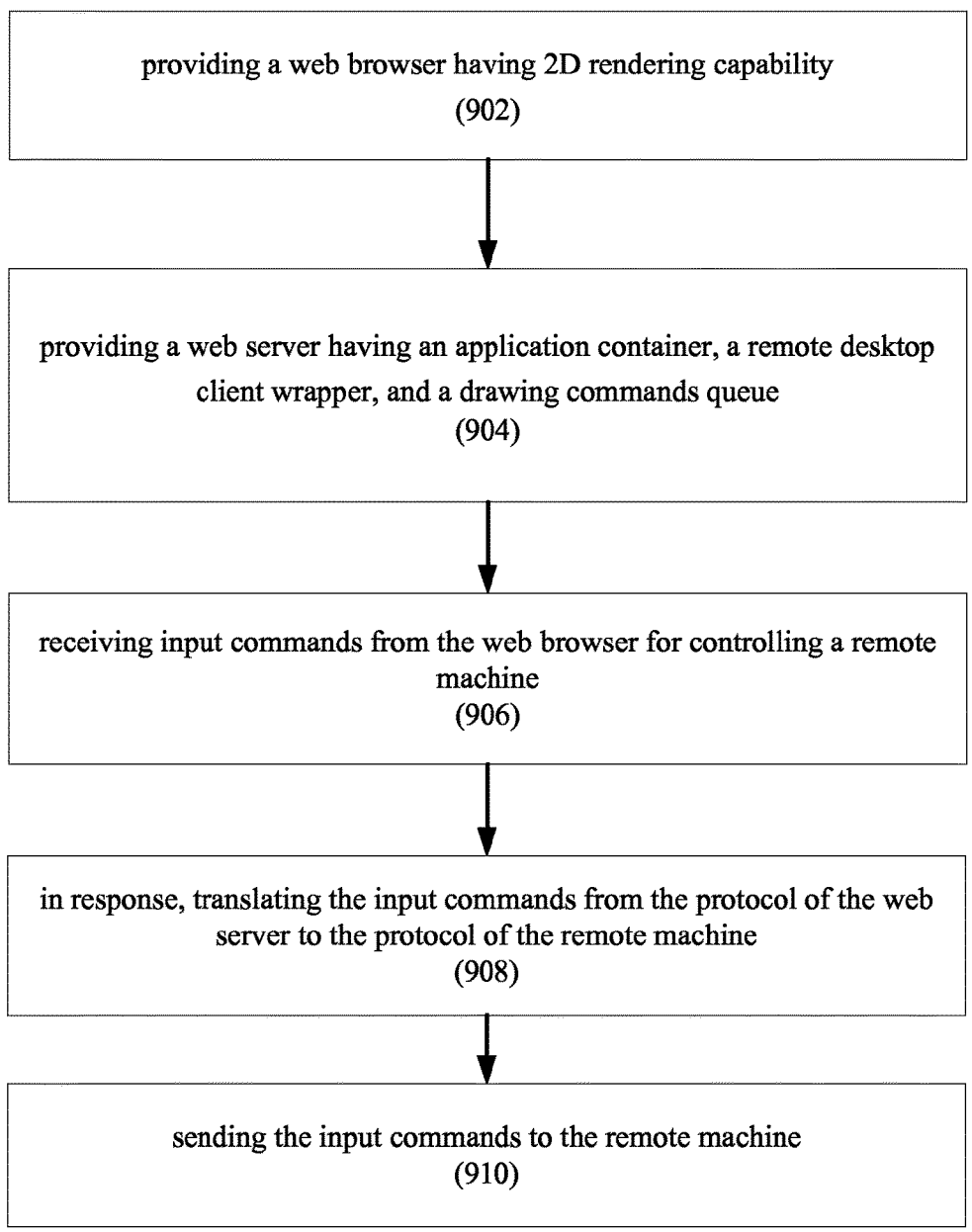
FIG. 9A illustrates a block diagram representing an example of a method of accessing and controlling a remote desktop from a user device.
Figure 9B:
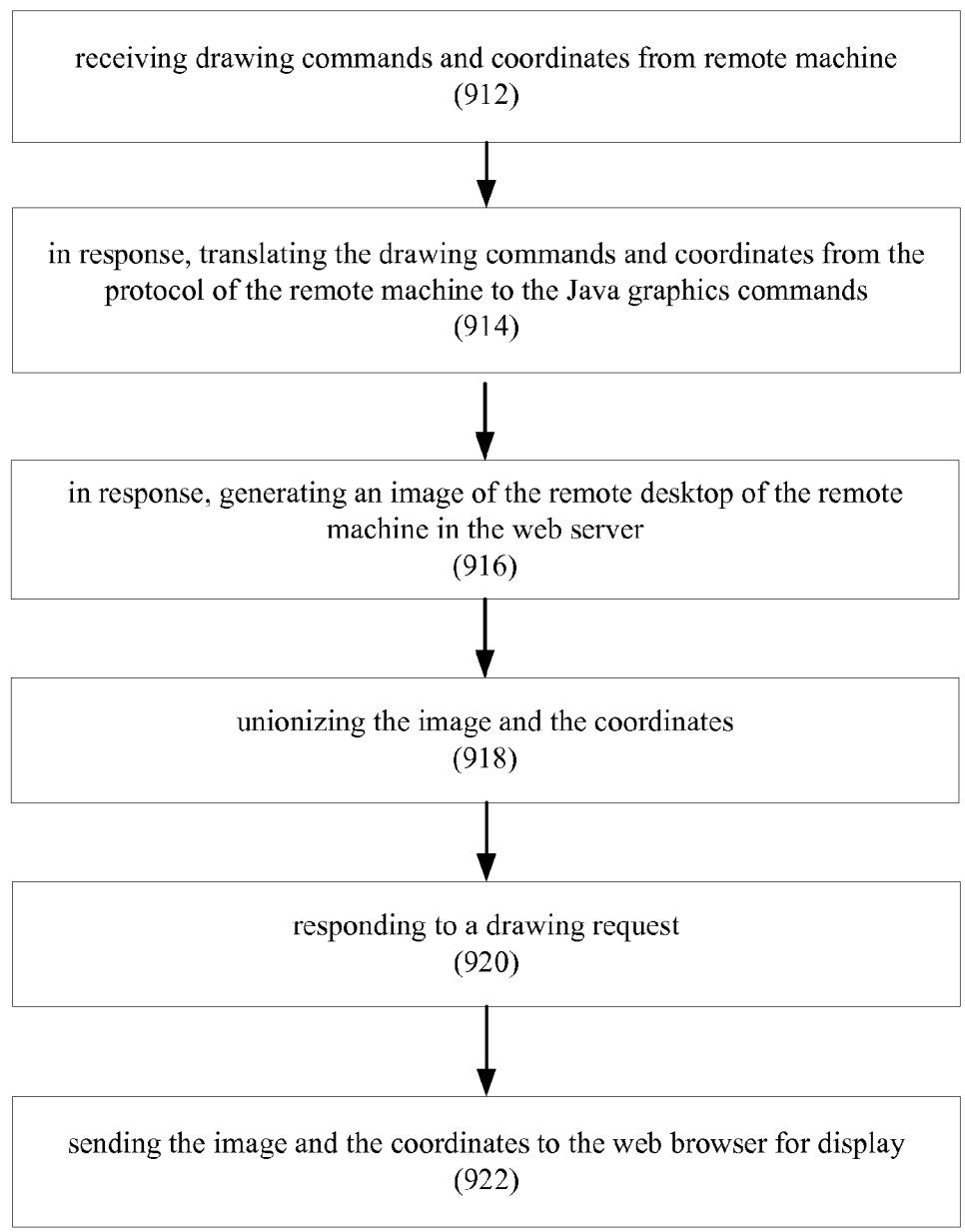
FIG. 9B illustrates a continuation of the FIG. 9A.

FIG. 9A illustrates a block diagram representing a method 900 of accessing and controlling a remote desktop from a web browser (e.g., 312 or 500) via a transcoding server (e.g., 208, 330, 400A or 400B) according to certain aspects of the present disclosure. FIG. 9B illustrates a continuation of the method 900. For method 900, a web browser having 2D rendering capabilities, e.g., an HTML5 compatible web browser, is provided, as described at 902. Input requests can be received at the transcoding server for controlling the remote desktop, as described at 906. The input requests can be translated from the protocol of the web browser, e.g., preferably HTTP, into the protocol of the remote desktop server associated with the remote desktop, as described at 908. The input commands can then be provided to the remote machine (which may include a remote desktop server) as described at 910.

Referring to FIG. 9B and continuing with the description of method 900, drawing commands and coordinates, e.g., of dirty regions, can be received by the transcoding server from the remote desktop server, as described at 912. In response, the drawing commands and coordinates can be translated from the protocol of the remote desktop server to the protocol of the web browser, as described at 914. The transcoding server can respond by drawing or generating an image of the remote desktop, as described at 916. The image and the corresponding coordinates can be linked or unionized, as described at 918. A drawing request from the web browser can be responded to, as described at 920, by sending the image and coordinates to the web browser for display, as described at 922. Accordingly, method 900 may be used for controlling and accessing a remote desktop session via HTTP, and such control can be in real-time.

An exemplary embodiment of a method of accessing and controlling a remote desktop of a remote machine (e.g., 204, 320 or 690) from a web browser (e.g., 312 or 500) via a transcoding server (e.g., 208, 330, 400A or 400B) may include the following three steps: step one can happen once, at the beginning of a session; and steps two and three can continue interchangeably during the remote desktop session.

The first step can include an initial HTTP request by the web browser (e.g., a connection request to connect to a remote machine). For example, an initial HTTP request is sent by the web browser, preferably an HTML5 compatible browser. The web browser receives back a response, which can contain a script client such as 314 or 500, e.g., JavaScript Ajax client code. The transcoding server (e.g., Java transcoding server) can use the connection request to establish a connection to a remote machine via a remote desktop client. A remote desktop client on or used with the Java transcoding server can establish the connection to a remote machine, which utilizes a remote desktop display protocol. The transcoding server can function to interface between the HTTP protocol and the remote desktop display protocol. In one aspect, between the web browser and the transcoding server, there is no connection, as HTTP is a connectionless protocol. Instead, there are only separate requests and responses in HTTP protocol.

The second step is remote session drawing at the web browser: On the browser side, the client JavaScript code can continuously re-send a number of, e.g., four asynchronous (Ajax) HTTP requests to find out if there are any "dirty" regions of the remote desktop of the remote machine to (re)draw. On the Java transcoding server, these drawing requests are handled as long polling requests, meaning that they will be responded to only if there is data to be drawn, otherwise they hang in the drawing requests queue (e.g., 426). Also, on the Java transcoding server, the remote session is drawn into an off-screen Java bitmap in a drawing commands queue of the transcoding server. In addition, the coordinates of the drawing command are also appended or added to the drawing commands queue. This last part also sends a notification to the drawing requests queue of the transcoding server, so that the first waiting request from the drawing requests queue can be served. In HTTP response to the browser, the "dirty" drawing image is sent, together with the drawing coordinates that are stored in one of the HTTP header sections (known as a cookie). On the browser side, the script client receives the "dirty" image and the coordinates, and the script client draws the image into an HTML canvas (e.g., 530) using coordinates from the cookie. This allows the remote session from a remote machine (e.g., an image of the remote desktop of the remote machine) to be drawn, via a Java transcoding server, to the client's HTML5 browser.

The third step involves a user input, such as a mouse click, keystroke, or touch event. On the browser side, the script client detects, e.g., a mouse event, and sends an HTTP request to the transcoding server, passing along the X and Y coordinates of the event. The Java transcoding server receives the request, sends an empty reply (see, e.g., 720 and 723 in FIG. 7) to close the HTTP request, and then via remote desktop client adapter, it forwards this request to the remote desktop client, which sends it via its protocol to the remote machine. These user input requests can be handled in a standard way, i.e., not as long polling events, to receive and process user input. User input can then be sent to the remote machine.

In a preferred aspect, a script client is not installed on the client device. In other words, a script client does not exist (and is not pre-installed) on the web browser or on the client device prior to the first step described above (e.g., prior to the web browser connecting to, or sending a request to connect to, the transcoding server to initiate a remote session with a remote machine). In a preferred aspect, a client device simply needs a web browser to initiate accessing and controlling a remote desktop of a remote machine or to initiate a remote desktop session with the remote machine. Thus, the client device does not need software or a browser plug-in for a remote desktop display protocol. The transcoding server provides the script client in real time to the web browser via HTTP once the web browser requests a connection to a remote machine for a remote desktop session. The web browser's connection to the remote machine is established through the transcoding server, and the script client is deleted from the client device and the web browser when the remote desktop session is terminated or the browser is closed.

Illustration of Method/Apparatus/Machine Readable Storage Medium for Facilitating Accessing and Controlling a Remote Desktop of a Remote Machine in Real Time by a Web Browser at a Client Device Via a Hypertext Transfer Protocol (HTTP) Utilizing a Transcoding Server (Described as Clauses)

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to the figures of the present disclosure, e.g., FIGS. 10A-10C, etc. It is noted that any of the dependent clauses may be combined in any combination, and placed into a respective independent clause, e.g., clauses 1, 11, and 22. The other clauses can be presented in a similar manner.

Figure 10A:
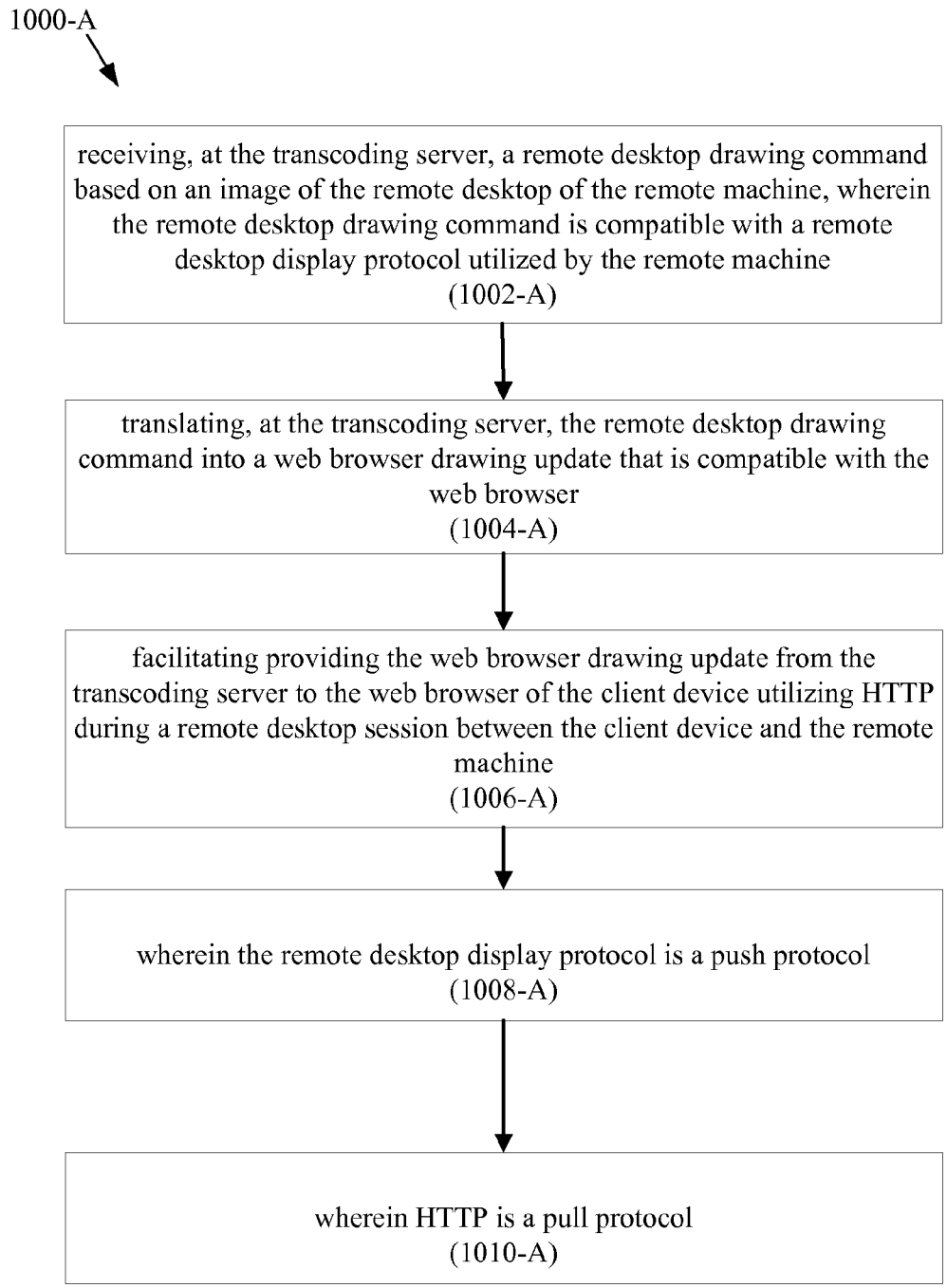
FIG. 10A is a block diagram representing an example of method of facilitating accessing and controlling a remote desktop of a remote machine in real time by a web browser at a client device via a hypertext transfer protocol (HTTP) utilizing a transcoding server.

1. A method (see, e.g., method 1000-A of FIG. 10A) of facilitating accessing and controlling a remote desktop of a remote machine (see, e.g., 320 of FIG. 3A) in real time by a web browser (see, e.g., 500 of FIG. 5) at a client device (see, e.g., 310 in FIG. 3A) via a hypertext transfer protocol (HTTP) utilizing a transcoding server (see, e.g., 330 of FIG. 3A, the method comprising:

receiving, at the transcoding server, a remote desktop drawing command based on an image of the remote desktop of the remote machine, wherein the remote desktop drawing command is compatible with a remote desktop display protocol utilized by the remote machine (see, e.g., item 1002-A in FIG. 10A);

translating, at the transcoding server, the remote desktop drawing command into a web browser drawing update that is compatible with the web browser (see, e.g., item 1004-A in FIG. 10A); and facilitating providing the web browser drawing update from the transcoding server to the web browser of the client device utilizing HTTP during a remote desktop session between the client device and the remote machine (see, e.g., item 1006-A in FIG. 10A), wherein the remote desktop display protocol is a push protocol (see, e.g., item 1008-A in FIG. 10A), wherein HTTP is a pull protocol (see, e.g., item 1010-A in FIG. 10A).

2. The method of clause 1, wherein the web browser drawing update comprises an image file and drawing coordinates for the image file that are recognizable and processable by the web browser.

3. The method of clause 1, wherein the translating comprises:

translating the remote desktop drawing command into a Java graphics drawing command;

updating a portion of a Java bitmap using the Java graphics drawing command, wherein the updated portion of the Java bitmap represents a portion of an entire image of the remote desktop;

creating an image file from the Java bitmap; and generating drawing coordinates for the image file, wherein the web browser drawing update comprises the image file and the drawing coordinates for the image file, wherein the facilitating providing comprises placing the drawing coordinates into an HTTP header, wherein utilizing HTTP comprises using an HTTP handler, wherein the transcoding server is a Java transcoding server that is configured to provide an application framework for hosting one or more web applications.

4. The method of clause 1, wherein the translating comprises:

translating the remote desktop drawing command into a graphics drawing command that is compatible with the transcoding server, wherein the graphics drawing command includes coordinates;

extracting the coordinates from the graphics drawing command;

updating at least a portion of an off-screen bitmap based on the graphics drawing command, wherein the at least a portion of the off-screen bitmap is associated with the coordinates, wherein the off-screen bitmap is based on the image of the remote desktop;

creating an image file based on the at least a portion of the off-screen bitmap; and wherein the web browser drawing update comprises the image file and the coordinates.

5. The method of clause 1, wherein the web browser is an HTML5 compatible web browser.

6. The method of clause 1, further comprising:

receiving a user input request from the web browser, using HTTP;

translating the user input request into an input command compatible with the remote desktop display protocol; and providing the input command to the remote desktop client for accessing and controlling the remote desktop of the remote machine during the remote desktop session, wherein the web browser drawing update comprises an image file and drawing coordinates for the image file that are recognizable and processable by the web browser, wherein the image file and the drawing coordinates represent a portion of an entire image of the remote desktop that has been changed in response to the input command.

7. The method of clause 6, wherein the user input request comprises at least one of a mouse event, a keyboard event, and a touch event.

8. The method of clause 1, wherein the remote desktop drawing command comprises remote desktop drawing command parameters and bitmap data received from a remote desktop server of the remote machine, wherein the translating comprises one or more of: calculating new drawing command parameters based on the remote desktop drawing command parameters; adjusting the remote desktop drawing command parameters; and making adjustments to the bitmap data.

9. The method of clause 1, wherein the remote desktop drawing command comprises remote desktop drawing command parameters and bitmap data received from a remote desktop server of the remote machine, wherein the translating comprises making adjustments to the bitmap data, wherein the making adjustments comprises converting a 16-bit red-green-blue (RGB) 5-6-5 color format into a 32-bit alpha-red-green-blue (ARGB) 8-8-8-8 format.

10. The method of clause 1, wherein the transcoding server is an intermediary between the remote machine and the client device, and wherein the transcoding server is physically separate from the remote machine.

Figure 10B:
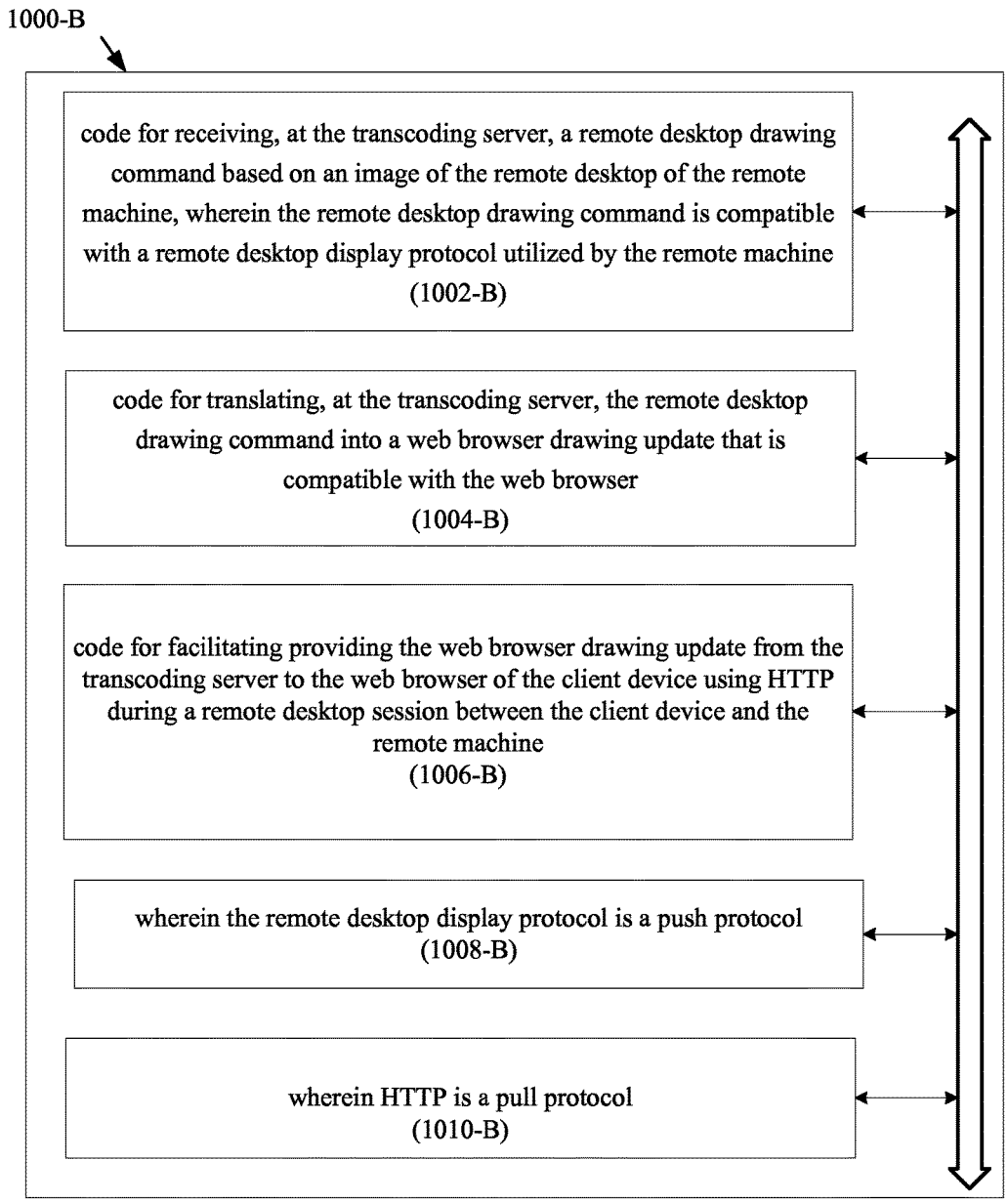
FIG. 10B is a block diagram representing code of an example of a machine-readable storage medium encoded with instructions executable by a processing system to perform a method of facilitating accessing and controlling a remote desktop of a remote machine in real time by a web browser at a client device via a hypertext transfer protocol (HTTP) utilizing a transcoding server.
Figure 10C:
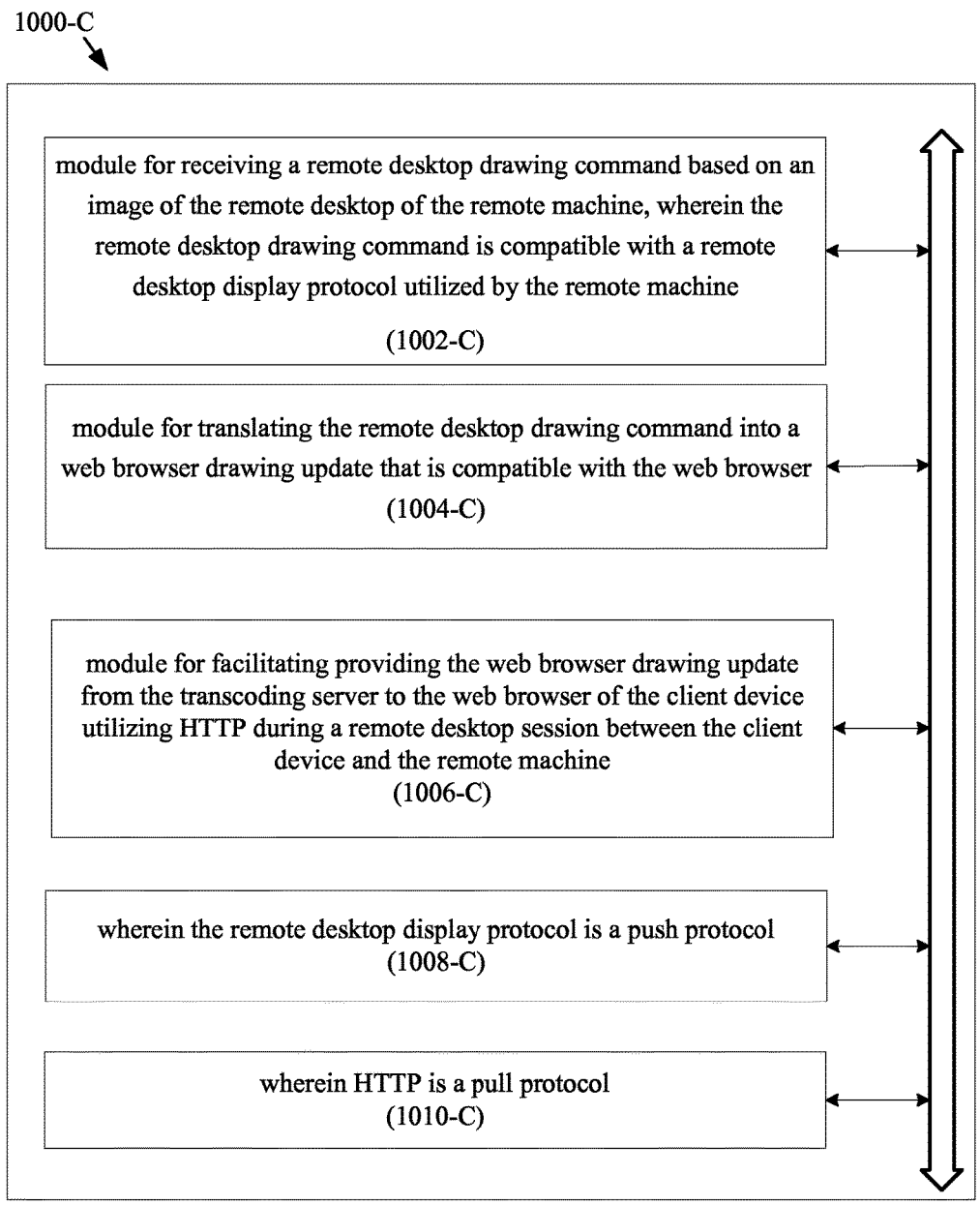
FIG. 10C is a block diagram module of an example of an apparatus for facilitating accessing and controlling a remote desktop of a remote machine in real time by a web browser at a client device via a hypertext transfer protocol (HTTP) utilizing a transcoding server.

11. A machine-readable storage medium (see, e.g., machine-readable storage medium 1000-B of FIG. 10B) encoded with instructions executable by a processing system to perform a method of facilitating accessing and controlling a remote desktop of a remote machine (see, e.g., 320 of FIG. 3A) in real time by a web browser (see, e.g., 500 of FIG. 5) at a client device (see, e.g., 310 of FIG. 3A) via a hypertext transfer protocol (HTTP) utilizing a transcoding server (see, e.g., 330 of FIG. 3A), the instructions comprising code for:

receiving, at the transcoding server, a remote desktop drawing command based on an image of the remote desktop of the remote machine, wherein the remote desktop drawing command is compatible with a remote desktop display protocol utilized by the remote machine (see, e.g., item 1002-B in FIG. 10B);

translating, at the transcoding server, the remote desktop drawing command into a web browser drawing update that is compatible with the web browser (see, e.g., item 1004-A in FIG. 10B); and facilitating providing the web browser drawing update from the transcoding server to the web browser of the client device using HTTP during a remote desktop session between the client device and the remote machine (see, e.g., item 1006-A in FIG. 10B), wherein the remote desktop display protocol is a push protocol (see, e.g., item 1008-A in FIG. 10B), and wherein HTTP is a pull protocol (see, e.g., item 1010-A in FIG. 10B).

12. The machine-readable storage medium of clause 11, wherein the web browser drawing update comprises an image file and drawing coordinates for the image file that are recognizable and processable by the web browser.

13. The machine-readable storage medium of clause 11, wherein the translating comprises:

translating the remote desktop drawing command into a Java graphics drawing command;

updating a portion of a Java bitmap using the Java graphics drawing command, wherein the updated portion of the Java bitmap represents a portion of an entire image of the remote desktop;

creating an image file from the Java bitmap; and generating drawing coordinates for the image file, wherein the web browser drawing update comprises the image file and the drawing coordinates for the image file, wherein the facilitating providing comprises placing the drawing coordinates into an HTTP header, wherein utilizing HTTP comprises using an HTTP handler, wherein the transcoding server is a Java transcoding server that is configured to provide an application framework for hosting one or more web applications.

14. The machine-readable storage medium of clause 11, wherein the translating comprises:

translating the remote desktop drawing command into a graphics drawing command that is compatible with the transcoding server, wherein the graphics drawing command includes coordinates;

extracting the coordinates from the graphics drawing command;

updating at least a portion of an off-screen bitmap based on the graphics drawing command, wherein the at least a portion of the off-screen bitmap is associated with the coordinates, wherein the off-screen bitmap is based on the image of the remote desktop;

creating an image file based on the at least a portion of the off-screen bitmap; and wherein the web browser drawing update comprises the image file and the coordinates.

15. The machine-readable storage medium of clause 11, wherein the web browser is an HTML5 compatible web browser.

16. The machine-readable storage medium of clause 11, wherein the instructions further comprise code for:

receiving a user input request from the web browser, using HTTP;

translating the user input request into an input command compatible with the remote desktop display protocol; and providing the input command to the remote desktop client for accessing and controlling the remote desktop of the remote machine during the remote desktop session;

wherein the web browser drawing update comprises an image file and drawing coordinates for the image file that are recognizable and processable by the web browser; and wherein the image file and the drawing coordinates represent a portion of an entire image of the remote desktop that has been changed in response to the input command.

17. The machine-readable storage medium of clause 16, wherein the user input request comprises at least one of a mouse event, a keyboard event, and a touch event.

18. The machine-readable storage medium of clause 11, wherein the remote desktop drawing command comprises remote desktop drawing command parameters and bitmap data received from a remote desktop server of the remote machine, wherein the translating comprises one or more of: calculating new drawing command parameters based on the remote desktop drawing command parameters; adjusting the remote desktop drawing command parameters; and making adjustments to the bitmap data.

19. The machine-readable storage medium of clause 11, wherein the remote desktop drawing command comprises remote desktop drawing command parameters and bitmap data received from a remote desktop server of the remote machine,
wherein the translating comprises making adjustments to the bitmap data,
wherein the making adjustments comprises converting a 16-bit red-green-blue (RGB) 5-6-5 color format into a 32-bit alpha-red-green-blue (ARGB) 8-8-8-8 format.

20. The machine-readable storage medium of clause 11, wherein the transcoding server is an intermediary between the remote machine and the client device, and wherein the transcoding server is physically separate from the remote machine.

21. A computing machine comprising the machine-readable storage medium of clause 11, wherein the computing machine is the transcoding server.

22. An apparatus for facilitating accessing and controlling a remote desktop of a remote machine (see, e.g., 320 of FIG. 3A) in real time by a web browser (see, 500 of FIG. 5) at a client device (see, e.g., 310 of FIG. 3A) via a hypertext transfer protocol (HTTP) utilizing a transcoding server (see, e.g., 330 of FIG. 3A), the apparatus comprising:
means for receiving a remote desktop drawing command based on an image of the remote desktop of the remote machine, wherein the remote desktop drawing command is compatible with a remote desktop display protocol utilized by the remote machine (see, e.g., item 1002-C in FIG. 10C);
means for translating the remote desktop drawing command into a web browser drawing update that is compatible with the web browser (see, e.g., item 1004-C in FIG. 10C); and
means for facilitating providing the web browser drawing update from the transcoding server to the web browser of the client device utilizing HTTP during a remote desktop session between the client device and the remote machine (see, e.g., item 1006-C in FIG. 10C);
wherein the remote desktop display protocol is a push protocol (see, e.g., item 1008-C in FIG. 10C); and
wherein HTTP is a pull protocol (see, e.g., item 1010-C in FIG. 10C).

23. The apparatus of clause 22, wherein the web browser drawing update comprises an image file and drawing coordinates for the image file that are recognizable and processable by the web browser.

24. The apparatus of clause 22, wherein the means for translating comprises:
means for translating the remote desktop drawing command into a Java graphics drawing command;
means for updating a portion of a Java bitmap using the Java graphics drawing command, wherein the updated portion of the Java bitmap represents a portion of an entire image of the remote desktop;
means for creating an image file from the Java bitmap; and
means for generating drawing coordinates for the image file,
wherein the web browser drawing update comprises the image file and the drawing coordinates for the image file,
wherein the means for facilitating providing comprises means for placing the drawing coordinates into an HTTP header,
wherein utilizing HTTP comprises utilizing an HTTP handler, and wherein the transcoding server is a Java transcoding server that is configured to provide an application framework for hosting one or more web applications.

25. The apparatus of clause 22, wherein the means for translating comprises:
means for translating the remote desktop drawing command into a graphics drawing command that is compatible with the transcoding server, wherein the graphics drawing command includes coordinates;
means for extracting the coordinates from the graphics drawing command;
means for updating at least a portion of an off-screen bitmap based on the graphics drawing command, wherein the at least a portion of the off-screen bitmap is associated with the coordinates, wherein the off-screen bitmap is based on the image of the remote desktop; and
means for creating an image file based on the at least a portion of the off-screen bitmap;
wherein the web browser drawing update comprises the image file and the coordinates.

26. The apparatus of clause 22, wherein the web browser is an HTML5 compatible web browser.

27. The apparatus of clause 22, further comprising:
means for receiving a user input request from the web browser, using HTTP;
means for translating the user input request into an input command compatible with the remote desktop display protocol; and
means for providing the input command to the remote desktop client for accessing and controlling the remote desktop of the remote machine during the remote desktop session;
wherein the web browser drawing update comprises an image file and drawing coordinates for the image file that are recognizable and processable by the web browser; and
wherein the image file and the drawing coordinates represent a portion of an entire image of the remote desktop that has been changed in response to the input command.

28. The apparatus of clause 27, wherein the user input request comprises at least one of a mouse event, a keyboard event, and a touch event.

29. The apparatus of clause 22, wherein the remote desktop drawing command comprises remote desktop drawing command parameters and bitmap data received from a remote desktop server of the remote machine,
wherein the means for translating comprises one or more of: means for calculating new drawing command parameters based on the remote desktop drawing command parameters; means for adjusting the remote desktop drawing command parameters; and means for making adjustments to the bitmap data.

30. The apparatus of clause 22, wherein the remote desktop drawing command comprises remote desktop drawing command parameters and bitmap data received from a remote desktop server,
wherein the means for translating comprises means for making adjustments to the bitmap data of the remote machine,
wherein the means for making adjustments comprises means for converting a 16-bit red-green-blue (RGB) 5-6-5 color format into a 32-bit alpha-red-green-blue (ARGB) 8-8-8-8 format.

31. The apparatus of clause 22, wherein the transcoding server is an intermediary between the remote machine and the client device, and wherein the transcoding server is physically separate from the remote machine.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for Facilitating Conducting a Remote Desktop Session Between a Web Browser of a Client Device and a Remote Machine Via a Transcoding Server in Real Time and Utilizing Hypertext Markup Language that Supports a Two-Dimensional (2D) Canvas and Dynamic Drawing (Described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. Clause 1 below is presented, for example, with reference to FIGS. 11A-11C. It is noted that any of the dependent clauses may be combined in any combination, and placed into a respective independent clause, e.g., clauses 1, 11, and 22. The other clauses can be presented in a similar manner.

1. A method (see, e.g., item 1100-A in FIG. 11A) of facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the method comprising:

receiving, at the transcoding server, a user input request from the web browser at the client device for access and control of the remote machine, wherein the web browser supports a 2D canvas and dynamic drawing (see, e.g., item 1102-A in FIG. 11A);

translating, at the transcoding server, the user input request into an input command compatible with a remote desktop display protocol to be utilized by the transcoding server for facilitating communication with the remote machine (see, e.g., item 1104-A in FIG. 11A);

receiving, at the transcoding server, a remote desktop drawing command from the remote machine in response to the input command (see, e.g., item 1106-A in FIG. 11A);

translating, at the transcoding server, the remote desktop drawing command into a drawing update compatible with the hypertext markup language (see, e.g., item 1108-A in FIG. 11A); and facilitating providing the drawing update from the transcoding server to the web browser (see, e.g., item 1110-A in FIG. 11A);

wherein the transcoding server is an intermediary between the remote machine and the client device, and wherein the transcoding server is physically separate from the remote machine.

2. The method of clause 1, wherein the translating the remote desktop drawing command comprises:

translating the remote desktop drawing command into a Java graphics drawing command;

executing the Java graphics drawing command to update a portion of a Java bitmap, wherein the Java bitmap represents an entire image of a remote desktop of the remote machine;

generating coordinates for the updated portion of the Java bitmap based on the Java graphics drawing command;

forming an image file based on the updated portion of the Java bitmap, wherein the image file is compatible with HTML5; and obtaining drawing coordinates for the image file based on the coordinates for the updated portion of the Java bitmap, wherein the drawing coordinates are compatible with HTML5, wherein the drawing update comprises the image file and the drawing coordinates for the image file, wherein the drawing update represents a portion of the entire image of the remote desktop, wherein the web browser temporarily comprises JavaScript client code during the remote desktop session while the remote desktop session persists;

wherein the method further comprises receiving, at the transcoding server, drawing requests from the JavaScript client code of the web browser, wherein the facilitating providing the drawing update comprises facilitating providing the drawing update from the transcoding server to the JavaScript client code of the web browser in response to one of the drawing requests from the JavaScript client code of the web browser.

3. The method of clause 1, wherein the translating the remote desktop drawing command comprises:

translating the remote desktop drawing command into a graphics drawing command compatible with the transcoding server;

updating a portion of a bitmap based on the graphics drawing command, wherein the updated portion of the bitmap represents a portion of an entire image of a remote desktop of the remote machine that has changed relative to a previous graphics drawing command;

generating coordinates for the updated portion of the bitmap;

forming an image file based on the updated portion of the bitmap, wherein the image file is HTML5 compatible; and obtaining drawing coordinates for the image file, wherein the drawing coordinates are compatible with HTML5, wherein the drawing update comprises the image file and the drawing coordinates for the image file, wherein the method further comprises receiving, at the transcoding server, drawing requests from the web browser, wherein the facilitating providing the drawing update comprises facilitating providing the drawing update from the transcoding server to the web browser in response to one of the drawing requests from the web browser.

4. The method of clause 1, wherein the transcoding server comprises a remote desktop client adapter configured to translate the user input request into the input command compatible with the remote desktop display protocol and to translate the remote desktop drawing command into the graphics drawing command.

5. The method of clause 1, further comprising receiving long polling HTTP requests from the web browser, wherein the long polling HTTP requests comprise drawing requests.

6. The method of clause 1, further comprising receiving from the web browser an initial HTTP request comprising a uniform resource locator (URL) of the remote machine.

7. The method of clause 6, further comprising facilitating providing a script client code to the web browser in response to the initial HTTP request for the URL of the remote machine, wherein the script client code is compatible with HTML5.

8. The method of clause 1, wherein the remote desktop drawing command is compatible with the remote desktop display protocol, wherein the remote desktop display protocol is a push protocol, and wherein the facilitating providing the drawing update comprises facilitating providing the drawing update using HTTP that is a pull protocol.

9. The method of clause 1, wherein dynamic drawing comprises drawing in real time a portion of the 2D canvas, rather than drawing the entire 2D canvas, in response to one or more drawing requests of a script client of the web browser.

10. The method of clause 1, wherein the 2D canvas is updatable by a portion at a time according to a set of coordinates.

Figure 11B:
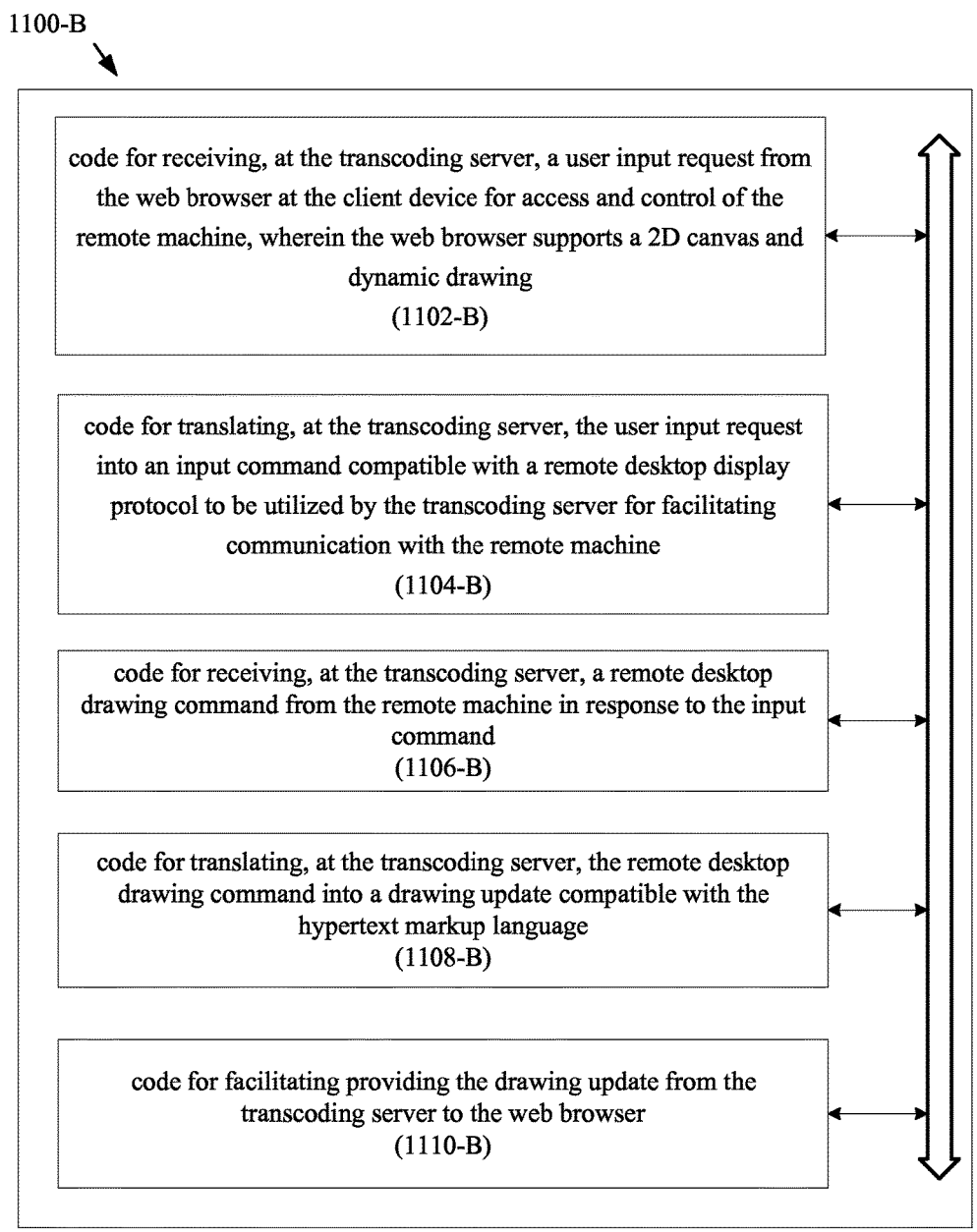
FIG. 11B is a block diagram representing code of an example of a machine-readable storage medium encoded with instructions executable by a processing system to perform a method of facilitating accessing and controlling a remote desktop of a remote machine in real time by a web browser at a client device via a hypertext transfer protocol (HTTP) utilizing a transcoding server.

11. A machine-readable storage medium (see, e.g., 810, 819 in FIG. 8) encoded with instructions executable by a processing system (see, e.g., 802) to perform a method of facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the instructions comprising code for:

receiving, at the transcoding server, a user input request from the web browser at the client device for access and control of the remote machine, wherein the web browser supports a 2D canvas and dynamic drawing (see, e.g., item 1102-B in FIG. 11B);

translating, at the transcoding server, the user input request into an input command compatible with a remote desktop display protocol to be utilized by the transcoding server for facilitating communication with the remote machine (see, e.g., item 1104-B in FIG. 11B);

receiving, at the transcoding server, a remote desktop drawing command from the remote machine in response to the input command (see, e.g., item 1106-B in FIG. 11B);

translating, at the transcoding server, the remote desktop drawing command into a drawing update compatible with the hypertext markup language (see, e.g., item 1108-B in FIG. 11B); and facilitating providing the drawing update from the transcoding server to the web browser (see, e.g., item 1110-B in FIG. 11B);

wherein the transcoding server is an intermediary between the remote machine and the client device, and wherein the transcoding server is physically separate from the remote machine.

12. The machine-readable storage medium of clause 11, wherein the translating the remote desktop drawing command comprises:

translating the remote desktop drawing command into a Java graphics drawing command;

executing the Java graphics drawing command to update a portion of a Java bitmap, wherein the Java bitmap represents an entire image of a remote desktop of the remote machine;

generating coordinates for the updated portion of the Java bitmap based on the Java graphics drawing command;

forming an image file based on the updated portion of the Java bitmap, wherein the image file is compatible with HTML5; and obtaining drawing coordinates for the image file based on the coordinates for the updated portion of the Java bitmap, wherein the drawing coordinates are compatible with HTML5, wherein the drawing update comprises the image file and the drawing coordinates for the image file, wherein the drawing update represents a portion of the entire image of the remote desktop, wherein the web browser temporarily comprises JavaScript client code during the remote desktop session while the remote desktop session persists;

wherein the method further comprises receiving, at the transcoding server, drawing requests from the JavaScript client code of the web browser, wherein the facilitating providing the drawing update comprises facilitating providing the drawing update from the transcoding server to the JavaScript client code of the web browser in response to one of the drawing requests from the JavaScript client code of the web browser.

13. The machine-readable storage medium of clause 11, wherein the translating the remote desktop drawing command comprises:

translating the remote desktop drawing command into a graphics drawing command compatible with the transcoding server;

updating a portion of a bitmap based on the graphics drawing command, wherein the updated portion of the bitmap represents a portion of an entire image of a remote desktop of the remote machine that has changed relative to a previous graphics drawing command;

generating coordinates for the updated portion of the bitmap;

forming an image file based on the updated portion of the bitmap, wherein the image file is HTML5 compatible; and obtaining drawing coordinates for the image file, wherein the drawing coordinates are compatible with HTML5, wherein the drawing update comprises the image file and the drawing coordinates for the image file, wherein the method further comprises receiving, at the transcoding server, drawing requests from the web browser, and wherein the facilitating providing the drawing update comprises facilitating providing the drawing update from the transcoding server to the web browser in response to one of the drawing requests from the web browser.

14. The machine-readable storage medium of clause 11, wherein the transcoding server comprises a remote desktop client adapter configured to translate the user input request into the input command compatible with the remote desktop display protocol and to translate the remote desktop drawing command into the graphics drawing command.

15. The machine-readable storage medium of clause 11, further comprising code for receiving long polling HTTP requests from the web browser, wherein the long polling HTTP requests comprise drawing requests.

16. The machine-readable storage medium of clause 11, further comprising code for receiving from the web browser an initial HTTP request comprising a uniform resource locator (URL) of the remote machine.

17. The machine-readable storage medium of clause 16, further comprising code for facilitating providing a script client code to the web browser in response to the initial HTTP request for the URL of the remote machine, wherein the script client code is compatible with HTML5.

18. The machine-readable storage medium of clause 11, wherein the remote desktop drawing command is compatible with the remote desktop display protocol, wherein the remote desktop display protocol is a push protocol, and wherein the facilitating providing the drawing update comprises facilitating providing the drawing update using HTTP that is a pull protocol.

19. The machine-readable storage medium of clause 11, wherein dynamic drawing comprises drawing in real time a portion of the 2D canvas, rather than drawing the entire 2D canvas, in response to one or more drawing requests of a script client of the web browser.

20. The machine-readable storage medium of clause 11, wherein the 2D canvas is updatable by a portion at a time according to a set of coordinates.

21. A computing machine comprising the machine-readable storage medium of clause 11, wherein the computing machine is the transcoding server.

Figure 11C:
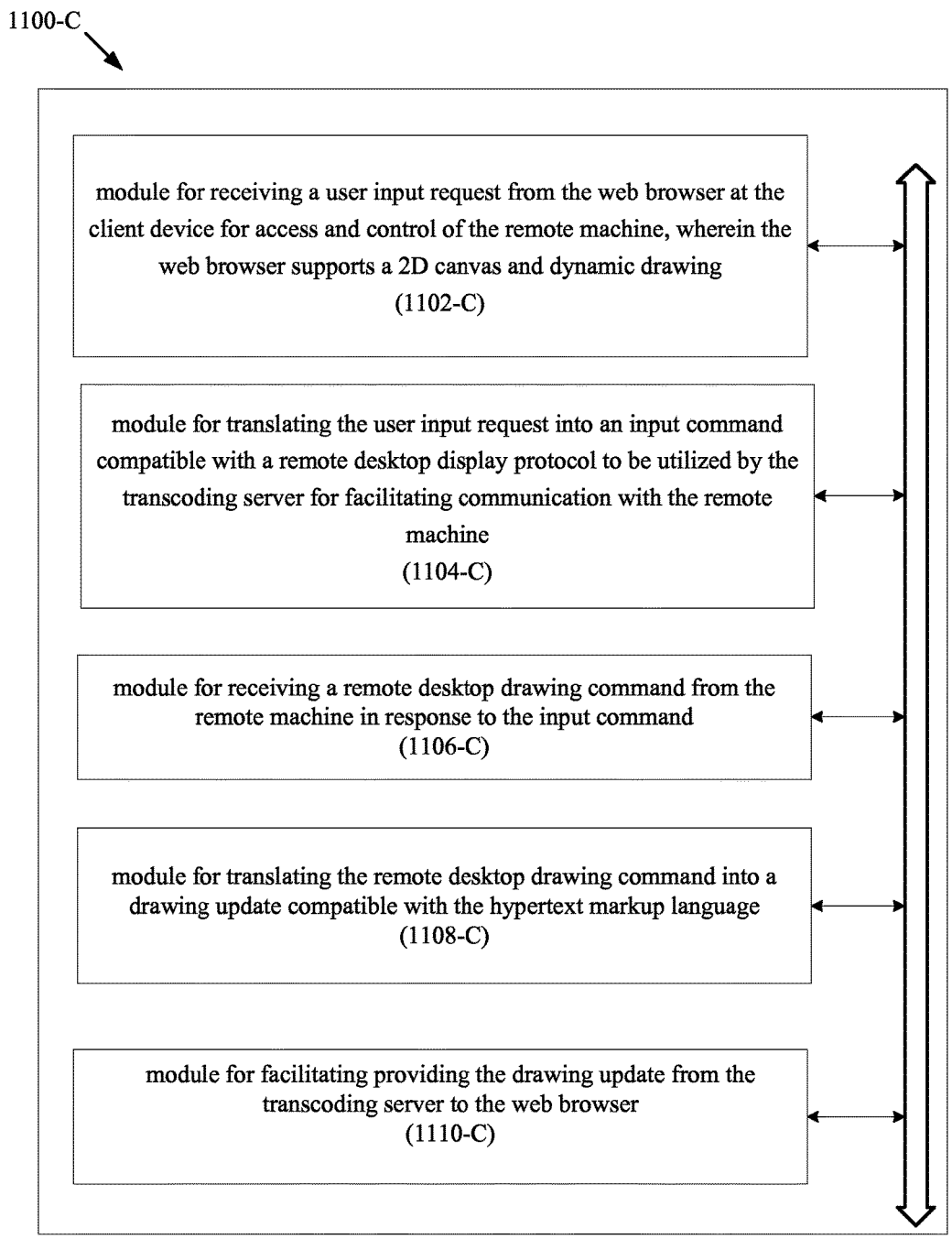
FIG. 11C is a block diagram module of an example of an apparatus for facilitating accessing and controlling a remote desktop of a remote machine in real time by a web browser at a client device via a hypertext transfer protocol (HTTP) utilizing a transcoding server.

22. An apparatus (see, e.g., item 1100-C in FIG. 11C) for facilitating conducting a remote desktop session between a web browser of a client device (see, e.g., 310 in FIG. 3A) and a remote machine (see, e.g., 320) via a transcoding server (see, e.g., 330) in real time and utilizing hypertext markup language that supports a two-dimensional (2D) canvas and dynamic drawing, the apparatus comprising:

means for receiving a user input request from the web browser at the client device for access and control of the remote machine, wherein the web browser supports a 2D canvas and dynamic drawing (see, e.g., item 1102-C in FIG. 11C);

means for translating the user input request into an input command compatible with a remote desktop display protocol to be utilized by the transcoding server for facilitating communication with the remote machine (see, e.g., item 1104-C in FIG. 11C);

means for receiving a remote desktop drawing command from the remote machine in response to the input command (see, e.g., item 1106-C in FIG. 11C);

means for translating the remote desktop drawing command into a drawing update compatible with the hypertext markup language (see, e.g., item 1108-C in FIG. 11C); and means for facilitating providing the drawing update from the transcoding server to the web browser (see, e.g., item 1110-C in FIG. 11C);

wherein the transcoding server is an intermediary between the remote machine and the client device, and wherein the transcoding server is physically separate from the remote machine.

23. The apparatus of clause 22, wherein the means for translating the remote desktop drawing command comprises:

means for translating the remote desktop drawing command into a Java graphics drawing command;

means for executing the Java graphics drawing command to update a portion of a Java bitmap, wherein the Java bitmap represents an entire image of a remote desktop of the remote machine;

means for generating coordinates for the updated portion of the Java bitmap based on the Java graphics drawing command;

means for forming an image file based on the updated portion of the Java bitmap, wherein the image file is compatible with HTML5; and means for obtaining drawing coordinates for the image file based on the coordinates for the updated portion of the Java bitmap, wherein the drawing coordinates are compatible with HTML5, wherein the drawing update comprises the image file and the drawing coordinates for the image file, wherein the drawing update represents a portion of the entire image of the remote desktop, wherein the web browser temporarily comprises JavaScript client code during the remote desktop session while the remote desktop session persists, wherein the apparatus further comprises means for receiving drawing requests from the JavaScript client code of the web browser, wherein the means for facilitating providing the drawing update comprises means for facilitating providing the drawing update from the transcoding server to the JavaScript client code of the web browser in response to one of the drawing requests from the JavaScript client code of the web browser.

24. The apparatus of clause 22, wherein the means for translating the remote desktop drawing command comprises:

means for translating the remote desktop drawing command into a graphics drawing command compatible with the transcoding server;

means for updating a portion of a bitmap based on the graphics drawing command, wherein the updated portion of the bitmap represents a portion of an entire image of a remote desktop of the remote machine that has changed relative to a previous graphics drawing command;

means for generating coordinates for the updated portion of the bitmap; means for forming an image file based on the updated portion of the bitmap, wherein the image file is HTML5 compatible; and means for obtaining drawing coordinates for the image file, wherein the drawing coordinates are compatible with HTML5, wherein the drawing update comprises the image file and the drawing coordinates for the image file, wherein the apparatus further comprises means for receiving drawing requests from the web browser, wherein the means for facilitating providing the drawing update comprises means for facilitating providing the drawing update from the transcoding server to the web browser in response to one of the drawing requests from the web browser.

25. The apparatus of clause 22, wherein the transcoding server comprises a remote desktop client adapter configured to translate the user input request into the input command compatible with the remote desktop display protocol and to translate the remote desktop drawing command into the graphics drawing command.

26. The apparatus of clause 22, further comprising means for receiving long polling HTTP requests from the web browser, wherein the long polling HTTP requests comprise drawing requests.

27. The apparatus of clause 22, further comprising means for receiving from the web browser an initial HTTP request comprising a uniform resource locator (URL) of the remote machine.

28. The apparatus of clause 27, further comprising means for facilitating providing a script client code to the web browser in response to the initial HTTP request for the URL of the remote machine, wherein the script client code is compatible with HTML5.

29. The apparatus of clause 22, wherein the remote desktop drawing command is compatible with the remote desktop display protocol, wherein the remote desktop display protocol is a push protocol, and wherein the means for facilitating providing the drawing update comprises means for facilitating providing the drawing update using HTTP that is a pull protocol.

30. The apparatus of clause 22, wherein dynamic drawing comprises drawing in real time a portion of the 2D canvas, rather than drawing the entire 2D canvas, in response to one or more drawing requests of a script client of the web browser.

31. The apparatus of clause 22, wherein the 2D canvas is updatable by a portion at a time according to a set of coordinates.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for Facilitating a Remote Desktop Session Between a Web Browser of a Client Device and a Remote Machine Through a Transcoding Server, Utilizing Hypertext Transfer Protocol (HTTP) Headers of HTTP for Remote Desktop Session Drawing (Described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 11, and 22. Clause 1 below is presented, for example, with reference to FIGS. 12A-12C. The other clauses can be presented in a similar manner.

Figure 12A:
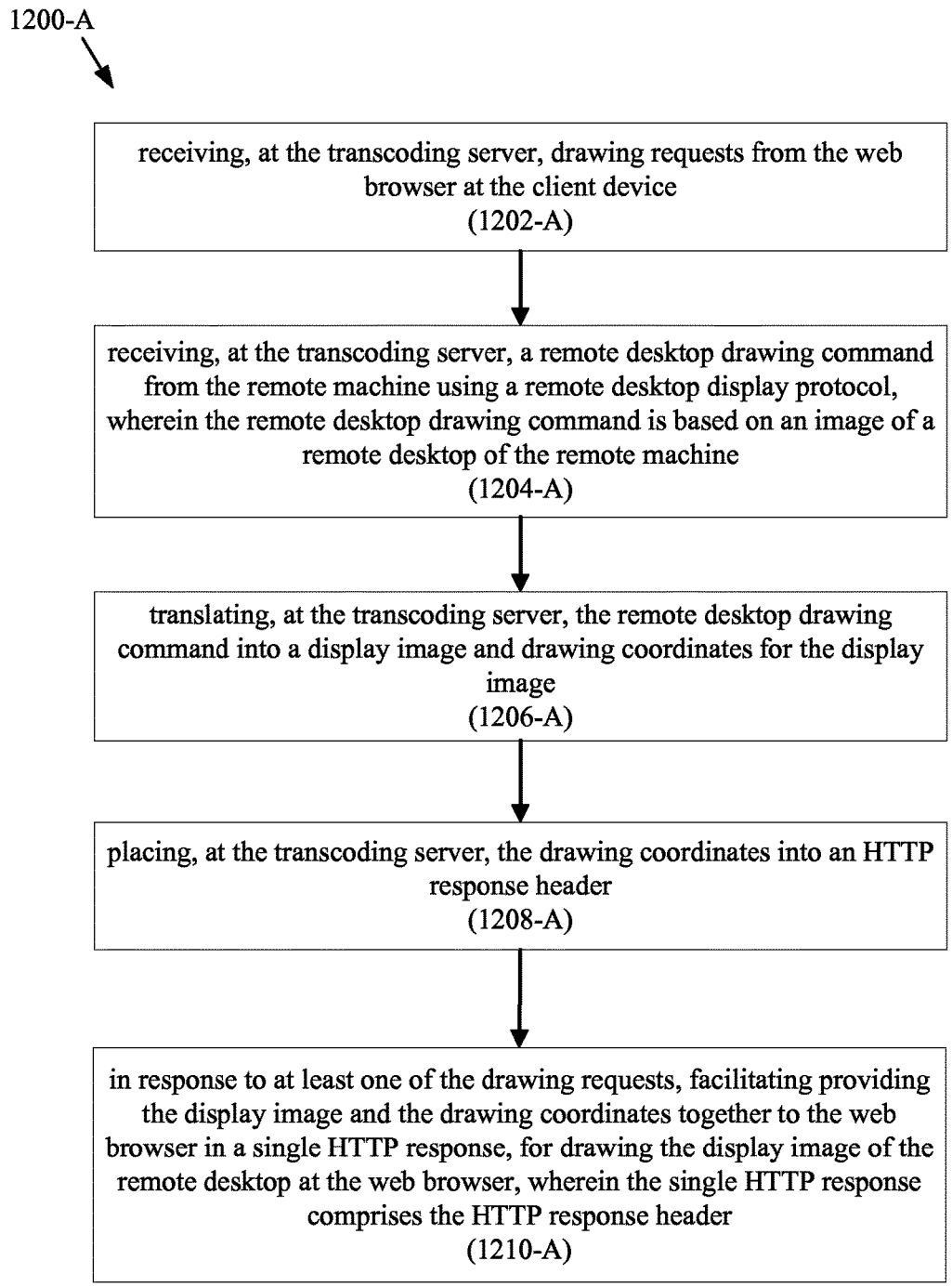
FIG. 12A is a block diagram representing an example of a method of facilitating conducting a remote desktop session between a web browser of a client device and a remote machine via a transcoding server in real time and utilizing hypertext markup language that supports a two-dimensional (2D) canvas and dynamic drawing.

1. A method (see, e.g., item 1200-A in FIG. 12A) of facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the method comprising:

receiving, at the transcoding server, drawing requests from the web browser at the client device (see, e.g., item 1202-A in FIG. 12A);

receiving, at the transcoding server, a remote desktop drawing command from the remote machine using a remote desktop display protocol, wherein the remote desktop drawing command is based on an image of a remote desktop of the remote machine (see, e.g., item 1204-A in FIG. 12A);

translating, at the transcoding server, the remote desktop drawing command into a display image and drawing coordinates for the display image (see, e.g., item 1206-A in FIG. 12A);

placing, at the transcoding server, the drawing coordinates into an HTTP response header (see, e.g., item 1208-A in FIG. 12A); and in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1210-A in FIG. 12A), wherein the remote desktop display protocol is a push protocol, and wherein HTTP is a pull protocol.

2. The method of clause 1, wherein the translating comprises:

translating the remote desktop drawing command into a Java graphics drawing command, wherein the transcoding server comprises a Java compatible web application container;

updating a portion of a Java graphics bitmap of the remote desktop in response to the Java graphics drawing command;

generating coordinates for the updated portion of the Java bitmap from the Java graphics drawing command;

generating the display image compatible with the web browser based on the updated portion of the Java bitmap; and obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

3. The method of clause 1, wherein the translating comprises:

translating the remote desktop drawing command into a graphics drawing command compatible with the transcoding server;

updating a portion of a bitmap of the remote desktop based on the graphics drawing command;

generating the coordinates for the updated portion of the bitmap;

generating the display image compatible with the web browser based on the updated portion of the bitmap; and obtaining the drawing coordinates for the display image, wherein the display image and the drawing coordinates are compatible with HTML.

4. The method of clause 1, wherein the display image and the drawing coordinates are compatible with HTML5.

5. The method of clause 1, wherein the transcoding server is an intermediary between the remote machine and the client device, and wherein the transcoding server is physically separate from the remote machine.

6. The method of clause 1, wherein the remote desktop drawing command comprises coordinates of a region of the remote desktop that has changed relative to a previous remote desktop drawing command.

7. The method of clause 6, wherein the coordinates specify a redrawing region.

8. The method of clause 1, wherein the drawing coordinates are compatible with JavaScript client code of the web browser, and wherein the display image is compatible with HTML of the web browser.

9. The method of clause 1, wherein the display image comprises a scaled image of the remote desktop.

10. The method of clause 1, wherein the display image comprises an offset image of the remote desktop.

Figure 12B:
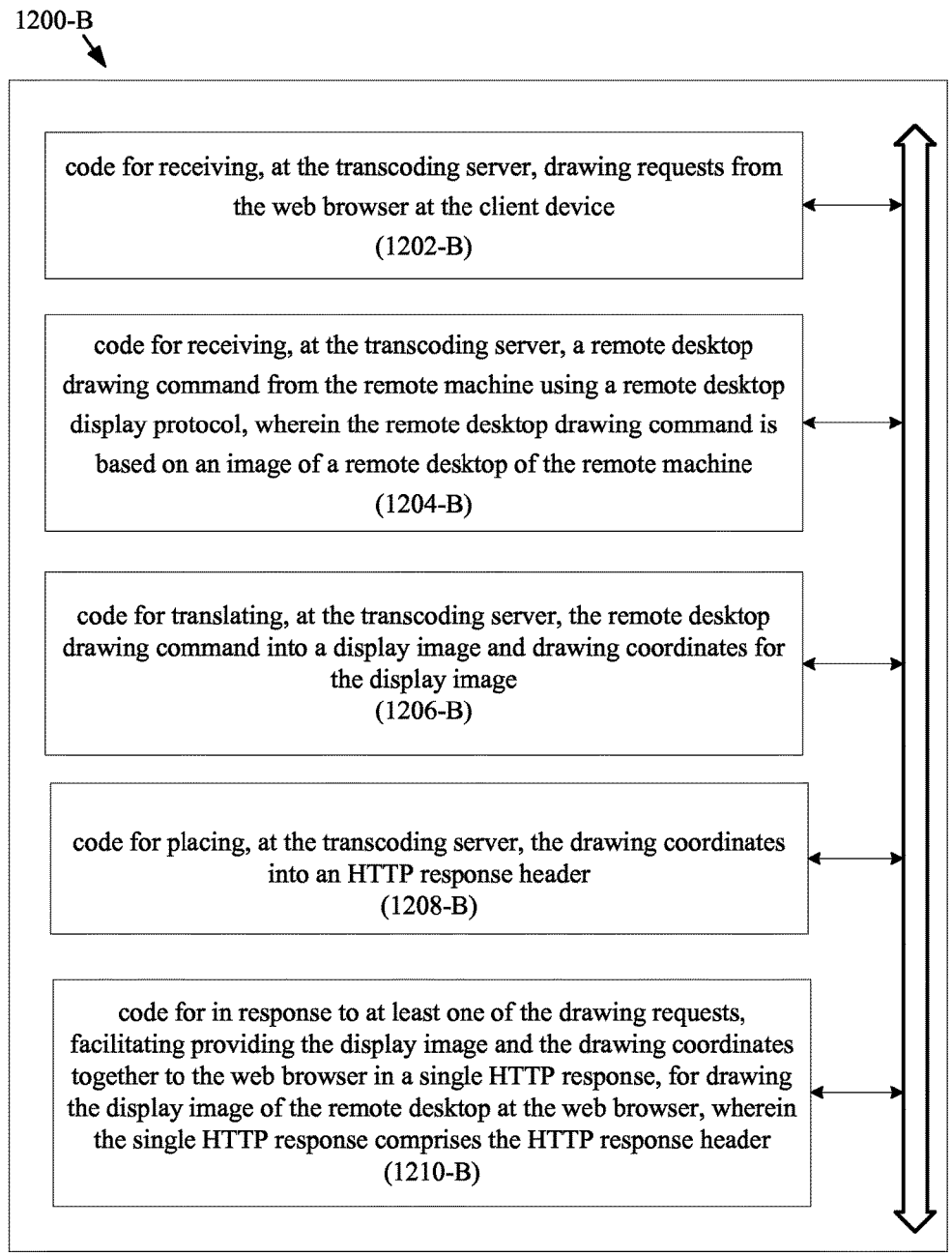
FIG. 12B is a block diagram representing code of an example of a machine-readable storage medium encoded with instructions executable by a processing system to perform a method of facilitating conducting a remote desktop session between a web browser of a client device and a remote machine via a transcoding server in real time and utilizing hypertext markup language that supports a two-dimensional (2D) canvas and dynamic drawing.

11. A machine-readable storage medium (see, e.g., 810, 819 in FIG. 8) encoded with instructions executable by a processing system (see, e.g., 802) to perform a method of facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the instructions comprising code for:

receiving, at the transcoding server, drawing requests from the web browser at the client device (see, e.g., item 1202-B in FIG. 12B);

receiving, at the transcoding server, a remote desktop drawing command from the remote machine using a remote desktop display protocol, wherein the remote desktop drawing command is based on an image of a remote desktop of the remote machine (see, e.g., item 1204-B in FIG. 12B);

translating, at the transcoding server, the remote desktop drawing command into a display image and drawing coordinates for the display image (see, e.g., item 1206-B in FIG. 12B);

placing, at the transcoding server, the drawing coordinates into an HTTP response header (see, e.g., item 1208-B in FIG. 12B); and in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1210-B in FIG. 12B), wherein the remote desktop display protocol is a push protocol, and wherein HTTP is a pull protocol.

12. The machine-readable storage medium of clause 11, wherein the translating comprises:

translating the remote desktop drawing command into a Java graphics drawing command, wherein the transcoding server comprises a Java compatible web application container;

updating a portion of a Java graphics bitmap of the remote desktop in response to the Java graphics drawing command;

generating coordinates for the updated portion of the Java bitmap from the Java graphics drawing command;

generating the display image compatible with the web browser based on the updated portion of the Java bitmap; and obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

13. The machine-readable storage medium of clause 11, wherein the translating comprises:

translating the remote desktop drawing command into a graphics drawing command compatible with the transcoding server;

updating a portion of a bitmap of the remote desktop based on the graphics drawing command;

generating the coordinates for the updated portion of the bitmap;

generating the display image compatible with the web browser based on the updated portion of the bitmap; and obtaining the drawing coordinates for the display image, wherein the display image and the drawing coordinates are compatible with HTML.

14. The machine-readable storage medium of clause 11, wherein the display image and the drawing coordinates are compatible with HTML5.

15. The machine-readable storage medium of clause 11, wherein the transcoding server is an intermediary between the remote machine and the client device, and wherein the transcoding server is physically separate from the remote machine.

16. The machine-readable storage medium of clause 11, wherein the remote desktop drawing command comprises coordinates of a region of the remote desktop that has changed relative to a previous remote desktop drawing command.

17. The machine-readable storage medium of clause 16, wherein the coordinates specify a redrawing region.

18. The machine-readable storage medium of clause 11, wherein the drawing coordinates are compatible with JavaScript client code of the web browser, and wherein the display image is compatible with HTML of the web browser.

19. The machine-readable storage medium of clause 11, wherein the display image comprises a scaled image of the remote desktop.

20. The machine-readable storage medium of clause 11, wherein the display image comprises an offset image of the remote desktop.

21. A computing machine comprising the machine-readable storage medium of clause 11, wherein the computing machine is the transcoding server.

Figure 12C:
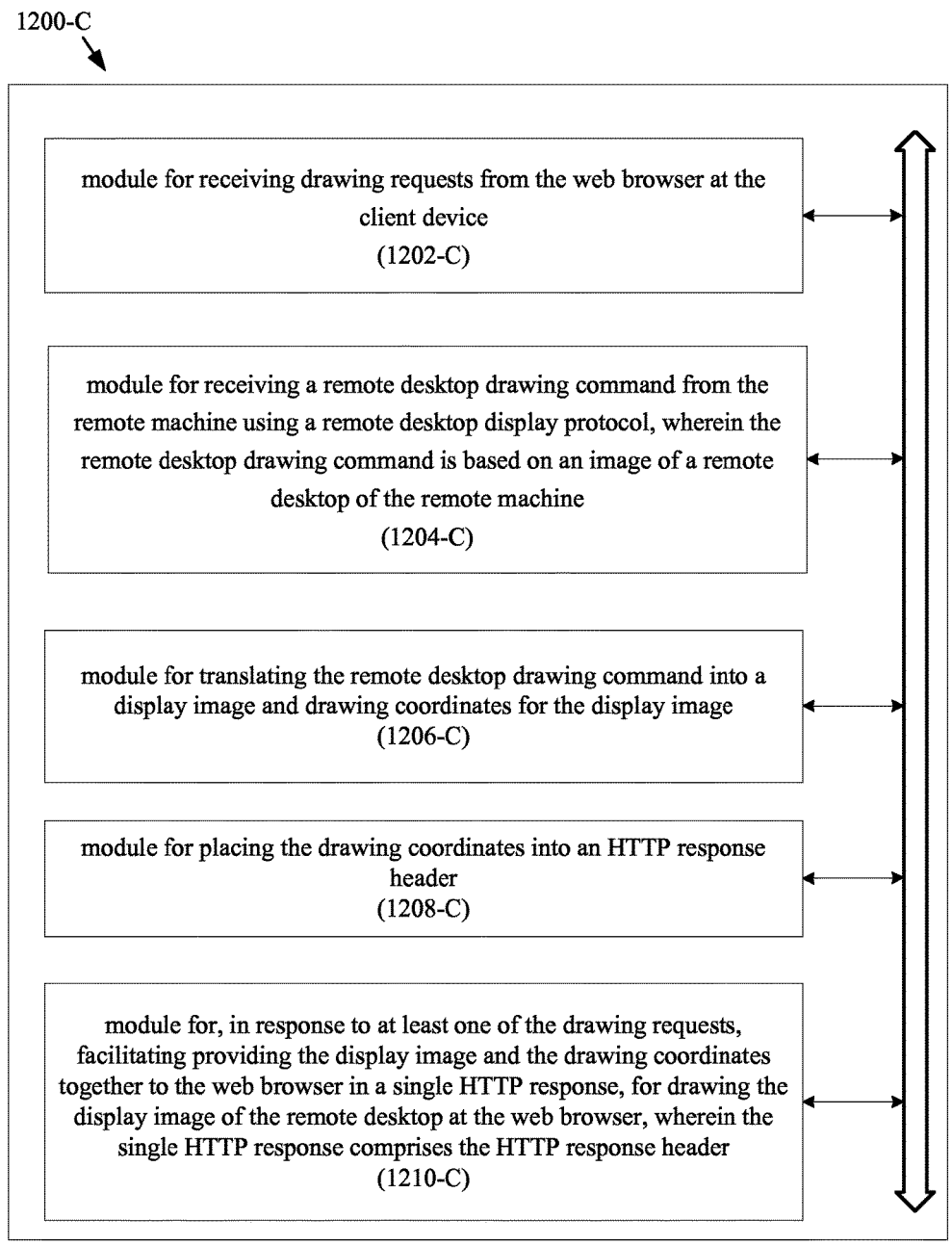
FIG. 12C is a block diagram of module of an example of an apparatus for facilitating conducting a remote desktop session between a web browser of a client device and a remote machine via a transcoding server in real time and utilizing hypertext markup language that supports a two-dimensional (2D) canvas and dynamic drawing.

22. An apparatus (see, e.g., item 1200-C in FIG. 12C) for facilitating a remote desktop session between a web browser of a client device (see, e.g., 310 in FIG. 3A) and a remote machine (see, e.g., 320) through a transcoding server (see, e.g., 330), utilizing hypertext transfer protocol (HTTP) headers of HTTP for remote desktop session drawing, the apparatus comprising:

means for receiving drawing requests from the web browser at the client device (see, e.g., item 1202-C in FIG. 12C);

means for receiving a remote desktop drawing command from the remote machine using a remote desktop display protocol, wherein the remote desktop drawing command is based on an image of a remote desktop of the remote machine (see, e.g., item 1204-C in FIG. 12C);

means for translating the remote desktop drawing command into a display image and drawing coordinates for the display image (see, e.g., item 1206-C in FIG. 12C);

means for placing the drawing coordinates into an HTTP response header (see, e.g., item 1208-C in FIG. 12C); and means for, in response to at least one of the drawing requests, facilitating providing the display image and the drawing coordinates together to the web browser in a single HTTP response, for drawing the display image of the remote desktop at the web browser, wherein the single HTTP response comprises the HTTP response header (see, e.g., item 1210-C in FIG. 12C), wherein the remote desktop display protocol is a push protocol, and wherein HTTP is a pull protocol.

23. The apparatus of clause 22, wherein the means for translating comprises:

means for translating the remote desktop drawing command into a Java graphics drawing command, wherein the transcoding server comprises a Java compatible web application container;

means for updating a portion of a Java graphics bitmap of the remote desktop in response to the Java graphics drawing command;

means for generating coordinates for the updated portion of the Java bitmap from the Java graphics drawing command;

means for generating the display image compatible with the web browser based on the updated portion of the Java bitmap; and means for obtaining the drawing coordinates for the display image based on the coordinates for the updated portion of the Java bitmap, wherein the display image and the drawing coordinates are compatible with HTML, wherein the updated portion of the Java graphics bitmap represents a portion of an entire image of the remote desktop of the remote machine, wherein the display image and the drawing coordinates represent the portion of the entire image of the remote desktop of the remote machine.

24. The apparatus of clause 22, wherein the means for translating comprises:

means for translating the remote desktop drawing command into a graphics drawing command compatible with the transcoding server;

means for updating a portion of a bitmap of the remote desktop based on the graphics drawing command;

means for generating the coordinates for the updated portion of the bitmap;

means for generating the display image compatible with the web browser based on the updated portion of the bitmap; and means for obtaining the drawing coordinates for the display image, wherein the display image and the drawing coordinates are compatible with HTML.

25. The apparatus of clause 22, wherein the display image and the drawing coordinates are compatible with HTML5.

26. The apparatus of clause 22, wherein the transcoding server is an intermediary between the remote machine and the client device, and wherein the transcoding server is physically separate from the remote machine.

27. The apparatus of clause 22, wherein the remote desktop drawing command comprises coordinates of a region of the remote desktop that has changed relative to a previous remote desktop drawing command.

28. The apparatus of clause 27, wherein the coordinates specify a redrawing region.

29. The apparatus of clause 22, wherein the drawing coordinates are compatible with JavaScript client code of the web browser, and wherein the display image is compatible with HTML of the web browser.

30. The apparatus of clause 22, wherein the display image comprises a scaled image of the remote desktop.

31. The apparatus of clause 22, wherein the display image comprises an offset image of the remote desktop.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for Facilitating a Remote Desktop Session Between a Web Browser of a Client Device and a Remote Machine Through a Transcoding Server, Utilizing Long Polling to Reduce Traffic to the Client Device (Described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 11, and 22. Clause 1 below is presented, for example, with reference to FIGS. 13A-13C. The other clauses can be presented in a similar manner.

Figure 13A:
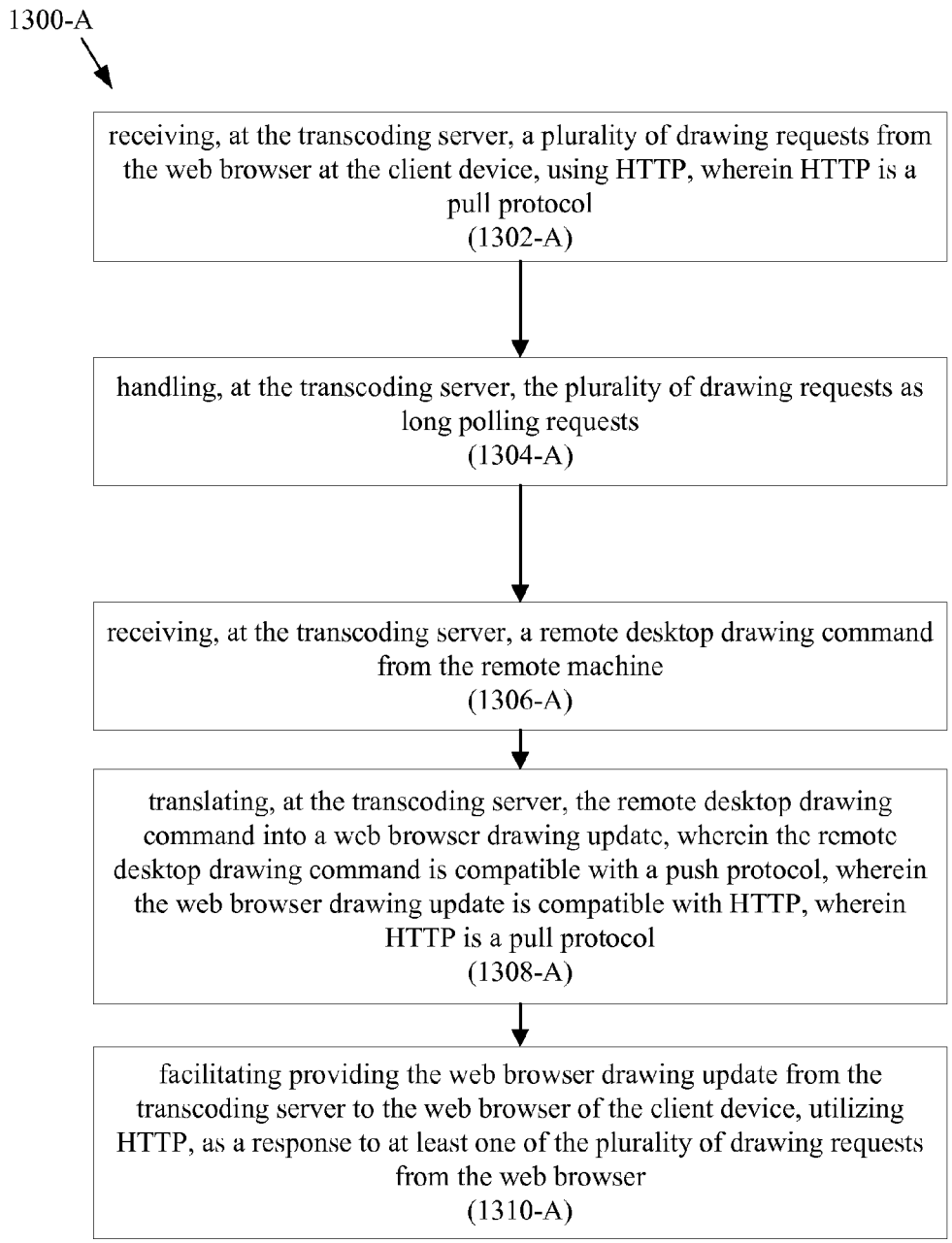
FIG. 13A is a block diagram representing an example of a method of facilitating a remote desktop session between a web browser of a client device and a remote machine through a transcoding server, utilizing hypertext transfer protocol (HTTP) headers of HTTP for remote desktop session drawing.
Figure 13B:
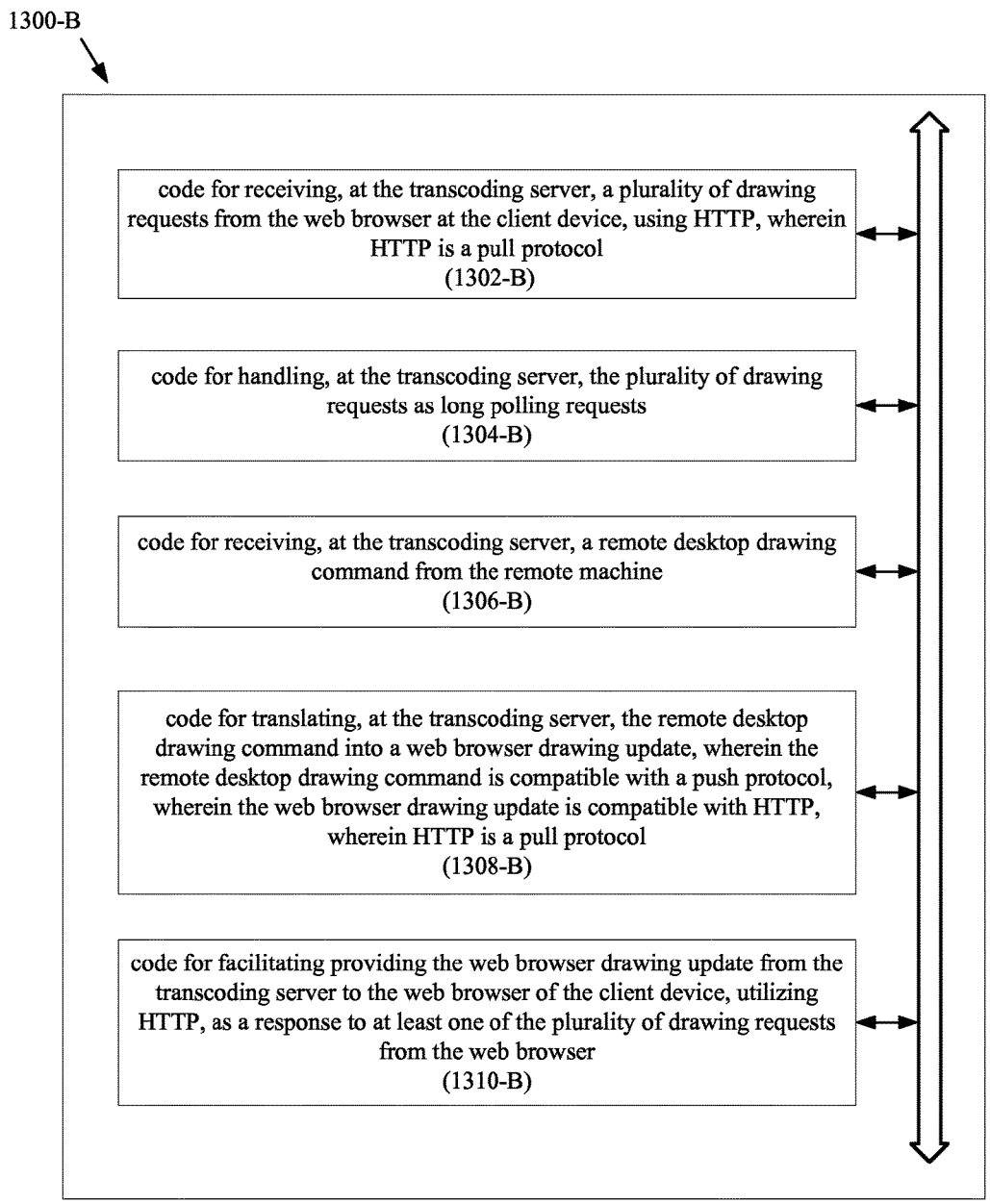
FIG. 13B is a block diagram representing code of an example of a machine-readable storage medium encoded with instructions executable by a processing system to perform a method of facilitating a remote desktop session between a web browser of a client device and a remote machine through a transcoding server, utilizing hypertext transfer protocol (HTTP) headers of HTTP for remote desktop session drawing.

1. A method (see, e.g., 1300-A of FIG. 13A) of facilitating a remote desktop session between a web browser (see, e.g., 500 of FIG. 5) of a client device (see, e.g., 310 of FIG. 3A) and a remote machine (see, e.g., 320 of FIG. 3A) through a transcoding server (see, e.g., 330 of FIG. 3A), utilizing long polling to reduce traffic to the client device, the method comprising:

receiving, at the transcoding server, a plurality of drawing requests from the web browser at the client device, using HTTP, wherein HTTP is a pull protocol (see, e.g., item 1302-A in FIG. 13A);

handling, at the transcoding server, the plurality of drawing requests as long polling requests (see, e.g., item 1304-A in FIG. 13A);

receiving, at the transcoding server, a remote desktop drawing command from the remote machine (see, e.g., item 1306-A in FIG. 13A);

translating, at the transcoding server, the remote desktop drawing command into a web browser drawing update, wherein the remote desktop drawing command is compatible with a push protocol, wherein the web browser drawing update is compatible with HTTP, wherein HTTP is a pull protocol (see, e.g., item 1308-A in FIG. 13A); and facilitating providing the web browser drawing update from the transcoding server to the web browser of the client device, utilizing HTTP, as a response to at least one of the plurality of drawing requests from the web browser (see, e.g., item 1310-A in FIG. 13A).

2. The method of clause 1, wherein the handling comprises:

determining whether a drawing command is pending at the transcoding server for the web browser;

if there is no pending drawing command, then storing the plurality of drawing requests in a drawing requests queue as long poling requests; and if there is a pending drawing command, then providing at least one of the plurality of drawing requests to an HTTP handler in the transcoding server to allow the HTTP handler to serve the pending drawing command in response to the at least one of the plurality of drawing requests.

3. The method of clause 1, wherein the remote desktop drawing command represents a portion of an entire image of a remote desktop of the remote machine, wherein the translating comprises:

translating the remote desktop drawing command into a Java graphics drawing command;

updating a portion of a Java bitmap of the entire image of the remote desktop in response to the Java graphics drawing command;

generating coordinates of the updated portion of the Java bitmap based on the Java graphics drawing command;

generating an image file based on the updated portion of the Java bitmap, wherein the image file is compatible with the web browser; and obtaining drawing coordinates for the image file based on the coordinates of the updated portion of the Java bitmap, wherein the web browser drawing update comprises the image file and the drawing coordinates.

4. The method of clause 3, wherein the handling comprises:

determining whether a drawing command is pending at the transcoding server for the web browser;

if there is no pending drawing command, then storing the plurality of drawing requests in a drawing requests queue as long poling requests; and if there is a pending drawing command, then providing at least one of the plurality of drawing requests to an HTTP handler in the transcoding server to allow the HTTP handler to serve the pending drawing command in response to the at least one of the plurality of drawing requests.

5. The method of clause 4, wherein the facilitating providing comprises:

placing, at the HTTP handler, the drawing coordinates into an HTTP header of a single HTTP transmission response to the web browser; and including, at the HTTP handler, the image file into the single HTTP transmission response to the web browser to facilitate providing the image file and the drawing coordinates together to the web browser in the single HTTP transmission response.

6. The method of clause 5, further comprising:
when a drawing commands queue has new coordinates, sending a notification to the drawing requests queue to allow at least one of the plurality of drawing requests in the drawing requests queue to be forwarded to the HTTP handler.

7. The method of clause 1, further comprising:
receiving a new drawing request from the web browser, in response to facilitating providing the web browser drawing update from the transcoding server to the web browser of the client device as a response to the at least one of the plurality of drawing requests from the web browser.

8. The method of clause 1, further comprising:
receiving a request from the web browser to connect to the remote machine; and
facilitating providing a JavaScript client code to the web browser in response to the request to connect to the remote machine,
wherein the receiving the plurality of drawing requests comprises receiving the plurality of drawing requests from the JavaScript client code,
wherein the facilitating providing the web browser drawing update comprises facilitating providing the web browser drawing update to the JavaScript client code.

9. The method of clause 8, further comprising: facilitating deleting the JavaScript client code from the web browser when the remote desktop session is terminated.

10. The method of clause 1, further comprising:
receiving, at the transcoding server, a user input request from the web browser for accessing or controlling a remote desktop of the remote machine,
translating, at the transcoding server, the user input request into an input command compatible with the push protocol;
facilitating providing the input command to the remote machine utilizing the push protocol,
wherein the receiving the remote desktop drawing command comprises receiving the remote desktop drawing command in response to the input command.

11. A machine-readable storage medium (see, e.g., item 1300-B in FIG. 13B) encoded with instructions executable by a processing system to perform a method of facilitating a remote desktop session between a web browser (see, e.g., 500 of FIG. 5) of a client device (see, e.g., 310 of FIG. 3A) and a remote machine (see, e.g., 320 of FIG. 3B) through a transcoding server (see, e.g., 330 of FIG. 3B), utilizing long polling to reduce traffic to the client device, the instructions comprising code for:
receiving, at the transcoding server, a plurality of drawing requests from the web browser at the client device, using HTTP, wherein HTTP is a pull protocol (see, e.g., item 1302-B in FIG. 13B);
handling, at the transcoding server, the plurality of drawing requests as long poling requests (see, e.g., item 1304-B in FIG. 13B);
receiving, at the transcoding server, a remote desktop drawing command from the remote machine (see, e.g., item 1306-B in FIG. 13B);
translating, at the transcoding server, the remote desktop drawing command into a web browser drawing update, wherein the remote desktop drawing command is compatible with a push protocol, wherein the web browser drawing update is compatible with HTTP, wherein HTTP is a pull protocol (see, e.g., item 1308-B in FIG. 13B); and
facilitating providing the web browser drawing update from the transcoding server to the web browser of the client device, utilizing HTTP, as a response to at least one of the plurality of drawing requests from the web browser (see, e.g., item 1310-B in FIG. 13B).

12. The machine-readable storage medium of clause 11, wherein the handling comprises:
determining whether a drawing command is pending at the transcoding server for the web browser;
if there is no pending drawing command, then storing the plurality of drawing requests in a drawing requests queue as long poling requests; and
if there is a pending drawing command, then providing at least one of the plurality of drawing requests to an HTTP handler in the transcoding server to allow the HTTP handler to serve the pending drawing command in response to the at least one of the plurality of drawing requests.

13. The machine-readable storage medium of clause 11, wherein the remote desktop drawing command represents a portion of an entire image of a remote desktop of the remote machine,
wherein the translating comprises:
translating the remote desktop drawing command into a Java graphics drawing command;
updating a portion of a Java bitmap of the entire image of the remote desktop in response to the Java graphics drawing command;
generating coordinates of the updated portion of the Java bitmap based on the Java graphics drawing command;
generating an image file based on the updated portion of the Java bitmap, wherein the image file is compatible with the web browser; and
obtaining drawing coordinates for the image file based on the coordinates of the updated portion of the Java bitmap,
wherein the web browser drawing update comprises the image file and the drawing coordinates.

14. The machine-readable storage medium of clause 13, wherein the handling comprises:
determining whether a drawing command is pending at the transcoding server for the web browser;
if there is no pending drawing command, then storing the plurality of drawing requests in a drawing requests queue as long poling requests; and
if there is a pending drawing command, then providing at least one of the plurality of drawing requests to an HTTP handler in the transcoding server to allow the HTTP handler to serve the pending drawing command in response to the at least one of the plurality of drawing requests.

15. The machine-readable storage medium of clause 14, wherein the facilitating providing comprises:
placing, at the HTTP handler, the drawing coordinates into an HTTP header of a single HTTP transmission response to the web browser; and
including, at the HTTP handler, the image file into the single HTTP transmission response to the web browser to facilitate providing the image file and the drawing coordinates together to the web browser in the single HTTP transmission response.

16. The machine-readable storage medium of clause 15, further comprising code for:
when a drawing commands queue has new coordinates, sending a notification to the drawing requests queue to allow at least one of the plurality of drawing requests in the drawing requests queue to be forwarded to the HTTP handler.

17. The machine-readable storage medium of clause 11, further comprising code for:

receiving a new drawing request from the web browser, in response to facilitating providing the web browser drawing update from the transcoding server to the web browser of the client device as a response to the at least one of the plurality of drawing requests from the web browser.

18. The machine-readable storage medium of clause 11, further comprising code for:

receiving a request from the web browser to connect to the remote machine; and facilitating providing a JavaScript client code to the web browser in response to the request to connect to the remote machine, wherein the receiving the plurality of drawing requests comprises receiving the plurality of drawing requests from the JavaScript client code, wherein the facilitating providing the web browser drawing update comprises facilitating providing the web browser drawing update to the JavaScript client code.

19. The machine-readable storage medium of clause 18, further comprising code for:

facilitating deleting the JavaScript client code from the web browser when the remote desktop session is terminated.

20. The machine-readable storage medium of clause 11, further comprising code for:

receiving, at the transcoding server, a user input request from the web browser for accessing or controlling a remote desktop of the remote machine, translating, at the transcoding server, the user input request into an input command compatible with the push protocol;

facilitating providing the input command to the remote machine utilizing the push protocol, wherein the receiving the remote desktop drawing command comprises receiving the remote desktop drawing command in response to the input command.

21. A computing machine comprising the machine-readable storage medium of clause 11, wherein the computing machine is the transcoding server.

Figure 13C:
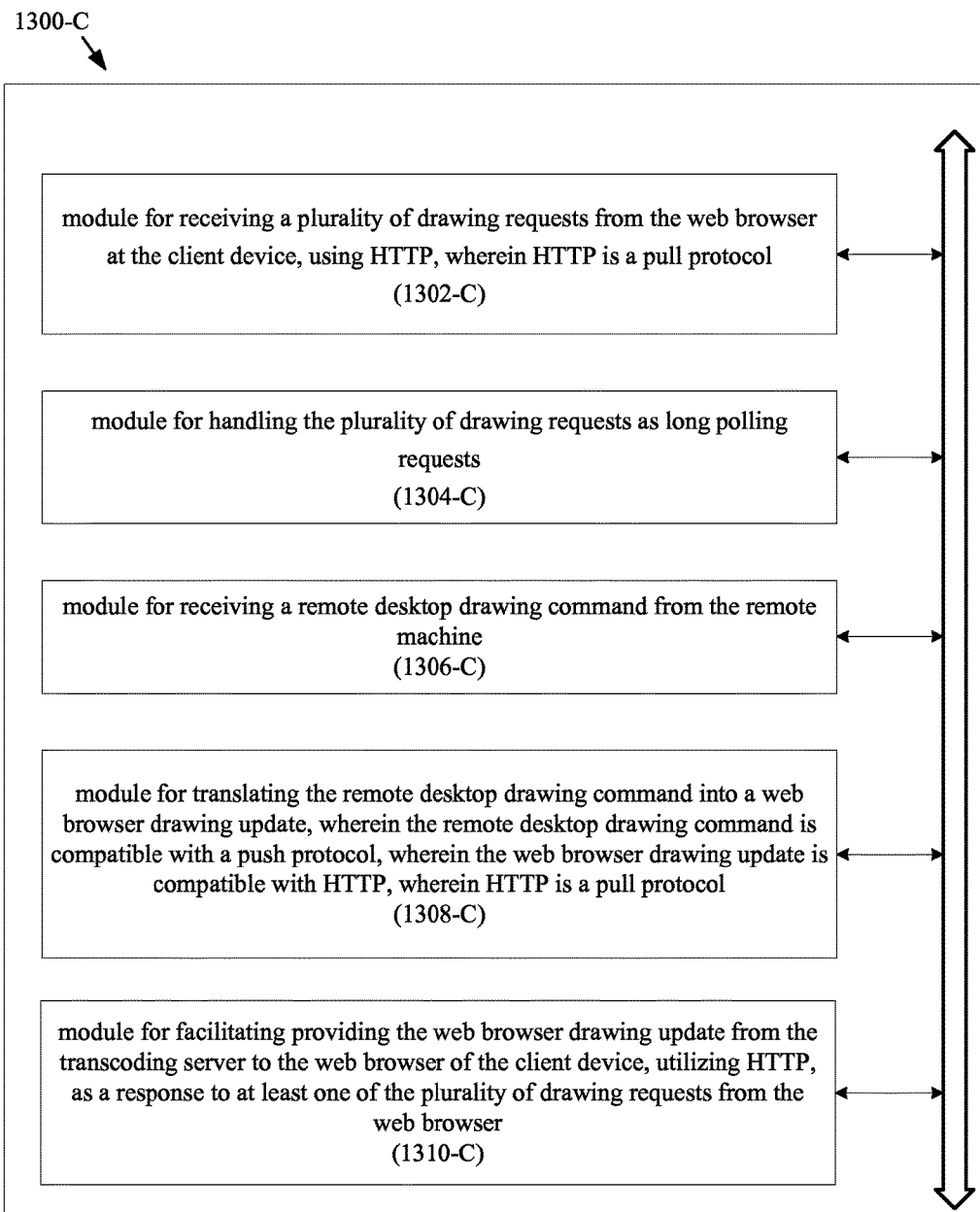
FIG. 13C is a block diagram of module of an example of an apparatus for facilitating a remote desktop session between a web browser of a client device and a remote machine through a transcoding server, utilizing hypertext transfer protocol (HTTP) headers of HTTP for remote desktop session drawing.

22. An apparatus (see, e.g., item 1300-C in FIG. 13C) for facilitating a remote desktop session between a web browser (see, e.g., 500 of FIG. 5) of a client device (see, e.g., 310 in FIG. 3A) and a remote machine (see, e.g., 330 in FIG. 3A) through a transcoding server (see, e.g., 330 in FIG. 3A), utilizing long polling to reduce traffic to the client device, the apparatus comprising:

means for receiving a plurality of drawing requests from the web browser at the client device, using HTTP, wherein HTTP is a pull protocol (see, e.g., item 1302-C in FIG. 13C);

means for handling the plurality of drawing requests as long polling requests (see, e.g., item 1304-C in FIG. 13C);

means for receiving a remote desktop drawing command from the remote machine (see, e.g., item 1306-C in FIG. 13C);

means for translating the remote desktop drawing command into a web browser drawing update, wherein the remote desktop drawing command is compatible with a push protocol, wherein the web browser drawing update is compatible with HTTP, wherein HTTP is a pull protocol (see, e.g., item 1308-C in FIG. 13C); and means for facilitating providing the web browser drawing update from the transcoding server to the web browser of the client device, utilizing HTTP, as a response to at least one of the plurality of drawing requests from the web browser (see, e.g., item 1310-C in FIG. 13C).

23. The apparatus of clause 22, wherein the means for handling comprises:

means for determining whether a drawing command is pending at the transcoding server for the web browser;

means for storing the plurality of drawing requests in a drawing requests queue as long poling requests if there is no pending drawing command; and means for providing at least one of the plurality of drawing requests to an HTTP handler in the transcoding server, if there is a pending drawing command, to allow the HTTP handler to serve the pending drawing command in response to the at least one of the plurality of drawing requests.

24. The apparatus of clause 22, wherein the remote desktop drawing command represents a portion of an entire image of a remote desktop of the remote machine, wherein the means for translating comprises:

means for translating the remote desktop drawing command into a Java graphics drawing command;

means for updating a portion of a Java bitmap of the entire image of the remote desktop in response to the Java graphics drawing command;

means for generating coordinates of the updated portion of the Java bitmap based on the Java graphics drawing command;

means for generating an image file based on the updated portion of the Java bitmap, wherein the image file is compatible with the web browser; and means for obtaining drawing coordinates for the image file based on the coordinates of the updated portion of the Java bitmap, wherein the web browser drawing update comprises the image file and the drawing coordinates.

25. The apparatus of clause 22, wherein the means for handling comprises:

means for determining whether a drawing command is pending at the transcoding server for the web browser;

means for storing the plurality of drawing requests in a drawing requests queue as long poling requests if there is no pending drawing command; and means for providing at least one of the plurality of drawing requests to an HTTP handler in the transcoding server, if there is a pending drawing command, to allow the HTTP handler to serve the pending drawing command in response to the at least one of the plurality of drawing requests.

26. The apparatus of clause 22, wherein the means for facilitating providing comprises:

means for placing, at the HTTP handler, the drawing coordinates into an HTTP header of a single HTTP transmission response to the web browser; and means for including, at the HTTP handler, the image file into the single HTTP transmission response to the web browser to facilitate providing the image file and the drawing coordinates together to the web browser in the single HTTP transmission response.

27. The apparatus of clause 22, further comprising:

means for sending a notification to the drawing requests queue, when a drawing commands queue has new coordinates, to allow at least one of the plurality of drawing requests in the drawing requests queue to be forwarded to the HTTP handler.

28. The apparatus of clause 22, further comprising:

means for receiving a new drawing request from the web browser, in response to facilitating providing the web browser drawing update from the transcoding server to the web browser of the client device as a response to the at least one of the plurality of drawing requests from the web browser.

29. The apparatus of clause 22, further comprising:
means for receiving a request from the web browser to connect to the remote machine; and
means for facilitating providing a JavaScript client code to the web browser in response to the request to connect to the remote machine,
wherein the means for receiving the plurality of drawing requests comprises means for receiving the plurality of drawing requests from the JavaScript client code,
wherein the means for facilitating providing the web browser drawing update comprises means for facilitating providing the web browser drawing update to the JavaScript client code.

30. The apparatus of clause 29, further comprising: means for facilitating deleting the JavaScript client code from the web browser when the remote desktop session is terminated.

31. The apparatus of clause 22, further comprising:
means for receiving a user input request from the web browser for accessing or controlling a remote desktop of the remote machine,
means for translating the user input request into an input command compatible with the push protocol;
means for facilitating providing the input command to the remote machine utilizing the push protocol,
wherein the means for receiving the remote desktop drawing command comprises means for receiving the remote desktop drawing command in response to the input command.

32. The apparatus of clause 22, wherein the apparatus comprises the transcoding server.

33. The apparatus of clause 22, wherein the apparatus comprises a processing system and a memory.

Illustration of Method/Apparatus/Machine Readable Storage Medium for Facilitating a Remote Desktop Session Between a Web Browser at a Client Device and a Remote Desktop Server at a Remote Machine Through a Transcoding Server, Utilizing an Adapter at the Transcoding Server (Described as Clauses).

Figure 14A:
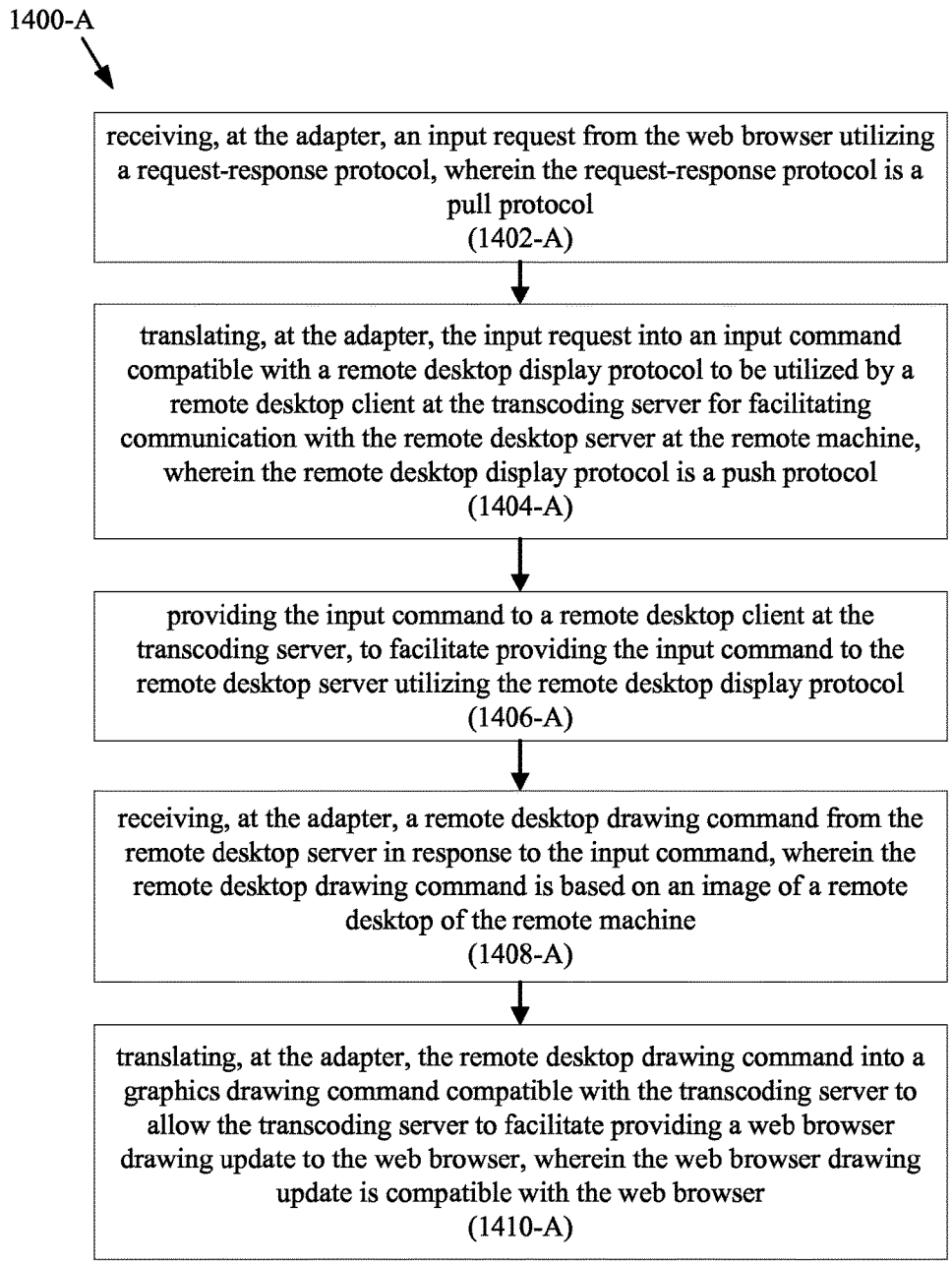
FIG. 14A is a block diagram representing an example of a method of facilitating a remote desktop session between a web browser at a client device and a remote desktop server at a remote machine through a transcoding server, utilizing an adapter at the transcoding server.

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 10, and 20. Clause 1 below is presented, for example, with reference to FIGS. 14A-14C. The other clauses can be presented in a similar manner.

1. A method (see, e.g., item 1400-A in FIG. 14A) for facilitating a remote desktop session between a web browser at a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the method comprising:
receiving, at the adapter, an input request from the web browser utilizing a request-response protocol, wherein the request-response protocol is a pull protocol (see, e.g., item 1402-A in FIG. 14A);
translating, at the adapter, the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1404-A in FIG. 14A);
providing the input command to a remote desktop client at the transcoding server, to facilitate providing the input command to the remote desktop server utilizing the remote desktop display protocol (see, e.g., item 1406-A in FIG. 14A);
receiving, at the adapter, a remote desktop drawing command from the remote desktop server in response to the input command, wherein the remote desktop drawing command is based on an image of a remote desktop of the remote machine (see, e.g., item 1408-A in FIG. 14A); and
translating, at the adapter, the remote desktop drawing command into a graphics drawing command compatible with the transcoding server to allow the transcoding server to facilitate providing a web browser drawing update to the web browser, wherein the web browser drawing update is compatible with the web browser (see, e.g., item 1410-A in FIG. 14A).

2. The method of clause 1, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

3. The method of clause 1, wherein the receiving the input request comprises receiving the input request from the web browser via an HTTP handler of a web application container at the transcoding server,
wherein the receiving the remote desktop drawing command comprises receiving the remote desktop drawing command via the remote desktop client using the remote desktop display protocol.

4. The method of clause 1, wherein the remote desktop drawing command comprises remote desktop drawing command parameters and bitmap data received from the remote desktop server,
wherein the translating the remote desktop drawing command comprises one or more of: calculating new drawing command parameters based on the remote desktop drawing command parameters; adjusting the remote desktop drawing command parameters; and making adjustments to the bitmap data.

5. The method of clause 1, further comprising:
generating an image based on the graphics drawing command; and
generating coordinates for the image based on the graphics drawing command,
wherein the image represents a portion of an entire image of the remote desktop.

6. The method of clause 1, further comprising:
executing the graphics drawing command to generate and draw an image into a drawing commands queue at the transcoding server that is accessible by a web application container at the transcoding server for communicating with the web browser;
generating coordinates for the image based on the graphics drawing command;
storing the coordinates in the drawing commands queue; and
after generating the coordinates, transmitting a notification to the web application container that a drawing command is ready to be served to the web browser,
wherein the graphics drawing command represents a portion of an entire image of the remote desktop.

7. The method of clause 1, further comprising:

receiving, via an HTTP handler of the transcoding server, a connection request from the web browser; and facilitating establishing, controlling or terminating the remote desktop session between the remote desktop client and the remote desktop server in response to the connection request, wherein the facilitating of the establishing, controlling or terminating comprises:

generating a session control command based on the connection request, wherein the session control command is compatible with the remote desktop display protocol; and facilitating transmitting the session control command to the remote desktop server via the remote desktop client using the remote desktop display protocol.

8. The method of clause 7, wherein the session control command comprises at least one of: a command for starting the remote desktop session, a command for stopping the remote desktop session, a credential, a setting, a preference, and a command for passing at least one of a credential, a setting, and a preference.

9. The method of clause 1, further comprising:

extracting coordinates from the graphics drawing command; and updating at least a portion of an off-screen bitmap based on the graphics drawing command, wherein the at least a portion of the off-screen bitmap is associated with the coordinates, wherein the off-screen bitmap represents an entire image of the remote desktop.

Figure 14B:
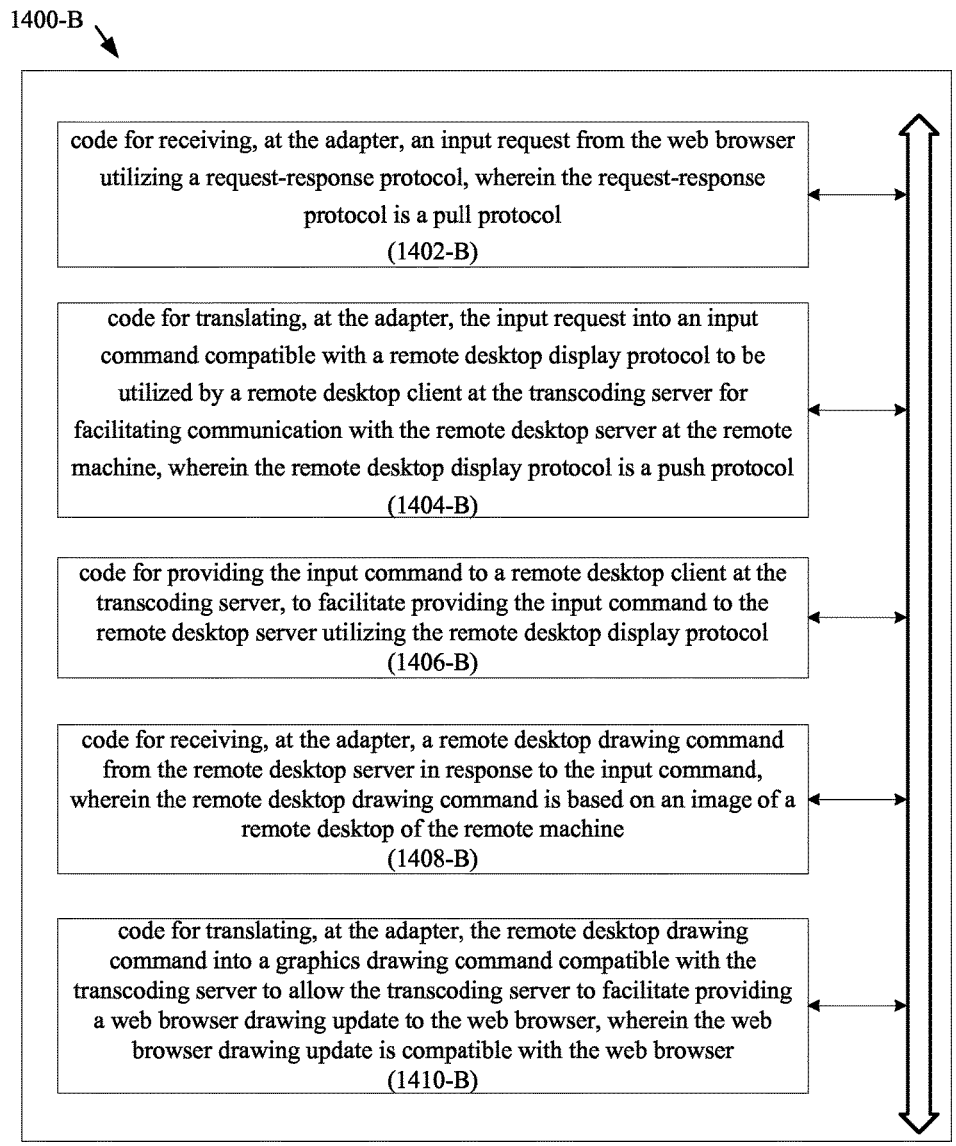
FIG. 14B is a block diagram representing code of an example of a machine-readable storage medium encoded with instructions executable by a processing system to perform a method of facilitating a remote desktop session between a web browser at a client device and a remote desktop server at a remote machine through a transcoding server, utilizing an adapter at the transcoding server.

10. A machine-readable storage medium (see, e.g., 810, 819 in FIG. 8) encoded with instructions executable by a processing system (see, e.g., 802) to perform a method for facilitating a remote desktop session between a web browser at a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the instructions comprising code for:

receiving, at the adapter, an input request from the web browser utilizing a request-response protocol, wherein the request-response protocol is a pull protocol (see, e.g., item 1402-B in FIG. 14B);

translating, at the adapter, the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1404-B in FIG. 14B);

providing the input command to a remote desktop client at the transcoding server, to facilitate providing the input command to the remote desktop server utilizing the remote desktop display protocol (see, e.g., item 1406-B in FIG. 14B);

receiving, at the adapter, a remote desktop drawing command from the remote desktop server in response to the input command, wherein the remote desktop drawing command is based on an image of a remote desktop of the remote machine (see, e.g., item 1408-B in FIG. 14B); and translating, at the adapter, the remote desktop drawing command into a graphics drawing command compatible with the transcoding server to allow the transcoding server to facilitate providing a web browser drawing update to the web browser, wherein the web browser drawing update is compatible with the web browser (see, e.g., item 1410-B in FIG. 14B).

11. The machine-readable storage medium of clause 10, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

12. The machine-readable storage medium of clause 10, wherein the receiving the input request comprises receiving the input request from the web browser via an HTTP handler of an application container at the transcoding server, wherein the receiving the remote desktop drawing command comprises receiving the remote desktop drawing command via the remote desktop client using the remote desktop display protocol.

13. The machine-readable storage medium of clause 10, wherein the remote desktop drawing command comprises remote desktop drawing command parameters and bitmap data received from the remote desktop server, wherein the translating the remote desktop drawing command comprises one or more of: calculating new drawing command parameters based on the remote desktop drawing command parameters; adjusting the remote desktop drawing command parameters; and making adjustments to the bitmap data.

14 The machine-readable storage medium of clause 10, wherein the instructions further comprise code for:

generating an image based on the graphics drawing command; and generating coordinates for the image based on the graphics drawing command, wherein the image represents a portion of an entire image of the remote desktop.

15. The machine-readable storage medium of clause 10, wherein the instructions further comprise code for:

executing the graphics drawing command to generate and draw an image into a drawing commands queue at the transcoding server that is accessible by a web application container at the transcoding server for communicating with the web browser;

generating coordinates for the image based on the graphics drawing command;

storing the coordinates in the drawing commands queue; and after generating the coordinates, transmitting a notification to the web application container that a drawing command is ready to be served to the web browser, wherein the graphics drawing command represents a portion of an entire image of the remote desktop.

16. The machine-readable storage medium of clause 10, wherein the instructions further comprise code for:

receiving, via an HTTP handler of the transcoding server, a connection request from the web browser; and facilitating establishing, controlling or terminating the remote desktop session between the remote desktop client and the remote desktop server in response to the connection request, wherein the facilitating of the establishing, controlling or terminating comprises:

generating a session control command based on the connection request, wherein the session control command is compatible with the remote desktop display protocol; and facilitating transmitting the session control command to the remote desktop server via the remote desktop client using the remote desktop display protocol.

17. The machine-readable storage medium of clause 16, wherein the session control command comprises at least one of: a command for starting the remote desktop session, a command for stopping the remote desktop session, a credential, a setting, a preference, and a command for passing at least one of a credential, a setting, and a preference.

18. The machine-readable storage medium of clause 10, wherein the instructions further comprise code for:

extracting coordinates from the graphics drawing command; and updating at least a portion of an off-screen bitmap based on the graphics drawing command, wherein the at least a portion of the off-screen bitmap is associated with the coordinates, wherein the off-screen bitmap represents an entire image of the remote desktop.

19. A computing machine comprising the machine-readable storage medium of clause 10, wherein the computing machine is the transcoding server.

Figure 14C:
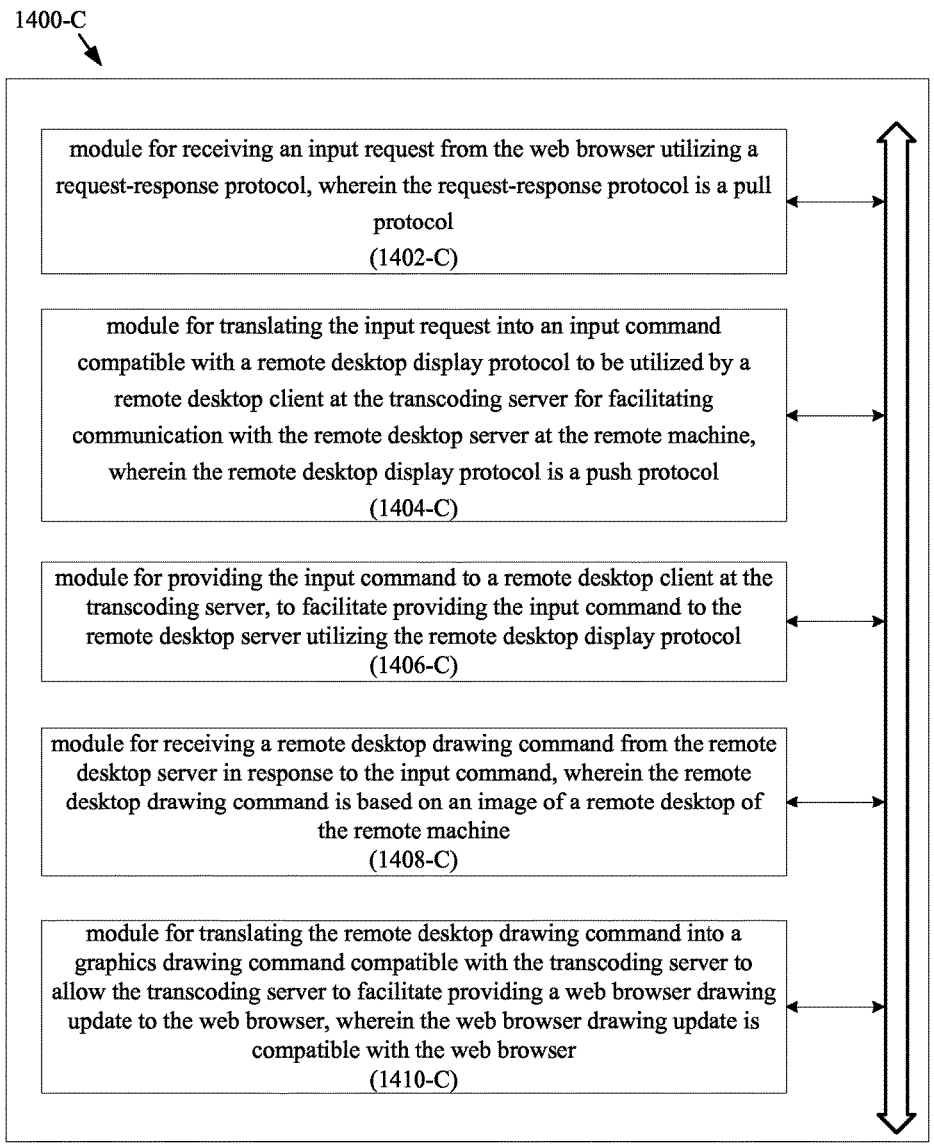
FIG. 14C is a block diagram of module of an example of an apparatus for facilitating a remote desktop session between a web browser at a client device and a remote desktop server at a remote machine through a transcoding server, utilizing an adapter at the transcoding server.

20. An apparatus (see, e.g., item 1400-C in FIG. 14C) for facilitating a remote desktop session between a web browser at a client device (see, e.g., 310 in FIG. 3A) and a remote desktop server at a remote machine (see, e.g., 320) through a transcoding server (see, e.g., 330), utilizing an adapter (see, e.g., 600 in FIG. 6) at the transcoding server, the apparatus comprising:

means for receiving an input request from the web browser utilizing a request-response protocol, wherein the request-response protocol is a pull protocol (see, e.g., item 1402-C in FIG. 14C);

means for translating the input request into an input command compatible with a remote desktop display protocol to be utilized by a remote desktop client at the transcoding server for facilitating communication with the remote desktop server at the remote machine, wherein the remote desktop display protocol is a push protocol (see, e.g., item 1404-C in FIG. 14C);

means for providing the input command to a remote desktop client at the transcoding server, to facilitate providing the input command to the remote desktop server utilizing the remote desktop display protocol (see, e.g., item 1406-C in FIG. 14C);

means for receiving a remote desktop drawing command from the remote desktop server in response to the input command, wherein the remote desktop drawing command is based on an image of a remote desktop of the remote machine (see, e.g., item 1408-C in FIG. 14C); and means for translating the remote desktop drawing command into a graphics drawing command compatible with the transcoding server to allow the transcoding server to facilitate providing a web browser drawing update to the web browser, wherein the web browser drawing update is compatible with the web browser (see, e.g., item 1410-C in FIG. 14C).

21. The apparatus of clause 20, wherein the request-response protocol comprises hypertext transfer protocol (HTTP), wherein the graphics drawing command is a Java graphics drawing command, wherein the transcoding server is a Java transcoding server, wherein the web browser is HTML5 compatible.

22. The apparatus of clause 20, wherein the means for receiving the input request comprises means for receiving the input request from the web browser via an HTTP handler of a web application container at the transcoding server, wherein the means for receiving the remote desktop drawing command comprises means for receiving the remote desktop drawing command via the remote desktop client using the remote desktop display protocol.

23. The apparatus of clause 20, wherein the remote desktop drawing command comprises remote desktop drawing command parameters and bitmap data received from the remote desktop server, wherein the means for translating the remote desktop drawing command comprises one or more of: means for calculating new drawing command parameters based on the remote desktop drawing command parameters; means for adjusting the remote desktop drawing command parameters; and means for making adjustments to the bitmap data.

24. The apparatus of clause 20, further comprising:

means for generating an image based on the graphics drawing command; and means for generating coordinates for the image based on the graphics drawing command, wherein the image represents a portion of an entire image of the remote desktop.

25. The apparatus of clause 20, further comprising:

means for executing the graphics drawing command to generate and draw an image into a drawing commands queue at the transcoding server that is accessible by a web application container at the transcoding server for communicating with the web browser;

means for generating coordinates for the image based on the graphics drawing command;

means for storing the coordinates in the drawing commands queue; and means for transmitting, after generating the coordinates, a notification to the web application container that a drawing command is ready to be served to the web browser, wherein the graphics drawing command represents a portion of an entire image of the remote desktop.

26. The apparatus of clause 20, further comprising:

means for receiving, via an HTTP handler of the transcoding server, a connection request from the web browser; and means for facilitating establishing, controlling or terminating the remote desktop session between the remote desktop client and the remote desktop server in response to the request, wherein the means for facilitating of the establishing, controlling or terminating comprises:

means for generating a session control command based on the connection request, wherein the session control command is compatible with the remote desktop display protocol; and means for facilitating transmitting the session control command to the remote desktop server via the remote desktop client using the remote desktop display protocol.

27. The apparatus of clause 26, wherein the session control command comprises at least one of: a command for starting the remote desktop session, a command for stopping the remote desktop session, a credential, a setting, a preference, and a command for passing at least one of a credential, a setting, and a preference.

28. The apparatus of clause 20, further comprising:

means for extracting coordinates from the graphics drawing command; and means for updating at least a portion of an off-screen bitmap based on the graphics drawing command, wherein the at least a portion of the off-screen bitmap is associated with the coordinates, wherein the off-screen bitmap represents an entire image of the remote desktop.

29. The apparatus of clause 20, wherein the apparatus comprises the transcoding server.

30. The apparatus of clause 20, wherein the apparatus comprises a processing system and a memory.

Illustration of Method/Apparatus/Machine Readable Storage Medium for Facilitating Accessing and Controlling a Remote Desktop of a Remote Machine in Real Time from a Web Browser at a Client Device Via a Hypertext Transfer Protocol (HTTP) Handler and a Remote Desktop Client Adapter for a Transcoding Server (Described as Clauses).

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clauses 1, 10, and 18. Clause 1 below is presented, for example, with reference to FIGS. 15A-15E. The other clauses can be presented in a similar manner.

Figure 15A:
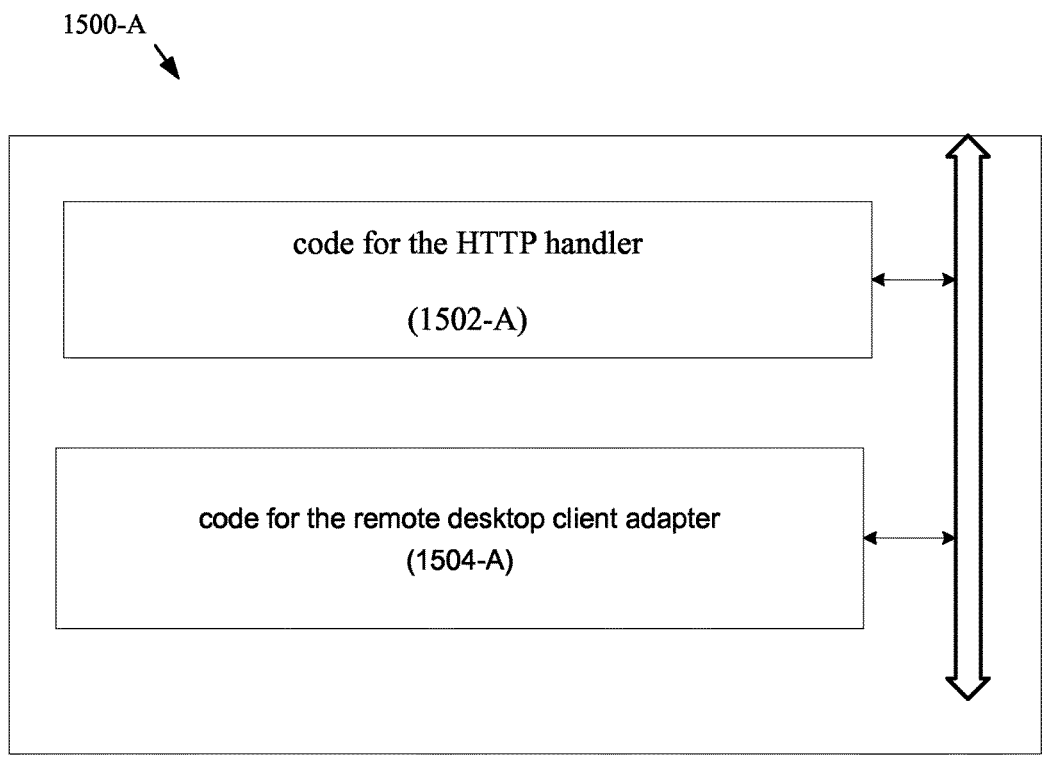
FIG. 15A is a block diagram representing code of an example of a machine-readable storage medium encoded with instructions executable by a processing system to perform a method of facilitating accessing and controlling a remote desktop of a remote machine in real time from a web browser at a client device via a hypertext transfer protocol (HTTP) handler and a remote desktop client adapter for a transcoding server.

1. A machine-readable storage medium (see, e.g., item 1500-A in FIG. 15A) comprising code for facilitating accessing and controlling a remote desktop of a remote machine (see, e.g., 320 in FIG. 3A) in real time from a web browser (see, e.g., 500 of FIG. 5) at a client device (see, e.g., 310 of FIG. 3A) via a hypertext transfer protocol (HTTP) handler (see, e.g., 422 of FIG. 4A) and a remote desktop client adapter (see, e.g., 430 of FIG. 4B) for a transcoding server (see, e.g., 330 of FIG. 3A), the machine-readable storage medium comprising:

the HTTP handler (see, e.g., item 1502-A of FIG. 15A); and the remote desktop client adapter (see, e.g., item 1504-A of FIG. 15A);

wherein the HTTP handler is configured to receive a connection request and a user input request from the web browser utilizing HTTP, to provide the connection request and the user input request to the remote desktop client adapter, and to facilitate providing a web browser drawing update to the web browser in response to a drawing request from the web browser, wherein the web browser drawing update is compatible with the web browser, wherein the remote desktop client adapter is configured to receive the connection request and the user input request, to translate the connection request into a session control command compatible with a remote desktop display protocol, and to translate the user input request into a remote desktop input command compatible with the remote desktop display protocol, wherein the remote desktop client adapter is configured to facilitate providing the session control command to a remote desktop client for providing the session control command to a remote desktop server of the remote machine and for establishing, controlling or terminating a remote desktop session with the remote desktop server, wherein the remote desktop client adapter is configured to facilitate providing the remote desktop input command to the remote desktop client for providing the remote desktop input command to the remote desktop server, wherein the remote desktop client adapter is configured to receive a remote desktop drawing command from the remote desktop server via the remote desktop client in response to the remote desktop input command, wherein the remote desktop drawing command is compatible with the remote desktop display protocol, wherein the remote desktop client adapter is configured to translate the remote desktop drawing command into a graphics drawing command compatible with the transcoding server, and to update a portion of an image representing the entire remote desktop and coordinates based on the graphics drawing command, and wherein the HTTP handler is configured to generate an image file based on the updated portion of the image and to obtain drawing coordinates based on the coordinates in response to the drawing request, wherein the web browser drawing update comprises the image file and the drawing coordinates, wherein the remote desktop drawing command represents a portion of the entire remote desktop, wherein the remote desktop display protocol is a push protocol, and HTTP is a pull protocol.

2. The machine-readable storage medium of clause 1, wherein the user input request comprises at least one of a mouse event, a keyboard event, and a touch event.

3. The machine-readable storage medium of clause 1, wherein the session control command relates to establishing or controlling a connection between the remote desktop client and the remote desktop server and comprises at least one of: a command for starting the remote desktop session, a command for stopping the remote desktop session, a credential, a setting, a preference, and a command for passing at least one of a credential, a setting, and a preference.

4. The machine-readable storage medium of clause 1, wherein the graphics drawing command is a Java graphics drawing command, wherein the transcoding server is a Java transcoding server, and wherein the web browser is HTML5 compatible.

5. The machine-readable storage medium of clause 1, wherein the remote desktop client adapter is configured to place the image and the coordinates into a drawing commands queue, wherein the machine-readable storage medium further comprises a long polling handler, wherein the long polling handler is configured to receive the drawing request from the web browser utilizing HTTP, to forward the drawing request to the HTTP handler if coordinates for an image are pending in the drawing commands queue, to place the drawing request into a drawing requests queue if coordinates for an image are not pending in the drawing commands, and wherein the drawing commands queue is configured to send a notification to the drawing requests queue if the drawing commands queue receives a new drawing command comprising an image and coordinates for an image.

6. The machine-readable storage medium of clause 1, further comprising a drawing requests queue configured to forward the drawing request to the HTTP handler in response to a notification from a drawing commands queue that a drawing command is pending for the web browser.

7. The machine-readable storage medium of clause 1, wherein the HTTP handler is configured to place the drawing coordinates into a section of an HTTP header, wherein the HTTP handler is configured to facilitate providing the image file and the drawing coordinates together to the web browser in a single HTTP transmission response for drawing a display image at the web browser, wherein the display image represents the updated portion of the image representing the entire remote desktop.

8. The machine-readable storage medium of clause 1, wherein the HTTP handler is configured to facilitate providing script client code compatible with the web browser to the web browser if the connection request from the web browser comprises a request to connect to the remote machine.

9. A computing machine comprising the machine-readable storage medium of clause 1, wherein the computing machine is the transcoding server.

Figure 15B:
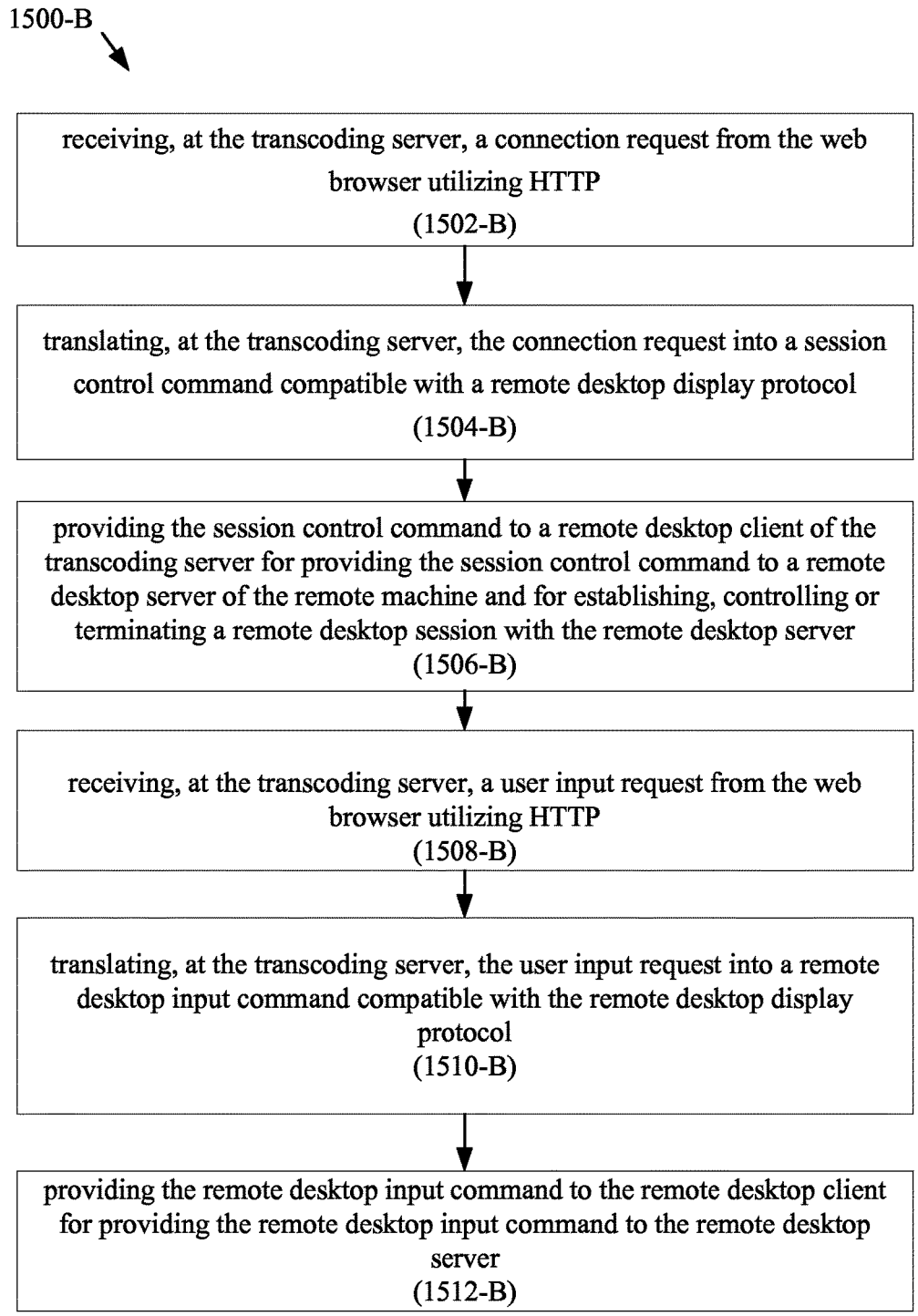

10. A method (see, e.g., item 1500-B of FIG. 15B and item 1500-C of FIG. 15C) for facilitating accessing and controlling a remote desktop of a remote machine (see, e.g., 320 of FIG. 3A) in real time from a web browser (see, e.g., 500 of FIG. 5) at a client device (see, e.g., 310 of FIG. 3A) utilizing a transcoding server (see, e.g., 330 of FIG. 3A), the method comprising:

receiving, at the transcoding server, a connection request from the web browser utilizing HTTP (see, e.g., item 1502-B of FIG. 15B);

translating, at the transcoding server, the connection request into a session control command compatible with a remote desktop display protocol (see, e.g., item 1504-B of FIG. 15B);

providing the session control command to a remote desktop client of the transcoding server for providing the session control command to a remote desktop server of the remote machine and for establishing, controlling or terminating a remote desktop session with the remote desktop server (see, e.g., item 1506-B of FIG. 15B);

receiving, at the transcoding server, a user input request from the web browser utilizing HTTP (see, e.g., item 1508-B of FIG. 15B), translating, at the transcoding server, the user input request into a remote desktop input command compatible with the remote desktop display protocol (see, e.g., item 1510-B of FIG. 15B);

providing the remote desktop input command to the remote desktop client for providing the remote desktop input command to the remote desktop server (see, e.g., item 1512-B of FIG. 15B), receiving, at the transcoding server, a remote desktop drawing command from the remote desktop server via the remote desktop client in response to the remote desktop input command, wherein the remote desktop drawing command is compatible with the remote desktop display protocol, and wherein the remote desktop drawing command represents a portion of an entire image of the remote desktop (see, e.g., item 1502-C of FIG. 15C);

translating, at the transcoding server, the remote desktop drawing command into a graphics drawing command compatible with the transcoding server (see, e.g., item 1504-C of FIG. 15C);

updating, at the transcoding server, a portion of an image and coordinates based on the graphics drawing command (see, e.g., item 1506-C of FIG. 15C);

generating, at the transcoding server, an image file based on the updated portion of the image (see, e.g., item 1508-C of FIG. 15C);

obtaining drawing coordinates based on the coordinates (see, e.g., item 1510-C of FIG. 15C); and facilitating providing a web browser drawing update to the web browser in response to a drawing request from the web browser, wherein the web browser drawing update comprises the image file and the drawing coordinates, and wherein the web browser drawing update is compatible with the web browser (see, e.g., item 1512-C of FIG. 15C), wherein the remote desktop drawing command represents a portion of the entire remote desktop, and the image represents the entire remote desktop, wherein the remote desktop display protocol is a push protocol, and HTTP is a pull protocol.

11. The method of clause 10, wherein the user input request comprises at least one of a mouse event, a keyboard event, and a touch event.

12. The method of clause 10, wherein the session control command comprises at least one of: a command for starting the remote desktop session, a command for stopping the remote desktop session, a credential, a setting, a preference, and a command for passing at least one of a credential, a setting, and a preference.

13. The method of clause 10, wherein the graphics drawing command is a Java graphics drawing command, wherein the transcoding server is a Java transcoding server, and wherein the web browser is HTML5 compatible.

14. The method of clause 10, wherein the updating a portion of an image and coordinates comprises storing the portion of the image and the coordinates into a drawing commands queue, wherein the method further comprises: receiving the drawing request from the web browser utilizing HTTP; forwarding the drawing request to an HTTP handler if coordinates for an image are pending in the drawing commands queue; placing the drawing request into a drawing requests queue if coordinates for an image are not pending in the drawing commands, and wherein the method further comprises: sending a notification to the drawing requests queue if the drawing commands queue receives a new drawing command comprising an image and coordinates for an image.

15. The method of clause 10, further comprising forwarding the drawing request to an HTTP handler in response to a notification from a drawing commands queue that a drawing command is pending for the web browser.

16. The method of clause 10, further comprising placing the drawing coordinates into a section of an HTTP header, wherein the facilitating providing the web browser drawing update comprises facilitating providing the image file and the drawing coordinates together to the web browser in a single HTTP transmission response for drawing a display image at the web browser, wherein the display image represents the updated portion of the image representing the entire remote desktop.

17. The method of clause 10, further comprising facilitate providing script client code compatible with the web browser, to the web browser, if the connection request from the web browser comprises a request to connect to the remote machine.

Figure 15D:
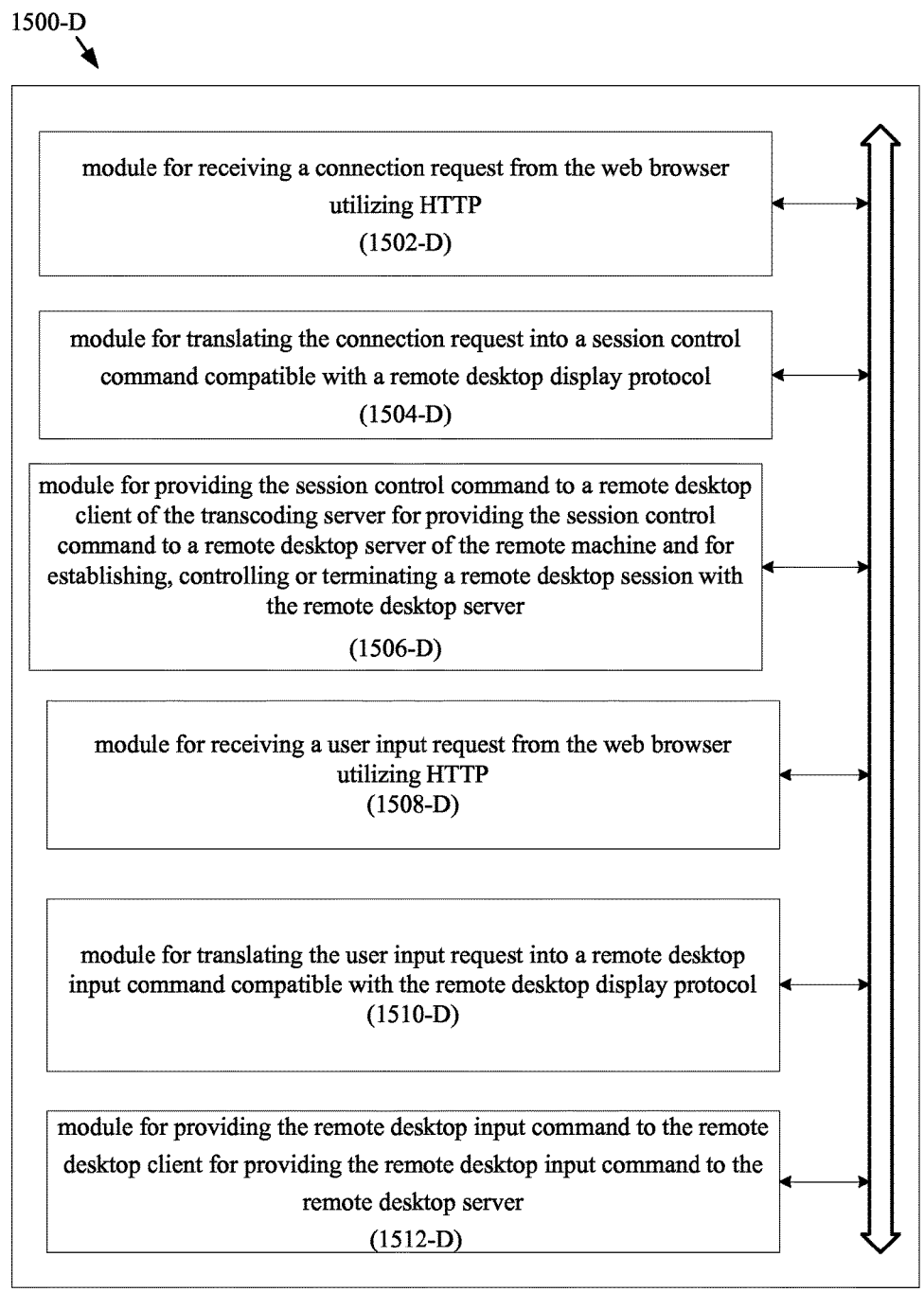
FIGS. 15D-15E are block diagrams of modules of an example of an apparatus for facilitating accessing and controlling a remote desktop of a remote machine in real time from a web browser at a client device via a hypertext transfer protocol (HTTP) handler and a remote desktop client adapter for a transcoding server.
Figure 15E:
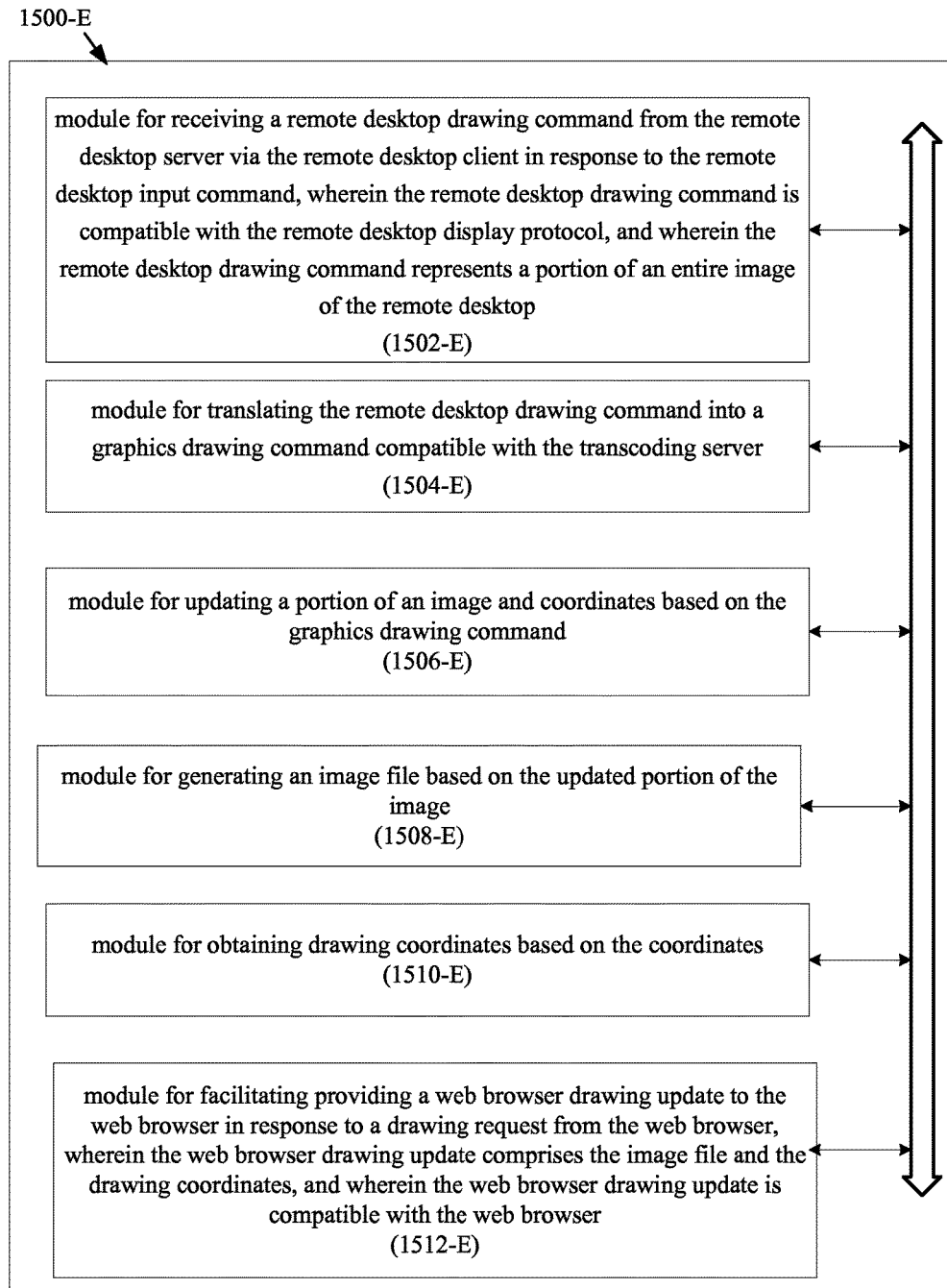

18. A transcoding server (see, e.g., item 1500-D of FIG. 15D and item 1500-E of FIG. 15E) for facilitating accessing and controlling a remote desktop of a remote machine (see, e.g., 320 of FIG. 3A) in real time from a web browser (see, e.g., 500 of FIG. 5) at a client device (see, e.g., 310 of FIG. 3A), the transcoding server comprising:

means for receiving a connection request from the web browser utilizing HTTP (see, e.g., item 1502-D in FIG. 15D);

means for translating the connection request into a session control command compatible with a remote desktop display protocol (see, e.g., item 1504-D in FIG. 15D);

means for providing the session control command to a remote desktop client of the transcoding server for providing the session control command to a remote desktop server of the remote machine and for establishing, controlling or terminating a remote desktop session with the remote desktop server (see, e.g., item 1506-D in FIG. 15D);

means for receiving a user input request from the web browser utilizing HTTP (see, e.g., item 1508-D in FIG. 15D), means for translating the user input request into a remote desktop input command compatible with the remote desktop display protocol (see, e.g., item 1510-D in FIG. 15D);

means for providing the remote desktop input command to the remote desktop client for providing the remote desktop input command to the remote desktop server (see, e.g., item 1512-D in FIG. 15D), means for receiving a remote desktop drawing command from the remote desktop server via the remote desktop client in response to the remote desktop input command, wherein the remote desktop drawing command is compatible with the remote desktop display protocol, and wherein the remote desktop drawing command represents a portion of an entire image of the remote desktop (see, e.g., item 1502-E in FIG. 15E);

means for translating the remote desktop drawing command into a graphics drawing command compatible with the transcoding server (see, e.g., item 1504-E in FIG. 15E);

means for updating a portion of an image and coordinates based on the graphics drawing command (see, e.g., item 1506-E in FIG. 15E);

means for generating an image file based on the updated portion of the image (see, e.g., item 1508-E in FIG. 15E);

means for obtaining drawing coordinates based on the coordinates (see, e.g., item 1510-E in FIG. 15E); and means for facilitating providing a web browser drawing update to the web browser in response to a drawing request from the web browser, wherein the web browser drawing update comprises the image file and the drawing coordinates, and wherein the web browser drawing update is compatible with the web browser (see, e.g., item 1512-E in FIG. 15E), wherein the remote desktop drawing command represents a portion of the entire remote desktop, and the image represents the entire remote desktop, wherein the remote desktop display protocol is a push protocol, and HTTP is a pull protocol.

19. The transcoding server of clause 18, wherein the user input request comprises at least one of a mouse event, a keyboard event, and a touch event.

20. The transcoding server of clause 18, wherein the session control command comprises at least one of: a command for starting the remote desktop session, a command for stopping the remote desktop session, a credential, a setting, a preference, and a command for passing at least one of a credential, a setting, and a preference.

21. The transcoding server of clause 18, wherein the graphics drawing command is a Java graphics drawing command, wherein the transcoding server is a Java transcoding server, and wherein the web browser is HTML5 compatible.

22. The transcoding server of clause 18, wherein the means for updating a portion of an image and coordinates comprises means for storing the portion of the image and the coordinates into a drawing commands queue, wherein the transcoding server further comprises: means for receiving the drawing request from the web browser utilizing HTTP; means for forwarding the drawing request to an HTTP handler if coordinates for an image are pending in the drawing commands queue; means for placing the drawing request into a drawing requests queue if coordinates for an image are not pending in the drawing commands, and wherein the transcoding server further comprises: means for sending a notification to the drawing requests queue if the drawing commands queue receives a new drawing command comprising an image and coordinates for an image.

23. The transcoding server of clause 18, further comprising means for forwarding the drawing request to an HTTP handler in response to a notification from a drawing commands queue that a drawing command is pending for the web browser.

24. The transcoding server of clause 18, further comprising means for placing the drawing coordinates into a section of an HTTP header, wherein the means for facilitating providing the web browser drawing update comprises means for facilitating providing the image file and the drawing coordinates together to the web browser in a single HTTP transmission response for drawing a display image at the web browser, wherein the display image represents the updated portion of the image representing the entire remote desktop.

25. The transcoding server of clause 18, further comprising means for facilitate providing script client code compatible with the web browser, to the web browser, if the connection request from the web browser comprises a request to connect to the remote machine.

Those of skill in the art would appreciate that the various illustrative blocks, modules, elements, components, methods, and algorithms described herein may be implemented as electronic hardware, computer software, or combinations of both.

For example, a module (e.g., an web application container, a long polling handler module, a long polling handler, a drawing requests queue, an HTTP handler, an image conversion module, a drawing commands queue, a remote desktop client adapter, a remote desktop client, a remote desktop server, or other modules or functions) may be implemented as electronic hardware, computer software, or combinations of both. Modules may be considered in some aspects as "means for" accomplishing one or more functions or steps. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer with for example ASIC or FPGA, or a special purpose electronic or optical device).

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

In one aspect of the disclosure, when actions or functions are described as being performed by a module or a component (e.g., establishing, sending, receiving, providing, building, displaying, notifying, accepting, selecting, controlling, issuing, transmitting, reporting, pushing, or any other action or function), it is understood that such actions or functions are performed by the module or the component directly or indirectly. As an example, when a module is described as performing an action, it is understood that the module may perform the action directly or may perform the action indirectly, for example, by facilitating such an action. For instance, when a session is described as being established by a module, it is understood that the module may establish the session indirectly by facilitating an establishment of the session. As yet another example, when an image is described as being displayed or rendered by a module, it is understood that the image may be displayed or rendered by the module either directly or indirectly.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element (e.g., a command, a call, a handler, a device, a machine, etc.) in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

In one aspect, the term "compatible" may be used in a sense that a first element (e.g., a drawing command, an input call, an input command, a connection request, a drawing request, etc.) is compatible with a second element (e.g., a remote desktop display protocol, a remote desktop client, a remote desktop server, a transcoding server, a web browser, a client device, a remote machine, HTML5, HTTP, etc.) so that the first element can be recognized or understood by the second element, can be processed by the second element, or can be utilized by or with the second element.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of conducting a remote desktop session comprising:
   receiving, at a transcoding server, a request from a client device for access and control of a remote desktop of a remote machine, the transcoding server having a protocol translation functionality configured to translate a first protocol to a second protocol;
   receiving, at the transcoding server, a remote desktop drawing command from the remote machine in response to the request;
   translating, at the transcoding server, the remote desktop drawing command into a drawing update compatible with HTML, wherein the drawing update comprises an image file and drawing coordinates for the image file, wherein translating the remote desktop drawing command into the drawing update comprises:
      translating, at the transcoding server, the remote desktop drawing command into a Java graphics drawing command;
      updating, at the transcoding server, a portion of a Java bitmap using the Java graphics drawing command, wherein the Java bitmap is off-screen in a drawing commands queue of the transcoding server and represents an entire image of the remote desktop of the remote machine
   placing, at the transcoding server, the drawing coordinates into a cookie; and
   providing, at the transcoding server, the drawing update to the web browser in response, wherein the response comprises the cookie;

wherein the transcoding server is an intermediary between the remote machine and the client device, and wherein the transcoding server is physically separate from the remote machine.

2. The method of claim 1, further comprising:
generating coordinates for the updated portion of the Java bitmap based on the Java graphics drawing command; and
forming an image file based on the updated portion of the Java bitmap.

3. The method of claim 2, further comprising obtaining drawing coordinates for the image file based on the coordinates for the updated portion of the Java bitmap.

4. The method of claim 3, wherein the drawing coordinates are compatible with HTML5.

5. The method of claim 1, wherein the request from the client device is from a web browser that temporarily comprises JavaScript client code during the remote desktop session.

6. The method of claim 1, further comprising:
receiving, at the transcoding server, a drawing request from a web browser of the client device, and
providing a drawing update from the transcoding server to the web browser in response to the drawing request from the web browser.

7. The method of claim 1, further comprising receiving, at the transcoding server from the client device an initial HTTP request comprising a uniform resource locator (URL) of the remote machine.

8. The method of claim 1, wherein the transcoding server comprises a Java compatible web application container.

9. A machine-readable non-transitory storage medium encoded with instructions executable by a processing system, the instructions comprising code for:
receiving, at a transcoding server, a request from a client device for access and control of a remote desktop of a remote machine, the transcoding server having a protocol translation functionality configured to translate a first protocol to a second protocol;
receiving, at the transcoding server, a remote desktop drawing command from the remote machine in response to the request;
translating, at the transcoding server, the remote desktop drawing command into a drawing update compatible with HTML, wherein the drawing update comprises an image file and drawing coordinates for the image file, wherein translating the remote desktop drawing command into the drawing update comprises:
translating, at the transcoding server, the remote desktop drawing command into a Java graphics drawing command;
updating, at the transcoding server, a portion of a Java bitmap using the Java graphics drawing command, wherein the Java bitmap is off-screen in a drawing commands queue of the transcoding server and represents an entire image of the remote desktop of the remote machine
placing, at the transcoding server, the drawing coordinates into a cookie; and
providing, at the transcoding server, the drawing update to the web browser in response, wherein the response comprises the cookie;
wherein the transcoding server is an intermediary between the remote machine and the client device, and wherein the transcoding server is physically separate from the remote machine.

10. The machine-readable non-transitory storage medium of claim 9, wherein the instructions further comprise code for:
generating coordinates for the updated portion of the Java bitmap based on the Java graphics drawing command; and
forming an image file based on the updated portion of the Java bitmap.

11. The machine-readable non-transitory storage medium of claim 10, wherein the instructions further comprise code for obtaining drawing coordinates for the image file based on the coordinates for the updated portion of the Java bitmap.

12. The machine-readable non-transitory storage medium of claim 11, wherein the drawing coordinates are compatible with HTML5.

13. The machine-readable non-transitory storage medium of claim 9, wherein the request from the client device is from a web browser that temporarily comprises JavaScript client code during the remote desktop session.

14. The machine-readable non-transitory storage medium of claim 9, wherein the instructions further comprise code for:
receiving, at the transcoding server, a drawing request from a web browser of the client device, and
providing a drawing update from the transcoding server to the web browser in response to the drawing request from the web browser.

15. The machine-readable non-transitory storage medium of claim 9, wherein the instructions further comprise code for receiving, at the transcoding server from the client device an initial HTTP request comprising a uniform resource locator (URL) of the remote machine.

16. An apparatus for conducting a remote desktop session comprising:
a non-transitory memory;
a processor communicatively coupled to the non-transitory memory, the processor located at a transcoding server, the transcoding server having a protocol translation functionality configured to translate a first protocol to a second protocol, the processor configured to:
receive a request from a client device for access and control of a remote desktop of a remote machine;
receive a remote desktop drawing command from the remote machine in response to the request;
translate the remote desktop drawing command into a drawing update compatible with HTML, wherein the drawing update comprises an image file and drawing coordinates for the image file, the processor further configured to:
translate the remote desktop drawing command into a Java graphics drawing command;
update a portion of a Java bitmap using the Java graphics drawing command, wherein the Java bitmap is off-screen in a drawing commands queue of the transcoding server and represents an entire image of the remote desktop of the remote machine
place the drawing coordinates into a cookie; and
provide the drawing update to the web browser in response, wherein the response comprises the cookie;
wherein the transcoding server is an intermediary between the remote machine and the client device, and wherein the transcoding server is physically separate from the remote machine.

17. The apparatus of claim 16, wherein the processor is further configured to:

generate coordinates for the updated portion of the Java bitmap based on the Java graphics drawing command; and form an image file based on the updated portion of the Java bitmap.

18. The apparatus of claim 17, wherein the processor is further configured to obtain drawing coordinates for the image file based on the coordinates for the updated portion of the Java bitmap.

19. The apparatus of claim 18, wherein the drawing coordinates are compatible with HTML5.

20. The apparatus of claim 16, wherein the request from the client device is from a web browser that temporarily comprises JavaScript client code during the remote desktop session.

* * * * *